(12) United States Patent
Negus et al.

(10) Patent No.: US 10,708,918 B2
(45) Date of Patent: Jul. 7, 2020

(54) ELECTRONIC ALIGNMENT USING SIGNATURE EMISSIONS FOR BACKHAUL RADIOS

(71) Applicant: SKYLINE PARTNERS TECHNOLOGY LLC, Boulder, CO (US)

(72) Inventors: Kevin J. Negus, Philipsburg, MT (US); James A. Proctor, Jr., Melbourne Beach, FL (US)

(73) Assignee: SKYLINE PARTNERS TECHNOLOGY LLC, Boulder, CO (US)

( * ) Notice: Subject to any disclaimer, the term of this patent is extended or adjusted under 35 U.S.C. 154(b) by 0 days.

(21) Appl. No.: 15/648,860

(22) Filed: Jul. 13, 2017

(65) Prior Publication Data

US 2017/0311307 A1    Oct. 26, 2017

Related U.S. Application Data

(63) Continuation-in-part of application No. 15/403,090, filed on Jan. 10, 2017, now Pat. No. 9,713,157, which
(Continued)

(51) Int. Cl.
*H04B 7/10* (2017.01)
*H04W 72/04* (2009.01)
(Continued)

(52) U.S. Cl.
CPC .......... *H04W 72/046* (2013.01); *H01Q 1/246* (2013.01); *H01Q 3/2617* (2013.01);
(Continued)

(58) Field of Classification Search
None
See application file for complete search history.

(56) References Cited

U.S. PATENT DOCUMENTS

| D307,274 S | 4/1990 | Sasaki et al. |
| D335,128 S | 4/1993 | Soren |

(Continued)

FOREIGN PATENT DOCUMENTS

| EP | 2745539 | 6/2014 |
| EP | 2767102 | 8/2014 |

(Continued)

OTHER PUBLICATIONS

"AccessGate—RAN Optimization for Mobile Backhaul Systems," Product Data Sheet, Memotec, 2009, Montreal, Quebec, Canada, 2 pages.
(Continued)

*Primary Examiner* — Ayaz R Sheikh
*Assistant Examiner* — Sori A Aga
(74) *Attorney, Agent, or Firm* — Jennifer Hayes; Nixon Peabody LLP

(57) ABSTRACT

A backhaul radio is disclosed that includes one or more antenna structures collectively having a plurality of selectable radiation patterns for detecting alignment signals; one or more receivers configured to receive the alignment signals from the one or more antenna structures and provide received signals; one or more processors for processing the received signals to determine signal properties, wherein at least one of the one or more processors are coupled to at least one of the one or more receivers to receive said received signals; and an interface to couple at least one of the one or more processors to an alignment assisting device. The alignment assisting device coordinates between the backhaul radio and the second backhaul radio during the alignment process. The alignment assisting device further provides an indication of an improved alignment adjustment to a user of the alignment assisting device.

31 Claims, 39 Drawing Sheets

Related U.S. Application Data is a continuation of application No. 15/084,867, filed on Mar. 30, 2016, now Pat. No. 9,577,733, which is a continuation of application No. 14/839,018, filed on Aug. 28, 2015, now Pat. No. 9,325,398, which is a continuation of application No. 13/934,175, filed on Jul. 2, 2013, now Pat. No. 9,179,240, which is a continuation of application No. 13/371,346, filed on Feb. 10, 2012, now Pat. No. 8,502,733, application No. 15/648,860, which is a continuation-in-part of application No. 15/398,174, filed on Jan. 4, 2017, now Pat. No. 10,306,635, which is a continuation of application No. 15/165,504, filed on May 26, 2016, now Pat. No. 9,572,163, which is a continuation of application No. 14/950,354, filed on Nov. 24, 2015, now Pat. No. 9,374,822, which is a continuation of application No. 14/552,431, filed on Nov. 24, 2014, now Pat. No. 9,226,295, which is a continuation of application No. 13/748,544, filed on Jan. 23, 2013, now Pat. No. 8,942,216, which is a continuation of application No. 13/448,294, filed on Apr. 16, 2012, now Pat. No. 8,385,305, application No. 15/648,860, which is a continuation of application No. 15/408,364, filed on Jan. 17, 2017, now Pat. No. 9,712,216, which is a continuation of application No. 15/142,793, filed on Apr. 29, 2016, now Pat. No. 9,577,700, which is a continuation of application No. 14/837,797, filed on Aug. 27, 2015, now Pat. No. 9,350,411, which is a continuation of application No. 14/632,624, filed on Feb. 26, 2015, now Pat. No. 9,178,558, which is a continuation of application No. 14/336,958, filed on Jul. 21, 2014, now Pat. No. 9,001,809, which is a continuation of application No. 13/898,429, filed on May 20, 2013, now Pat. No. 8,824,442, which is a continuation of application No. 13/536,927, filed on Jun. 28, 2012, now Pat. No. 8,467,363, which is a continuation-in-part of application No. 13/371,366, filed on Feb. 10, 2012, now Pat. No. 8,311,023, which is a continuation of application No. 13/212,036, filed on Aug. 17, 2011, now Pat. No. 8,238,318, application No. 15/648,860, which is a continuation-in-part of application No. 15/470,080, filed on Mar. 27, 2017, now Pat. No. 10,313,898, which is a continuation of application No. 14/559,859, filed on Dec. 3, 2014, now Pat. No. 9,609,530, which is a continuation of application No. 14/197,158, filed on Mar. 4, 2014, now Pat. No. 8,928,542, which is a continuation-in-part of application No. 13/645,472, filed on Oct. 4, 2012, now Pat. No. 8,811,365, which is a continuation of application No. 13/371,366, filed on Feb. 10, 2012, now Pat. No. 8,311,023, which is a continuation of application No. 13/212,036, filed on Aug. 17, 2011, now Pat. No. 8,238,318, application No. 15/648,860, which is a continuation-in-part of application No. 14/624,365, filed on Feb. 17, 2015, now Pat. No. 9,713,019, which is a continuation-in-part of application No. 14/502,471, filed on Sep. 30, 2014, now abandoned, which is a continuation-in-part of application No. 14/098,456, filed on Dec. 5, 2013, now Pat. No. 8,989,762, which is a continuation-in-part of application No. 14/337,744, filed on Jul. 22, 2014, now Pat. No. 9,055,463, which is a continuation of application No. 13/645,472, filed on Oct. 4, 2012, now Pat. No. 8,811,365, which is a continuation of application No. 13/371,366, filed on Feb. 10, 2012, now Pat. No. 8,311,023, which is a continuation of application No. 13/212,036, filed on Aug. 17, 2011, now Pat. No. 8,238,318, application No. 15/648,860, which is a continuation-in-part of application No. 14/983,059, filed on Dec. 29, 2015, now Pat. No. 10,356,782, which is a continuation of application No. 14/535,972, filed on Nov. 7, 2014, now Pat. No. 9,252,857, which is a continuation of application No. 14/146,891, filed on Jan. 3, 2014, now Pat. No. 8,897,340, which is a continuation of application No. 13/763,530, filed on Feb. 8, 2013, now Pat. No. 8,649,418, application No. 15/648,860, which is a continuation-in-part of application No. 15/291,968, filed on Oct. 12, 2016, now Pat. No. 10,063,363, which is a continuation of application No. 14/572,725, filed on Dec. 16, 2014, now Pat. No. 9,490,918, which is a continuation of application No. 14/108,200, filed on Dec. 16, 2013, now Pat. No. 8,948,235, which is a continuation of application No. 13/767,796, filed on Feb. 14, 2013, now Pat. No. 8,638,839, which is a continuation of application No. 13/609,156, filed on Sep. 10, 2012, now Pat. No. 8,422,540.

(60) Provisional application No. 61/663,461, filed on Jun. 22, 2012, provisional application No. 61/662,809, filed on Jun. 21, 2012, provisional application No. 62/361,959, filed on Jul. 13, 2016.

(51) Int. Cl.

| | |
|---|---|
| *H04W 88/16* | (2009.01) |
| *H01Q 21/20* | (2006.01) |
| *H01Q 3/26* | (2006.01) |
| *H01Q 1/24* | (2006.01) |
| *H04B 7/06* | (2006.01) |
| *H01Q 21/24* | (2006.01) |
| *H01Q 21/06* | (2006.01) |
| *H04W 4/00* | (2018.01) |
| *H04B 17/318* | (2015.01) |
| *H04W 52/42* | (2009.01) |

(52) U.S. Cl.
CPC .......... *H01Q 21/065* (2013.01); *H01Q 21/20* (2013.01); *H01Q 21/24* (2013.01); *H04B 7/0617* (2013.01); *H04B 17/318* (2015.01); *H04W 4/00* (2013.01); *H04W 52/42* (2013.01); *H04W 72/048* (2013.01); *H04W 88/16* (2013.01); *H04B 7/10* (2013.01)

(56) References Cited

U.S. PATENT DOCUMENTS

| | | | |
|---|---|---|---|
| D349,897 | S | 8/1994 | Soren et al. |
| D373,771 | S | 9/1996 | Messelhi |
| 5,579,367 | A | 11/1996 | Raymond et al. |
| D376,367 | S | 12/1996 | Mailandt |
| D376,600 | S | 12/1996 | Vallilee et al. |
| 5,604,744 | A | 2/1997 | Andersson et al. |
| 5,809,422 | A | 9/1998 | Raleigh et al. |
| D401,592 | S | 11/1998 | Nishimura et al. |
| 5,890,055 | A | 5/1999 | Chu et al. |
| 5,973,613 | A | 10/1999 | Reis |
| RE36,591 | E | 2/2000 | Hayashi et al. |
| 6,253,060 | B1 | 6/2001 | Komara et al. |
| 6,310,584 | B1 | 10/2001 | Reece et al. |
| D455,420 | S | 4/2002 | Arpe |
| 6,377,217 | B1 | 4/2002 | Zhu et al. |
| 6,462,710 | B1 | 10/2002 | Carson et al. |
| 6,463,303 | B1 | 10/2002 | Zhao |

(56) References Cited

U.S. PATENT DOCUMENTS

| | | |
|---|---|---|
| 6,486,828 B1 | 11/2002 | Cahn et al. |
| 6,529,172 B2 | 3/2003 | Zimmerman |
| 6,697,642 B1 | 2/2004 | Thomas |
| 6,912,195 B2 | 6/2005 | Vook et al. |
| D507,263 S | 7/2005 | Narita |
| 6,985,123 B2 | 1/2006 | Gottl |
| 6,995,712 B2 | 2/2006 | Boyanov |
| 7,027,837 B1 | 4/2006 | Uhlik et al. |
| 7,133,672 B2 | 11/2006 | Sayeedi |
| 7,171,223 B2 | 1/2007 | Herscovich et al. |
| 7,221,722 B2 | 5/2007 | Thomas et al. |
| 7,260,141 B2 | 8/2007 | Bierly et al. |
| 7,280,082 B2 | 10/2007 | Theobold et al. |
| 7,289,478 B1 | 10/2007 | Kim et al. |
| 7,292,663 B1 | 11/2007 | Van Wechel et al. |
| D565,534 S | 4/2008 | Ingalsbe et al. |
| 7,394,439 B1 | 7/2008 | Johnson et al. |
| 7,403,501 B2 | 7/2008 | Bordonaro et al. |
| D595,274 S | 6/2009 | Skottke et al. |
| D596,627 S | 7/2009 | Cho et al. |
| 7,587,177 B1 | 9/2009 | Kwong |
| 7,593,729 B2 | 9/2009 | Barak et al. |
| 7,599,290 B2 | 10/2009 | Dos Remedios et al. |
| D604,724 S | 11/2009 | Vorreiter et al. |
| 7,616,554 B2 | 11/2009 | Asai et al. |
| 7,620,370 B2 | 11/2009 | Barak et al. |
| D619,571 S | 7/2010 | Lee |
| 7,756,519 B2 | 7/2010 | Barak et al. |
| D622,256 S | 8/2010 | Lockenwitz |
| 7,848,241 B2 | 12/2010 | Natarajan et al. |
| 7,948,942 B2 | 5/2011 | Zhang et al. |
| 7,978,144 B2 | 7/2011 | Tanabe et al. |
| D643,025 S | 8/2011 | Podduturi |
| 8,078,109 B1 | 12/2011 | Mulcay |
| 8,175,535 B2 | 5/2012 | Mu |
| 8,238,318 B1 | 8/2012 | Negus |
| 8,249,527 B2 | 8/2012 | Rybicki |
| 8,300,590 B1 | 10/2012 | Negus et al. |
| 8,311,023 B1 | 11/2012 | Negus |
| 8,385,305 B1 | 2/2013 | Negus et al. |
| 8,422,540 B1 | 4/2013 | Negus et al. |
| 8,462,709 B2 | 6/2013 | Nanda et al. |
| 8,467,363 B2 | 6/2013 | Lea et al. |
| 8,487,813 B2 | 7/2013 | Leiba et al. |
| 8,502,733 B1 | 8/2013 | Negus et al. |
| 8,638,839 B2 | 1/2014 | Negus et al. |
| 8,649,418 B1 | 2/2014 | Negus et al. |
| D704,174 S | 5/2014 | Negus et al. |
| 8,761,100 B2 | 6/2014 | Negus et al. |
| 8,811,365 B2 | 8/2014 | Negus |
| 8,824,442 B2 | 9/2014 | Lea et al. |
| 8,830,943 B2 | 9/2014 | Negus et al. |
| 8,872,715 B2 | 10/2014 | Lea et al. |
| 8,928,542 B2 | 1/2015 | Lea et al. |
| 8,942,216 B2 | 1/2015 | Negus et al. |
| 8,948,235 B2 | 2/2015 | Negus et al. |
| 8,982,772 B2 | 3/2015 | Fischer et al. |
| 8,989,762 B1 | 3/2015 | Negus et al. |
| 9,001,809 B2 | 4/2015 | Lea et al. |
| 9,049,611 B2 | 6/2015 | Negus et al. |
| 9,055,463 B2 | 6/2015 | Negus et al. |
| 9,178,558 B2 | 11/2015 | Lea et al. |
| 9,179,240 B2 | 11/2015 | Negus et al. |
| 9,226,295 B2 | 12/2015 | Negus et al. |
| 9,226,315 B2 | 12/2015 | Negus et al. |
| 9,282,560 B2 | 3/2016 | Negus |
| 9,350,411 B2 | 5/2016 | Lea et al. |
| 9,374,822 B2 | 6/2016 | Negus et al. |
| 9,572,163 B2 | 2/2017 | Negus et al. |
| 9,577,700 B2 | 2/2017 | Lea et al. |
| 9,577,733 B2 | 2/2017 | Negus et al. |
| 9,609,530 B2 | 3/2017 | Lea et al. |
| 9,655,133 B2 | 5/2017 | Negus et al. |
| 9,712,216 B2 | 7/2017 | Lea et al. |
| 9,713,019 B2 | 7/2017 | Negus et al. |
| 9,713,155 B2 | 7/2017 | Negus |
| 9,713,157 B2 | 7/2017 | Negus et al. |
| 9,876,530 B2 | 1/2018 | Negus et al. |
| 10,051,643 B2 | 8/2018 | Negus et al. |
| 2001/0003443 A1 | 6/2001 | Velazquez |
| 2001/0030939 A1 | 10/2001 | Vijayan et al. |
| 2001/0033247 A1 | 10/2001 | Singer |
| 2001/0035844 A1 | 11/2001 | Reece et al. |
| 2001/0038674 A1 | 11/2001 | Trans |
| 2001/0049295 A1 | 12/2001 | Matsuoka |
| 2001/0050927 A1 | 12/2001 | Johnson |
| 2002/0008672 A1 | 1/2002 | Gothard |
| 2002/0060993 A1 | 5/2002 | Dent |
| 2002/0064141 A1 | 5/2002 | Sakakura |
| 2002/0077068 A1 | 6/2002 | Dent |
| 2002/0111182 A1 | 8/2002 | Sawyer |
| 2002/0136170 A1 | 9/2002 | Struhsaker |
| 2002/0146029 A1 | 10/2002 | Kavak et al. |
| 2003/0064753 A1 | 4/2003 | Kasapi |
| 2003/0073463 A1 | 4/2003 | Shapira |
| 2003/0086366 A1 | 5/2003 | Branlund et al. |
| 2003/0119501 A1 | 6/2003 | Kim |
| 2003/0123384 A1 | 7/2003 | Agee |
| 2003/0123406 A1 | 7/2003 | Yavuz |
| 2003/0124976 A1 | 7/2003 | Tamaki |
| 2003/0153361 A1 | 8/2003 | Mori |
| 2003/0162566 A1 | 8/2003 | Shapira |
| 2004/0006573 A1 | 1/2004 | Takashi |
| 2004/0018843 A1 | 1/2004 | Cerwall |
| 2004/0063406 A1 | 4/2004 | Petrus |
| 2004/0063450 A1 | 4/2004 | Uhlik |
| 2004/0095907 A1 | 5/2004 | Agee |
| 2004/0132454 A1 | 7/2004 | Trott |
| 2004/0137924 A1 | 7/2004 | Herscovich et al. |
| 2004/0151238 A1 | 8/2004 | Masenten |
| 2004/0157613 A1 | 8/2004 | Steer |
| 2004/0165650 A1 | 8/2004 | Miyazaki et al. |
| 2004/0198452 A1 | 10/2004 | Roy |
| 2004/0259497 A1 | 12/2004 | Dent |
| 2004/0259565 A1 | 12/2004 | Lucidame |
| 2005/0026616 A1 | 2/2005 | Cavalli et al. |
| 2005/0068231 A1 | 3/2005 | Regnier et al. |
| 2005/0075078 A1 | 4/2005 | Makinen et al. |
| 2005/0164664 A1 | 7/2005 | DiFonzo |
| 2005/0202828 A1 | 9/2005 | Pecen |
| 2005/0219140 A1 | 10/2005 | Browne et al. |
| 2006/0056365 A1 | 3/2006 | Das et al. |
| 2006/0079290 A1 | 4/2006 | Seto et al. |
| 2006/0141929 A1 | 6/2006 | Lockie et al. |
| 2006/0164271 A1 | 7/2006 | Hirt et al. |
| 2006/0181456 A1 | 8/2006 | Dai |
| 2006/0209746 A1 | 9/2006 | Asai et al. |
| 2006/0253526 A1 | 11/2006 | Welch et al. |
| 2006/0273952 A1 | 12/2006 | Krikorian et al. |
| 2007/0030116 A1 | 2/2007 | Feher |
| 2007/0097899 A1 | 5/2007 | Larsson et al. |
| 2007/0140374 A1 | 6/2007 | Raleigh |
| 2007/0146225 A1 | 6/2007 | Boss et al. |
| 2007/0155431 A1 | 7/2007 | Munzner et al. |
| 2007/0165552 A1 | 7/2007 | Kasapi |
| 2007/0183439 A1 | 8/2007 | Osann |
| 2007/0189408 A1 | 8/2007 | Waxman |
| 2007/0195736 A1 | 8/2007 | Taira |
| 2007/0218910 A1 | 9/2007 | Hill |
| 2007/0222697 A1 | 9/2007 | Caimi |
| 2007/0243878 A1 | 10/2007 | Taira et al. |
| 2007/0264935 A1 | 11/2007 | Mohebbi |
| 2008/0014948 A1 | 1/2008 | Scheinert |
| 2008/0043882 A1 | 2/2008 | Zhang et al. |
| 2008/0080364 A1 | 4/2008 | Barak et al. |
| 2008/0090575 A1 | 4/2008 | Barak et al. |
| 2008/0159212 A1 | 7/2008 | Zhang et al. |
| 2008/0181183 A1 | 7/2008 | Gale |
| 2008/0181282 A1 | 7/2008 | Wala et al. |
| 2008/0240307 A1 | 10/2008 | Wang et al. |
| 2008/0242232 A1 | 10/2008 | Zavadsky et al. |
| 2008/0274745 A1 | 11/2008 | Barak et al. |
| 2009/0010238 A1 | 1/2009 | Barak et al. |
| 2009/0029645 A1 | 1/2009 | Leroudier |

(56) References Cited

U.S. PATENT DOCUMENTS

| | | |
|---|---|---|
| 2009/0052411 A1 | 2/2009 | Leung et al. |
| 2009/0067526 A1 | 3/2009 | Ratermann et al. |
| 2009/0111463 A1 | 4/2009 | Simms et al. |
| 2009/0121963 A1 | 5/2009 | Greene |
| 2009/0143017 A1 | 6/2009 | Barak et al. |
| 2009/0231197 A1 | 9/2009 | Richards |
| 2009/0252134 A1 | 10/2009 | Schlicht et al. |
| 2009/0252250 A1 | 10/2009 | Heath, Jr. |
| 2009/0264087 A1 | 10/2009 | Chae |
| 2009/0274130 A1 | 11/2009 | Boch |
| 2009/0286506 A1 | 11/2009 | Gu |
| 2009/0304055 A1 | 12/2009 | Nino et al. |
| 2009/0312022 A1 | 12/2009 | Viorel et al. |
| 2009/0323621 A1 | 12/2009 | Touboul et al. |
| 2010/0009694 A1 | 1/2010 | Fischer |
| 2010/0033396 A1 | 2/2010 | Tanabe et al. |
| 2010/0046421 A1 | 2/2010 | Adams |
| 2010/0046439 A1 | 2/2010 | Chen et al. |
| 2010/0046462 A1 | 2/2010 | Uwano |
| 2010/0056205 A1 | 3/2010 | Fuss |
| 2010/0087158 A1 | 4/2010 | Chen |
| 2010/0104038 A1 | 4/2010 | Stager |
| 2010/0128630 A1 | 5/2010 | Barak et al. |
| 2010/0157970 A1 | 6/2010 | Gotman et al. |
| 2010/0172422 A1 | 7/2010 | Maruyama |
| 2010/0202391 A1 | 8/2010 | Palanki et al. |
| 2010/0261423 A1 | 10/2010 | Stanforth et al. |
| 2010/0269143 A1 | 10/2010 | Rabowsky |
| 2010/0272006 A1 | 10/2010 | Bertrand et al. |
| 2010/0302101 A1* | 12/2010 | Leiba ............... H01Q 1/1257 342/359 |
| 2010/0303015 A1* | 12/2010 | Ko ............... H04B 7/024 370/328 |
| 2010/0309048 A1 | 12/2010 | Polisetty et al. |
| 2011/0044279 A1 | 2/2011 | Johansson et al. |
| 2011/0065448 A1 | 3/2011 | Song |
| 2011/0070855 A1 | 3/2011 | Mariotti |
| 2011/0085525 A1 | 4/2011 | Patini |
| 2011/0090885 A1 | 4/2011 | Safavi |
| 2011/0103292 A1 | 5/2011 | Pasad et al. |
| 2011/0164186 A1 | 7/2011 | Sadek |
| 2011/0182174 A1 | 7/2011 | Pi et al. |
| 2011/0206155 A1 | 8/2011 | Fujimura et al. |
| 2011/0235514 A1 | 9/2011 | Huang et al. |
| 2011/0250852 A1 | 10/2011 | Green |
| 2012/0058777 A1 | 3/2012 | Nguyen et al. |
| 2012/0063472 A1 | 3/2012 | Le Pallec et al. |
| 2012/0108284 A1 | 5/2012 | Patel et al. |
| 2012/0122477 A1 | 5/2012 | Sadek et al. |
| 2012/0135724 A1 | 5/2012 | Lewis et al. |
| 2012/0184222 A1 | 7/2012 | Seok |
| 2012/0213086 A1 | 8/2012 | Matsuura et al. |
| 2012/0224574 A1 | 9/2012 | Hoymann et al. |
| 2013/0044028 A1 | 2/2013 | Lea et al. |
| 2013/0089037 A1 | 4/2013 | Negus et al. |
| 2013/0089041 A1 | 4/2013 | Negus et al. |
| 2013/0089042 A1 | 4/2013 | Negus et al. |
| 2013/0089083 A1 | 4/2013 | Negus et al. |
| 2013/0095765 A1 | 4/2013 | Greene |
| 2013/0100897 A1 | 4/2013 | Negus |
| 2013/0137444 A1 | 5/2013 | Ozluturk |
| 2013/0207841 A1 | 8/2013 | Negus et al. |
| 2013/0272217 A1 | 10/2013 | Negus et al. |
| 2013/0273974 A1 | 10/2013 | Lea et al. |
| 2013/0288593 A1 | 10/2013 | Norin et al. |
| 2013/0293419 A1 | 11/2013 | Negus et al. |
| 2014/0050126 A1 | 2/2014 | Naden |
| 2014/0184455 A1 | 7/2014 | Lea et al. |
| 2014/0184457 A1 | 7/2014 | Lea et al. |
| 2014/0329562 A1 | 11/2014 | Proctor, Jr. et al. |
| 2015/0016362 A1 | 1/2015 | Negus et al. |
| 2015/0016561 A1 | 1/2015 | Negus et al. |
| 2015/0049720 A1 | 2/2015 | Negus et al. |
| 2015/0084826 A1 | 3/2015 | Lea et al. |
| 2015/0156777 A1 | 6/2015 | Negus et al. |
| 2015/0194999 A1 | 7/2015 | Lea et al. |
| 2015/0200709 A1 | 7/2015 | Negus et al. |
| 2015/0223082 A1 | 8/2015 | Negus et al. |
| 2015/0223250 A1 | 8/2015 | Negus |
| 2015/0230105 A1 | 8/2015 | Negus et al. |
| 2015/0372738 A1 | 12/2015 | Negus et al. |
| 2016/0004522 A1 | 1/2016 | Connelly |
| 2016/0013831 A1 | 1/2016 | Lea et al. |
| 2016/0095107 A1 | 3/2016 | Negus et al. |
| 2016/0095121 A1 | 3/2016 | Negus et al. |
| 2016/0135191 A1 | 5/2016 | Negus et al. |
| 2016/0135192 A1 | 5/2016 | Negus |
| 2016/0192374 A1 | 6/2016 | Negus |
| 2016/0248467 A1 | 8/2016 | Lea et al. |
| 2016/0278093 A1 | 9/2016 | Negus et al. |
| 2016/0285532 A1 | 9/2016 | Negus et al. |
| 2016/0285611 A1 | 9/2016 | Fischer et al. |
| 2016/0316477 A1 | 10/2016 | Negus et al. |
| 2017/0026978 A1 | 1/2017 | Negus et al. |
| 2017/0118760 A1 | 4/2017 | Negus et al. |
| 2017/0126291 A1 | 5/2017 | Lea et al. |
| 2017/0127399 A1 | 5/2017 | Negus et al. |
| 2017/0127421 A1 | 5/2017 | Negus et al. |
| 2017/0251484 A1 | 8/2017 | Negus et al. |
| 2017/0317725 A1 | 11/2017 | Lea |
| 2017/0318482 A1 | 11/2017 | Negus |
| 2017/0318571 A1 | 11/2017 | Negus |
| 2017/0318589 A1 | 11/2017 | Negus |
| 2018/0084553 A1 | 3/2018 | Boyer |
| 2018/0092099 A1 | 3/2018 | Ishiguro |
| 2018/0145721 A1 | 5/2018 | Negus |
| 2019/0007950 A1 | 1/2019 | Negus |
| 2019/0044581 A1 | 2/2019 | Lea et al. |
| 2019/0045492 A1 | 2/2019 | Negus et al. |
| 2019/0159045 A1 | 5/2019 | Negus |
| 2019/0190565 A1 | 6/2019 | Negus et al. |
| 2019/0246402 A1 | 8/2019 | Negus et al. |
| 2019/0253903 A1 | 8/2019 | Lea et al. |

FOREIGN PATENT DOCUMENTS

| | | |
|---|---|---|
| EP | 2839693 | 2/2015 |
| EP | 2843863 A1 | 3/2015 |
| WO | WO 2007/146685 | 12/2007 |
| WO | WO 2008007375 A2 | 1/2008 |
| WO | WO 2011030960 A1 | 3/2011 |
| WO | WO 2011080299 A3 | 7/2011 |
| WO | WO 2013025413 A1 | 2/2013 |
| WO | WO 2013055947 A1 | 4/2013 |
| WO | WO 2013158237 A2 | 10/2013 |
| WO | WO 2014040083 A2 | 3/2014 |

OTHER PUBLICATIONS

"Advances in Backhaul Synchronization—Maximizing ROI," Application Brief, Symmetricom Inc., 2008, 6 pages.

"Carrier Ethernet Services Overview," Presentation, MEF, Aug. 2008, 32 pages.

"Clock Distribution and Synchronization over Ethernet: IEEE1588v2 and SyncE," Presentation, VITESSE, Sep. 2009, 9 pages.

"Clock Synchronization in Carrier Ethernet Networks—Synchronous Ethernet and 1588v2 on Juniper Networks MX Series 3D Universal Edge Routers," White Paper, Juniper Networks, Inc., 2010, 11 pages.

"DAN2400-PTP—Open SoC Platform for Sub-6GHz Wireless Point-to-Point Systems," DesignArt Networks, Jul. 2008, 2 pages.

"Doubling Capacity in Wireless Channels," Provigent Inc., 2008, 3 pages.

"Evolving Microwave Mobile Backhaul for Next-Generation Networks," White Paper, NEC Corp., Feb. 2008, 4 pages.

"GainSpan GS1011M Low Power Wi-Fi® Module Family," Product Brief—Preliminary, GainSpan Corp., 2009, 2 pages.

"HMC536MS8G / 536MS8GE—GaAs MMIC Positive Control T/R Switch, DC—6 GHz," Data Sheet, Switches—SMT, Hittite Microwave Corp., 2008, pp. 10.295-10.299.

"IEEE 1588v2 (Precision Time Protocol) Testing," Application Note, IXIA, Dec. 2009.

(56) References Cited

OTHER PUBLICATIONS

"Information Technology—Open Systems Interconnection—Basic Reference Model: The Basic Model," International Standard, ISO/IEC 7498-1, Second Edition Nov. 15, 1994, Corrected and Reprinted Jun. 15, 1996, 68 pages.
"MGA-21108—Broadband Fully Integrated Matched Low-Noise Amplifier MMIC," Data Sheet, Avago Technologies, Aug. 2009, 21 pages.
"MGA-22003—2.3-2.7 GHz 3x3mm WiMAX/WiBro and WiFi Linear Amplifier Module," Data Sheet, Avago Technologies, Mar. 2010, 15 pages.
"MGA-23003—3.3-3.8 GHz 3x3mm WiMAX Power Amplifier," Data Sheet, Avago Technologies, Mar. 2010, 16 pages.
"MGA-25203—5.1-5.9GHz 3x3mm WiFi and WiMAX Power Amplifier," Data Sheet, Avago Technologies, Mar. 2010, 14 pages.
"MGA-43328—High Linearity Wireless Data Power Amplifier for 2.5 to 2.7 GHz Applications," Application Note, Avago Technologies, Apr. 2010, 10 pages.
"MGA-43328—(2.5-2.7) GHz 29dBm High Linearity Wireless Data Power Amplifier," Data Sheet, Avago Technologies, Mar. 2010, 19 pages.
"MGA-645T6—Low Noise Amplifier with Bypass/Shutdown Mode in Low Profile Package," Data Sheet, Avago Technologies, Nov. 2009, 16 pages.
"MGA-655T6—Low Noise Amplifier with Bypass Mode in Low Profile Package," Data Sheet, Avago Technologies, Nov. 2009, 14 pages.
"MGA-675T6—Low Noise Amplifier with Shutdown Mode in Low Profile Package for 4.9-6 GHz Application," Data Sheet, Avago Technologies, Nov. 2009, 16 pages.
"Part 11: Wireless LAN Medium Access Control (MAC) and Physical Layer (PHY) Specifications—Amendment 5: Enhancements for Higher Throughput," IEEE Standard for Information Technology—Telecommunications and Information Exchange Between Systems—Local and Metropolitan Area Networks—Specific Requirements, IEEE Computer Society, IEEE Std 802.11, Sep. 2009, 536 pages.
"Part 11: Wireless LAN Medium Access Control (MAC) and Physical Layer (PHY) Specifications," IEEE Standard for Information Technology—Telecommunications and Information Exchange Between Systems—Local and Metropolitan Area Networks—Specific requirements, IEEE Computer Society, IEEE Std 802.11, Jun. 2007, 1233 pages.
"Part 16: Air Interface for Fixed and Mobile Broadband Wireless Access Systems—Amendment 2: Physical and Medium Access Control Layers for Combined Fixed and Mobile Operation in Licensed Bands and Corrigendum 1," IEEE Standard for Local and Metropolitan Area Networks, IEEE Computer Society and the IEEE Microwave Theory and Techniques Society, IEEE Std 802.16e—2005 and IEEE Std 802.16-2004/Cor1-2005, Feb. 2006, 864 pages.
"Part 16: Air Interface for Fixed Broadband Wireless Access Systems," IEEE Standard for Local and Metropolitan Area Networks, IEEE Std 802.16, IEEE Computer Society and the IEEE Microwave Theory and Techniques Society, Oct. 2004, 895 pages.
"PC203-PC203-10—Basestation PHY Processor," Wireless Communications Processors, Product Brief, picoChip Flexible Wireless, 2008, 4 pages.
"SC-FDMA—Single Carrier FDMA in LTE," Data Sheet, IXIA Corp., Nov. 2009, 16 pages.
"Spectrum Sharing: The Promise and the Reality", RYSAVY Research, LLC, White Paper, Jul. 2012, pp. 1-12, available at http://www.rysavy.com.
"Technical Report: Electromagenetic Compatibility and Radio Spectrum Matters (ERM); System Reference Document (SRdoc); Mobile Broadband Services in the 2 300 MHz-2 400 MHz frequency band under Licensed Shared Access Regime", ETSI TR 103 113 V1.1.1 (Jul. 2013), European Telecommunications Standards Institute, France, 2013, pp. 1-37.
"Understanding MPLS-TP and Its Benefits," White Paper, Cisco Systems Inc., 2009, 6 pages.

"Unified Mobile Backhaul," DesignArt Networks, Jan. 26, 2011, 8 pages.
"WiMAX/WiBro RF MxFE Transceiver, AD9352," Data Sheet, Analog Devices, 2007.
"WiMAX RF MxFE Transceiver, AD9352-5," Data Sheet, Analog Devices, 2008.
"WiMAX RF MxFE Transceiver, AD9353," Data Sheet, Analog Devices, 2007.
"WiMAX/WiBro RF MxFE MISO Transceiver, AD9354," Data Sheet, Analog Devices, 2008-2009.
"WiMAX/WiBro RF MxFE MISO Transceiver, AD9355," Data Sheet, Analog Devices, 2008-2009.
"WiMAX/BWA/WiBRO/LTE RF MxFE 2x2 MIMO Transceiver, AD9356," Data Sheet, Analog Devices, 2010.
"WiMAX/BWA/LTE RF MxFE 2x2 MIMO Transceiver, AD9357," Data Sheet, Analog Devices, 2010.
Baum, D.S. et al., "An Interim Channel Model for Beyond-3G Systems—Extending the 3GPP Spatial Channel Model (SCM)," IEEE, Vehicular Technology Conference, vol. 5, 2005, pp. 3132-3136.
Beller, D. et al., "MPLS-TP—The New Technology for Packet Transport Networks," Alcatel-Lucent Deutschland AG, Stuttgart, 2009, 11 pages.
Chundury, R., "Mobile Broadband Backhaul: Addressing the Challenge," Planning Backhaul Networks, Ericsson Review, 2008, pp. 4-9.
Conrat, J-M. et al., "Typical MIMO Propagation Channels in Urban Macrocells at 2 GHz,"EURASIP Journal on Wireless Communications and Networking, vol. 2007, Iss. 2, Jan. 2007, 9 pages.
Coon, J.P. et al., "Adaptive Frequency-Domain Equalization for Single-Carrier Multiple-Input Multiple-Output Wireless Transmissions," IEEE Transactions on Signal Processing, vol. 53, No. 8, Aug. 2005, pp. 3247-3256.
Coon, J.P. et al., "An Investigation of MIMO Single-Carrier Frequency-Domain MMSE Equalization," Centre for Communications Research, University of Bristol, Sep. 2002, 4 pages.
Durgin, G.D., "Wideband Measurements of Angle and Delay Dispersion for Outdoor and Indoor Peer-to-Peer Radio Channels at 1920 MHz," IEEE Transactions on Antennas and Propagation, vol. 51, No. 5, May 2003, pp. 936-944.
Falconer, D.D. et al., "Broadband Wireless Using Single Carrier and Frequency Domain Equalization," Invited Overview Paper for WPMC '02, Honolulu, Oct. 2002, 10 pages.
Falconer, D.D. et al., "Frequency Domain Equalization for Single-Carrier Broadband Wireless Systems," Wideband Wireless Access Technologies to Broadband Internet, IEEE Communications Magazine, Apr. 2002, pp. 58-66.
Frost, D. et al., "MPLS Transport Profile Data Plane Architecture," Internet Engineering Task Force, RFC 5960, Aug. 2010, 16 pages.
Gao, S.C. et al., "Dual-polarized slot coupled planar antenna with wide bandwidth," IEEE Trans. Antennas and Propagation, vol. 51, No. 3, pp. 441-448, 2003.
Garner, G.M., "IEEE 1588 Version 2," ISPCS Ann Arbor '08, Sep. 2008, 89 pages.
Hentschel, T. et al., "The Digital Front-End—Bridge Between RF and Baseband-Processing," Software Defined Radio: Enabling Technologies by Walter Tuttlebee, Chapter 6, Jun. 2002, 58 pages.
Lashkarian, N., "Reconfigurable Digital Front-end Architecture for Wireless Base-Station Transmitters: Analysis, Design and FPGA Implementation," Seminar Presentation, University of California, Berkeley, Apr. 2006, 86 pages.
Nathanzon, G. et al., "Cost-Effective Backhaul Alternatives for WiMAX Networks: Challenges & Solutions," Provigent Inc., Jun. 2008, 16 pages.
Padhi, S.K. et al., "A Dual Polarized Aperture Coupled Circular Patch Antenna Using a C-Shaped Coupling Slot," IEEE Transactions on Antennas and Propagation, vol. 51, No. 12, Dec. 2003, pp. 3295-3298.
Pancaldi, F. et al., "Single-Carrier Frequency Domain Equalization—A Focus on Wireless Applications," IEEE Signal Processing Magazine, Sep. 2008, 22 pages.
Pozar, D.M. et al.,"Improved coupling for aperature-coupled microstrip antennas," Electron. Lett., vol. 27, No. 13, pp. 1129-1131, 1991.

(56) References Cited

OTHER PUBLICATIONS

Pozar, D.M., "A microstrip antenna aperature-coupled to a microstripline," Electron. Lett., vol. 21, No. 2, pp. 49-50, 1985.

Sharony, J., "Introduction to Wireless MIMO—Theory and Applications," CEWIT—Center of Excellence in Wireless and Informational Technology, Stony Brook University, IEEE LI, Nov. 15, 2006, 63 pages.

Soffer, R., "Microwave Wireless Backhaul for LTE Networks—Meeting the Rapidly-Increasing Demand for Mobile Data," Provigent Inc., Jan. 2010, 18 pages.

Soffer, R., "ProviBand—Next Generation Wireless Backhaul Technology," Technical White Paper, Provigent Inc., Jan. 2006, 13 pages.

Stuber, G.L. et al., "Broadband MIMO-OFDM Wireless Communications," Invited Paper, Proceedings of the IEEE, vol. 92, No. 2, Feb. 2004, pp. 271-294.

Tubbax, J., "OFDM Versus Single Carrier with Cyclic Prefix: A System-based Comparison for Binary Modulation," IMEC, Belgium, Jan. 2011, 4 pages.

Part 1 of 2: "TV Whitespaces" reuse: A detailed description of the program is provided in FCC order FCC-10-174A1, and the rules for unlicensed devices that operate in the TV bands are set forth in 47 C.P.R. §§ 15.701-.717. See Title 47—Telecommunication; Chapter I—Federal Communications Commission; Subchapter A—General, Part 15—Radio Frequency Devices, Subpart H—Television Band Devices.

Part 2 of 2 (continued from above): (Available online at http://www.ecfr.gov/cgi-bin/text-idx?c=ecfr&SID=30f46f0753577b10de41d650c7adf941&rgn=div6&view=text&node=47:1.0.1.1.16.8&idno=47:1.0.1.1.16.8&idno=47, retrieved Feb. 25, 2015).

Partial European Search Report in European Patent Application No. 12839752.8, dated Jun. 16, 2015.

International Search Report and Written Opinion for PCT Application No. PCT/US2012/049948 dated Oct. 22, 2012.

International Search Report and Written Opinion for PCT Application No. PCT/US2012/059797 dated Jan. 2, 2013.

International Search Report and Written Opinion for PCT Application No. PCT/US2013/029731 dated May 13, 2013.

International Search Report and Written Opinion in PCT Application No. PCT/US013/48782, dated Jul. 29, 2013.

Extended European Search Report in European Patent Application No. 12824072.8, dated Jul. 15, 2015.

Extended European Search Report in European Patent Application No. 14177662.5, dated Feb. 3, 2015.

\* cited by examiner $$BW = \frac{70\lambda}{D} \qquad \text{(EQ. E-1C)}$$

where,
BW is the 3 dB Beamwidth,
λ is the wavelength, and
D is the diameter of the parabolic dish antenna

FIG. 1-C

| Diameter | Gain | Beamwidth (3dB) |
|---|---|---|
| 30cm | 44 dBi | 0.9° |
| 60cm | 51 dBi | 0.4° |

Fig. 1D

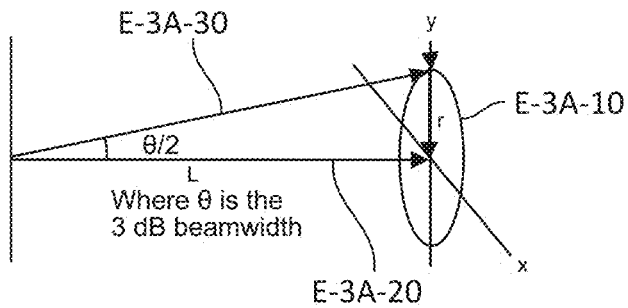
FIG. 3A
$$r = L * Tan\left(\frac{\theta}{2}\right) \qquad (EQ.\ E\text{-}3B)$$
FIG. 3B
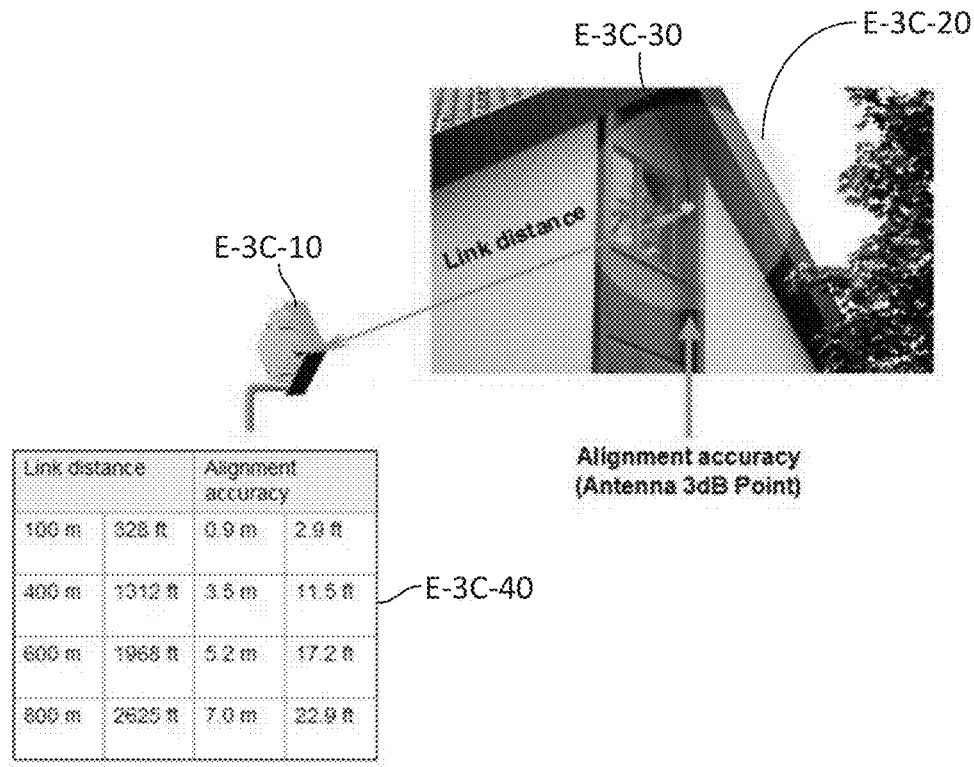
FIG. 3C

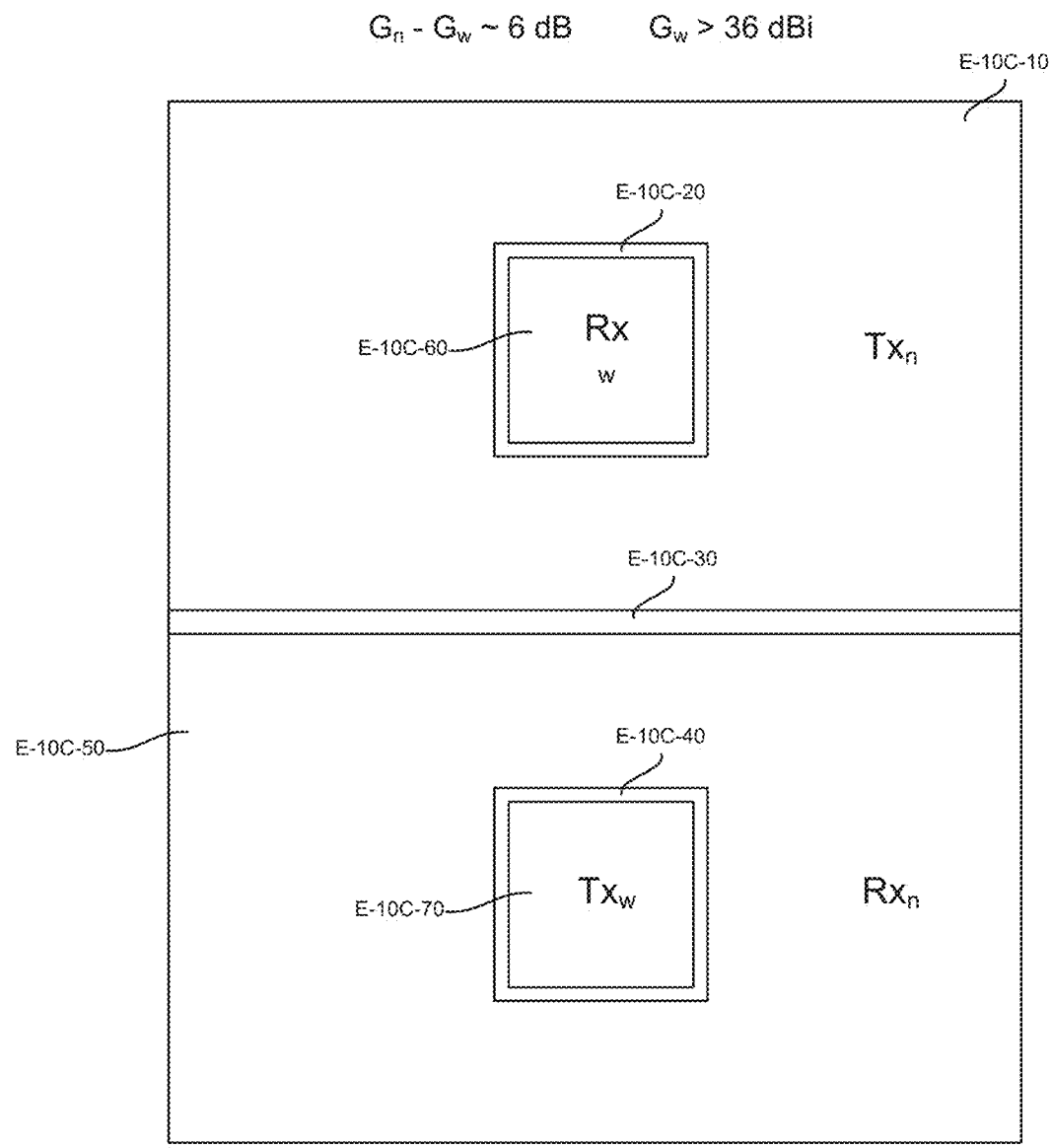
FIG. 10-C

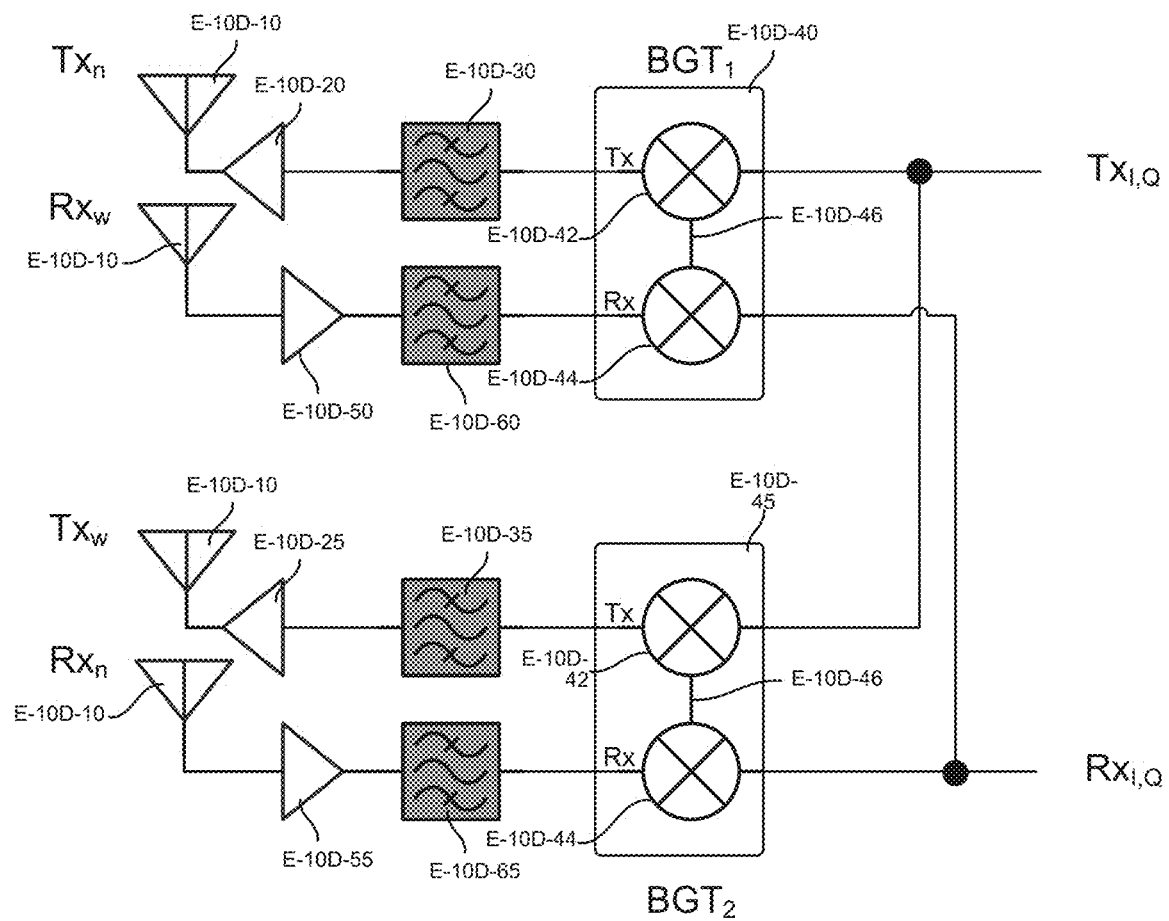
FIG. 10-D

FIG. E-18B $$\theta = \pm \sin^{-1}\left(\frac{\lambda}{2d}\right) \qquad \text{EQ. E-18C}$$

4 elements separated by 60 cm at 5.8 GHz 3 elements, 5.8 GHz, at 60 cm

ELECTRONIC ALIGNMENT USING SIGNATURE EMISSIONS FOR BACKHAUL RADIOS

CROSS-REFERENCE TO RELATED APPLICATIONS

The present application is a Continuation-in-part of U.S. patent application Ser. No. 15/403,090, filed on Jan. 10, 2017, which is a Continuation of U.S. patent application Ser. No. 15/084,867, filed on Mar. 30, 2016, now U.S. Pat. No. 9,577,733, which is a Continuation of U.S. patent application Ser. No. 14/839,018, filed on Aug. 28, 2015, now U.S. Pat. No. 9,325,398, which is a Continuation of U.S. patent application Ser. No. 13/934,175, filed on Jul. 2, 2013, now U.S. Pat. No. 9,179,240, which is a Continuation of U.S. patent application Ser. No. 13/371,346, filed on Feb. 10, 2012, now U.S. Pat. No. 8,502,733, the disclosures of which are hereby incorporated herein by reference in their entireties.

The present application is also a Continuation-in-part of U.S. patent application Ser. No. 15/398,174, filed on Jan. 4, 2017, which is a Continuation of U.S. patent application Ser. No. 15/165,504, filed May 26, 2016, now U.S. Pat. No. 9,572,163, which is a Continuation of U.S. patent application Ser. No. 14/950,354, filed on Nov. 24, 2015, now U.S. Pat. No. 9,374,822, which is a Continuation of U.S. patent application Ser. No. 14/552,431, filed on Nov. 24, 2014, now U.S. Pat. No. 9,226,295, which is a Continuation of U.S. patent application Ser. No. 13/748,544, filed on Jan. 23, 2013, now U.S. Pat. No. 8,942,216, which is a Continuation of U.S. patent application Ser. No. 13/448,294, filed on Apr. 16, 2012, now U.S. Pat. No. 8,385,305, the disclosures of which are hereby incorporated herein by reference in their entireties.

The present application is also a Continuation-in-part of U.S. patent application Ser. No. 15/408,364, filed on Jan. 17, 2017, which is a Continuation of U.S. patent application Ser. No. 15/142,793, filed Apr. 29, 2016, now U.S. Pat. No. 9,577,700, which is a Continuation of U.S. patent application Ser. No. 14/837,797, filed on Aug. 27, 2015, now U.S. Pat. No. 9,350,411, which is a Continuation of U.S. patent application Ser. No. 14/632,624, filed on Feb. 26, 2015, now U.S. Pat. No. 9,178,558, which is a Continuation of U.S. patent application Ser. No. 14/336,958, filed on Jul. 21, 2014, now U.S. Pat. No. 9,001,809, which is a Continuation of U.S. patent application Ser. No. 13/898,429, filed on May 20, 2013, now U.S. Pat. No. 8,824,442, which is a Continuation of U.S. patent application Ser. No. 13/536,927, filed on Jun. 28, 2012, now U.S. Pat. No. 8,467,363, which is a Continuation-in-part of U.S. patent application Ser. No. 13/371,366, filed on Feb. 10, 2012, now U.S. Pat. No. 8,311,023, which is a Continuation of U.S. patent application Ser. No. 13/212,036, filed on Aug. 17, 2011, now U.S. Pat. No. 8,238,318, the disclosures of which are hereby incorporated herein by reference in their entireties.

The present application is also a Continuation-in-part of U.S. patent application Ser. No. 15/470,080, filed on Mar. 27, 2017, which is a Continuation of U.S. patent application Ser. No. 14/559,859, filed on Dec. 3, 2014, now U.S. Pat. No. 9,609,530, which is a Continuation of U.S. patent application Ser. No. 14/197,158, filed on Mar. 4, 2014, now U.S. Pat. No. 8,928,542, which is a Continuation-in-part of U.S. patent application Ser. No. 13/645,472, filed on Oct. 4, 2012, now U.S. Pat. No. 8,811,365, which is a Continuation of U.S. patent application Ser. No. 13/371,366, filed on Feb. 10, 2012, now U.S. Pat. No. 8,311,023, which is a Continuation of U.S. patent application Ser. No. 13/212,036, filed on Aug. 17, 2011, now U.S. Pat. No. 8,238,318, the disclosures of which are hereby incorporated herein by reference in their entireties.

The present application is also a Continuation-in-part of U.S. patent application Ser. No. 14/624,365, filed on Feb. 17, 2015, which is a Continuation-in-Part application of U.S. patent application Ser. No. 14/502,471, filed on Sep. 30, 2014, which is a Continuation-in-part of U.S. patent application Ser. No. 14/098,456, filed on Dec. 5, 2013, now U.S. Pat. No. 8,989,762, and is a Continuation-in-part of U.S. patent application Ser. No. 14/337,744, filed on Jul. 22, 2014, now U.S. Pat. No. 9,055,463, which is a Continuation U.S. patent application Ser. No. 13/645,472, filed on Oct. 4, 2012, now U.S. Pat. No. 8,811,365, which is a Continuation of U.S. application Ser. No. 13/371,366, filed on Feb. 10, 2012, now U.S. Pat. No. 8,311,023, which is a Continuation of U.S. patent application Ser. No. 13/212,036, filed on Aug. 17, 2011, now U.S. Pat. No. 8,238,318, the disclosures of which are hereby incorporated herein by reference in their entireties.

The present application is also a Continuation-in-part application of U.S. patent application Ser. No. 14/983,059, filed on Dec. 29, 2015, which is a Continuation of U.S. patent application Ser. No. 14/535,972, filed on Nov. 7, 2014, now U.S. Pat. No. 9,252,857, which is a Continuation of U.S. patent application Ser. No. 14/146,891, filed on Jan. 3, 2014, now U.S. Pat. No. 8,897,340, which is a Continuation of U.S. patent application Ser. No. 13/763,530, filed on Feb. 8, 2013, now U.S. Pat. No. 8,649,418, the disclosures of which are hereby incorporated herein by reference in their entireties.

The present application is also a Continuation-in-part application of U.S. patent application Ser. No. 15/291,968, filed on Oct. 12, 2016, which is a Continuation of U.S. patent application Ser. No. 14/572,725, filed on Dec. 16, 2014, now U.S. Pat. No. 9,490,918, which is a Continuation of U.S. patent application Ser. No. 14/108,200, filed on Dec. 16, 2013, now U.S. Pat. No. 8,948,235, which is a Continuation of U.S. patent application Ser. No. 13/767,796, filed on Feb. 14, 2013, now U.S. Pat. No. 8,638,839, which is a Continuation of U.S. patent application Ser. No. 13/609,156, filed on Sep. 10, 2012, now U.S. Pat. No. 8,422,540, which also claims priority to U.S. Provisional Patent Application Nos. 61/663,461, filed on Jun. 22, 2012 and 61/662,809, filed on Jun. 21, 2012, the disclosures of which are hereby incorporated herein by reference in their entireties.

This application claim priority to U.S. provisional patent application No. 62/361,959, filed on Jul. 13, 2016, the entirety of which is hereby incorporated by reference.

BACKGROUND

Field

The present disclosure relates generally to data networking and in particular to a backhaul radio for connecting remote edge access networks to core networks and an associated antenna system.

Related Art

Point-to-Point (P2P) backhaul links, for example in use for connectivity between a cellular base station and a wired network or in other networking applications, are in significant use in the industry. Examples of such a point-to-point radio are the High Capacity 60 GHz Band Radio "LIBERA- TOR V1000" (see http://www.fastbacknetworks.com/v-band/ and FIG. 1H), and the High Capacity 70/80 GHz Band Radio "Liberator E100e" (see http://www.fsatback.networks.com/liberator-e1000e/ and FIG. 1A). However, the installation and maintenance of the alignment of the typically high gain and highly directive antennas associated with such products prove time consuming and costly, requiring skilled technicians. FIGS. E-1A through E-4B provide a background of the technologies and processes typically in use presently in the industry.

FIG. 1A depicts an E band radio for use in point-to-point backhaul links in one embodiment. The present depiction provides for a radio unit E-1A-40 with a parabolic reflector antenna E-1A-10 that has a 30-centimeter diameter. The radio unit is mounted to pole E-1A-20 by mounting bracket E-1A-30. This specific product is the Liberator E1000e provided by Fastback Networks.

FIG. 1B depicts a parabolic antenna with the reflector surface E-1B-10 having a Diameter (D) E-1B-40 and a depth (d) E-1B-30 in a focus or focal point E-1B-20. The main antenna beam width of a parabolic reflector antenna may be approximated using equation E-1C that is shown in FIG. 1C. The equation defines the angular range (3 dB beam width) of the main lobe of a radiation pattern.

The beam width (BW) is equal to $70*\lambda/D$, where $\lambda$ is the wavelength of the signal being transmitted, and D is the diameter of the parabolic dish antenna. The 3 dB beam width is defined as the points within the radiation pattern, which are three decibels (dB) lower than the peak radiation point of the main lobe.

FIG. 1D is an example E band parabolic reflector gain at 3 dB beam widths for specific diameters of parabolic reflectors. For instance, a 30-centimeter diameter in the present example as 44 dBi of gain and a 3 dB beam width of about 0.9 degrees. Whereas a 60-centimeter diameter parabolic reflector antenna has a gain of 51 dBi and a 3 dB beam width of about 0.4 degrees.

FIG. 1E depicts an exemplary normalized antenna radiation pattern for a 60-centimeter Diameter E band parabolic reflector. The X-axis shows the radiation pattern relative to the angle in degrees respective to the bore sight or center axis of the antenna. The Y-axis represents the normalized gain in dB. The peak radiation pattern is designated as E-1E-10 at 0 degrees. The 3 dB point is designated at E-1E-20 and the 3 dB beam width is about 0.5 degrees in the present example. Side lobe E-1E-30 has a gain of −18.4 dB relative to the peak-normalized gain and is located at −0.787 degrees.

FIG. 1F is an image of an exemplary E band radio with a 60-centimeter parabolic reflector antenna including an optical alignment scope attachment for use in initial installation for aiming or aligning the parabolic reflector with the remote radio for use in a point-to-point link in one embodiment. Reflector E-1F-10 is the 60-centimeter parabolic reflector antenna. Radio E-1F-40 is mounted to Pole E-1F-20 utilizing Mounting Bracket E-1F-30. The optical alignment scope is identified as E-1F-50. The optical alignment scope is mounted to Bracket E-1F-30 and is in mechanical registration with Radio E-1F-40 so as to allow azimuth and elevation adjustments to the radio to also be corresponding adjustments to the optical alignment scope. In this way, making adjustments using a screwdriver and a worm screw, which change elevation or azimuth of the radio, will likewise change elevation or azimuth alignment of the optical scope.

In some installations, use of an optical alignment scope can be problematic because mechanical clearance to utilize the scope may not be possible due to mechanical obstruction. For example, an installer may not have the room to fit between an interfering structure such as a wall and the optical alignment scope viewing port. In some installations, physical obstructions around almost every portion of the radio and parabolic reflector may be present, making the use of an optical alignment scope virtually impossible.

FIG. 1G is an example of a V band V-1000 array antenna pattern provided by Fastback Networks that is commercially available. The bore sight radiation peak designated at E-1G-10 is shown at 0 degrees on the plot. The 3 dB point of the radiation pattern is designated by E-1G-20 and has a 3 dB beam width of about 1.5 degrees. The first side lobe on the left-hand side is designated as E-1G-30 and has a peak radiation of −18.5 dB and is located at −2.35 degrees relative to bore sight. The foregoing radiation patterns are for example purposes only and may vary in alternative embodiments.

FIG. 1E is a photograph of an exemplary V band antenna and radio integrated in a single V-1000 product. V band Radio E-1H-40 is mounted to Pole E-1H-20 utilizing Mounting Bracket E-1H-30. The radiating antenna array aperture of the V band Radio E-1H-40 is designated as E-1H-10 with the peak radiation perpendicular to the surface of E-1H-10. Optical Alignment Scope E-1H-50 is in mechanical registration with the V band V-1000 Radio E-1H-40 such that adjustments to azimuth and elevation made using Mounting Bracket E-1H-30 are jointly made between the optical alignment scope and the V band radio. As discussed with FIG. 1-F associated with the E band radio and Optical Alignment Scope E-1F-50, mechanical obstruction may occur associated with V band Radio E-1H-40 and interfere with the use of the Optical Alignment Scope E-1H-50.

FIG. 2A depicts an installation process using an optical alignment scope where an installer will peer through an optical alignment scope at one end of a link to utilize line of sight alignment to a peer radio mounted elsewhere. During installation it is important for highest performance radio link operation that the area around the line of sight link between the two radios be clear of obstructions within an area designated as the Fresnel zone. For example, the depicted crane is close to violating the Fresnel zone but is within acceptable distance so as to not impact the line of sight link. However, if the crane or the water tower depicted in FIG. 2A were to impinge upon the Fresnel zone clearance area, reflections or diffraction of transmitted signal from these structures may create multiple propagation paths or "multipath." Such multipath may cause fading or undesirable channel propagation characteristics for the line of sight communication link.

While many mobile wireless systems operate with propagation channels having significant multipath, typical E band or V band or other backhaul links generally are configured such that their radio links exclude multipath propagation channels and allow for higher performance radio links or simplified hardware architectures and potentially higher speed data rates. In some embodiments however non-line of sight or "near" line of sight operation is possible through the use of equalization or other adaptive techniques utilizing advanced waveforms such as OFDM, CDMA or other wireless modulations or techniques to mitigate the effects of multipath propagation. Further techniques many be utilized to reduce the impact, or even benefit from the multipath environment including spatial division multiple access (SDMA), multiple input multiple output (MIMO), or cooperative spatial multiplexing wireless techniques (CoSDM, CoMIMO). However, it should be understood that most links within E band and V band and other point-to-point wireless data links do not use such techniques.

FIG. 2B provides a view of what an installer would see when looking through an exemplary optical alignment scope during the installation process when trying to locate a desired peer data link radio during establishment and initial configuration process.

FIG. 2C shows exemplary azimuthal and elevation adjustments utilized in aligning a line of sight wireless link, for example in a V band V-1000 product. E-2C-40 is a V band radio in one embodiment and similar to the V-1000 depicted in FIG. 1E as E-1E-40. Mounting Pole E-2C-30 is utilized to secure the radio. The bracket utilized to mount the Radio E-2C-40 to Pole E-2C-30 was designated in FIG. 1E as Bracket E-1E-30 and can be seen in FIG. 2C as E-2C-35. Two screws are present on Bracket E-2C-35, one of which will make elevation changes designated as E-2C-10 and the other will make azimuthal changes or adjustments designated as E-2C-20.

FIG. 2D depicts a manual exemplary search pattern in azimuth and elevation for use in aligning the V-1000 or other point-to-point radio links. In many known systems a feedback signal is provided by the radio as an audio tone in pitch or a voltage level, providing feedback in terms of a received signal strength indication or other alignment metric so as to indicate to an installer a detected signal from a peer radio in the point-to-point link. The resulting feedback allows the installer to understand when the radio has detected a received signal from the peer during search pattern E-2D-20 within the search space E-2D-10. At such a point the installer will cease their search pattern, in one example, and then search in an azimuth and elevation range around the detected alignment so as to attempt to maximize the received signal power levels. In some products a graphical feedback utilizing LEDs or a web page is possible while in others, simply a voltage level or other indicator of received signal strength or other alignment metric is known. However, as can be understood by one of ordinary skill in the art, such manual searching without guidance as to which direction, within the available degrees of freedom, adjustments should be made can result in lengthy and imprecise process during the installation. Such an installation process requires skilled labor in the form of experienced technicians, which may be in limited availability resulting in limitations in the ability to quickly deploy large numbers of the point-to-point links as well as increased expense associated with such deployments.

Furthermore, if care is not taken, minor adjustments in elevation and azimuth may result in significant changes in received signal strength. For example, the antenna beam patterns depicted and discussed previously associated with FIG. 1D and FIG. 1E demonstrate the significant changes in received power that may occur between very small adjustments in the angular alignment. For example, the 60-centimeter E band pattern of FIG. 1E would have in excess of 15 dB received signal strength change over a peak alignment to misalignment of a half of a degree. While 15 dB would be noticeable to most installers, misalignments of a quarter of a degree can result in 3 to 6 dB of received signal power differences. Such differences are important in terms of increased transmission power and interference to other wireless links. For example, many point-to-point links utilize adaptive transmission power control adjustments so as to transmit power levels from one radio so that they are received with sufficient but not excessive power or signal to noise ratio at the intended receiving radio. Such processes often utilize feedback from the intended receiver to the transmitter on a return link. If an antenna is misaligned so as to cause a reception 6 dB lower at the intended receiver, such power control systems and techniques would result in the transmitting point-to-point radio being required to transmit 6 dB more power than would otherwise be necessary. Such increase in transmission power may result in distortion of the transmitted waveform limiting performance in some embodiments or they may cause interference to other radios operating in separate point-to-point links but within the radiation pattern of the transmitting antenna. Such interference may be reduced by up to 6 dB with proper alignment. Additionally, an increased transmission power will require additional power consumption and expense for the operation of the point-to-point link. Additionally, operating a radio at a higher power levels may impact the mean time to failure or other reliability aspects of the deployed equipment.

Referring now to FIG. 3A a depiction of the size of the main lobe or the 3 dB beam width of an antenna beam pattern is depicted at Radius r at a downrange Distance L where the 3 dB "spot pattern" is designated at E-3A-10 at a Distance L (E-3A-20) within the main beam pattern and designated by E-3A-30.

Equation E-3B within FIG. 3B is a formula to calculate the radius "r" of the 3 dB antenna beam pattern at a down range distance L as a function of the 3 dB beam width depicted as "θ" in both FIG. 3A and FIG. 3B.

FIG. 3C is a graphical depiction and an exemplary alignment accuracy requirement to achieve antenna gain within 3 dB of the maximum achievable gain at various link distances for a specific exemplary antenna. Point-to-point radio E-3C-10 is in communication with a peer radio designated by E-3C-30. Circle E-3C-20 designates the 3 dB beam width at the link distance. Table E-3C-40 provides examples, for an exemplary antenna, of the size of the 3 dB alignment accuracy circle E-3C-20 at various link distances. For example, at 100 meters the alignment must be within 0.9 meters of the peak alignment to achieve a received signal level within 3 dB of the maximum possible. In contrast to this, at 800 meters link distance the alignment accuracy must be within 7 meters to achieve a 3 dB RSSI within the maximum possible for that particular link.

FIG. 4A and FIG. 4B provide examples of non-ideal effects for point-to-point wireless links wherein the physical structure, the mounting pole or other structure experience mechanical movement due to wind loading, mechanical vibration, or other factors. For example, Pole E-1E-20 of FIG. 1E or Pole E-1F-20 of FIG. 1F or Pole E-1A-20 of FIG. 1A sway or twist due to mechanical vibration, wind blowing or other mechanical loading. In FIG. 4A the antenna environmental misalignment terminology is defined as pole swaying and twisting (sway and twist). Exemplary angular deflection tolerances for various frequencies and antenna sizes or directivities are provided within the associated table for various resulting maximum gain losses as the antenna alignment is varied due to the mechanical effects. Swaying and twisting result in misalignment of the antenna beam pattern. As noted, the antenna pattern of the 60 centimeter parabolic reflector of FIG. 1E has a 3 dB bandwidth of about 0.5 degrees (E-1E-20). Therefore, swaying or twisting which misaligns the antenna by more than a quarter of a degree from initially perfect alignment would result in a loss of gain by more than 3 dB.

As shown in the table of FIG. 4A at 5.8 gigahertz in a 60-centimeter antenna deflection of 3.3 degrees is required to experience at least a 3 dB loss (assuming initially perfect alignment). In contrast, for the same physical antenna size of 60 cm, an 80 GHz signal and associated beam width would require only 0.25 degrees for a similar loss. For 10 dB loss, a maximum deflection of 5.5 degrees at 5.8 gigahertz would be required. At 80 gigahertz a 30-centimeter antenna has a wider beam width than that of the 60 centimeter. As a result, a 3 dB loss would be experienced for a 0.4 degree deflection rather than a 0.25 degree deflection as with the previous example.

Referring now to FIG. 4B, examples of twist and sway typical of differing structures are provided. For example, a building that's greater than 30 stories may experience a maximum of 0.05 degrees as an example while a monopole such as those previously discussed may experience 2 to 3 degrees of twist and sway. Such mechanical deflections based on the type of structure to which the antenna is mounted must be considered when a point-to-point link is installed and alignment of the antenna. A specific precision of alignment may be required for some antenna beam widths when combined with an amount of inherent twist and sway so as to not incur excessive power variation at the receiver due to resulting misalignment of the antenna beam pattern. For example, with a mechanical twist and sway of 0.25 degrees, as discussed, where a 60-centimeter E Band reflector must be installed with initial perfect alignment so as to experience a maximum of 3 dB signal loss as twist and sway occurs. However, in the same configuration, if the initial installation were aligned a quarter of a degree from peak alignment it will be noted that the twist and sway will cause significant loss in excess of 10 to 15 dB when the structure sways away from initial alignment. As a result, one can understand that antenna beam width selection as well as initial alignment accuracy can be critical in specific examples.

However, it is known that "perfect alignment" can be extremely difficult to achieve even for skilled technicians.

FIG. E-1G is an example of a V band array antenna pattern.

Figure 1B:
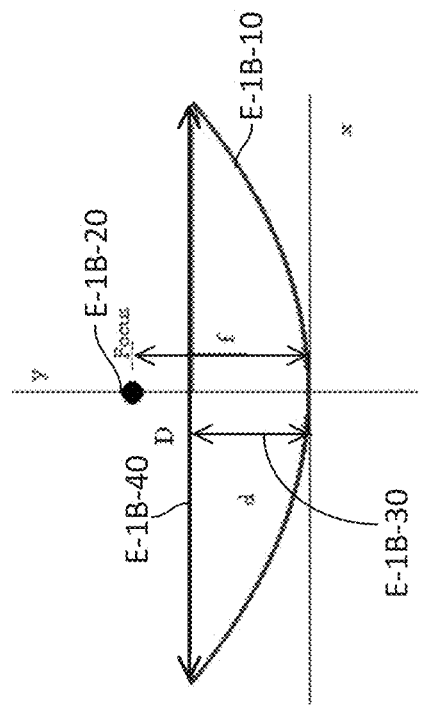
FIG. 1B is an exemplary depiction of a parabolic reflector providing typical reference terms.
Figure 1A:
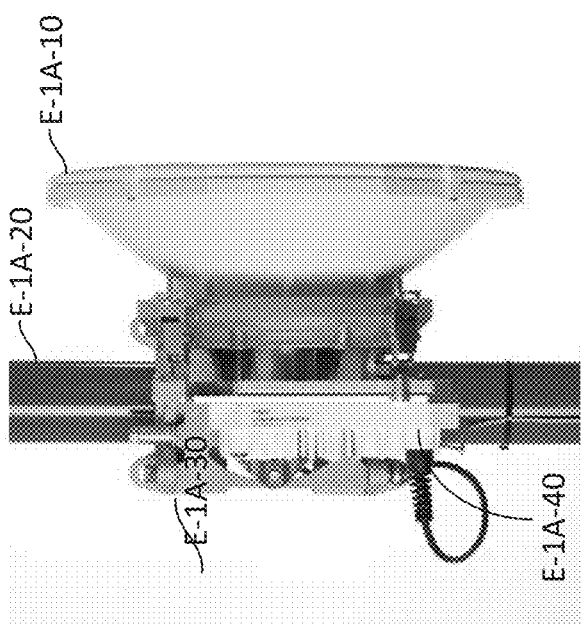
FIG. 1A is an exemplary depiction of an E-Band radio with an integrated parabolic reflector antenna.
Figure 1E:
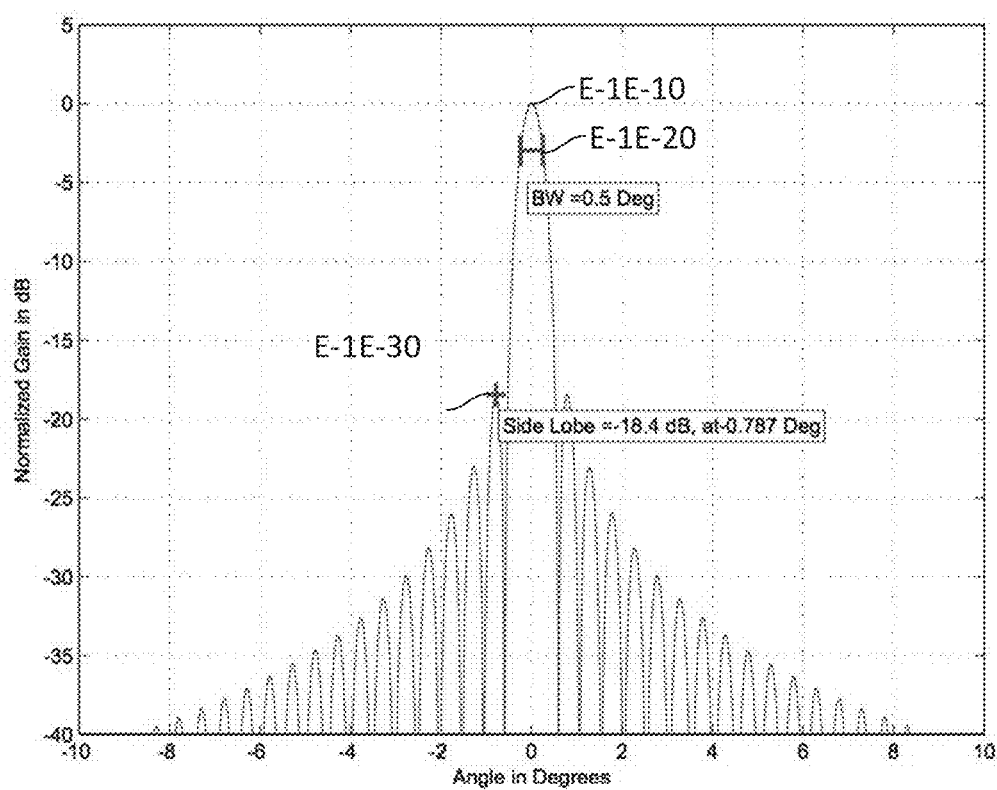
FIG. 1E is an exemplary normalized antenna pattern for a 60 cm E-band parabolic reflector over ±20 degrees from "antenna bore sight."
Figure 1F:
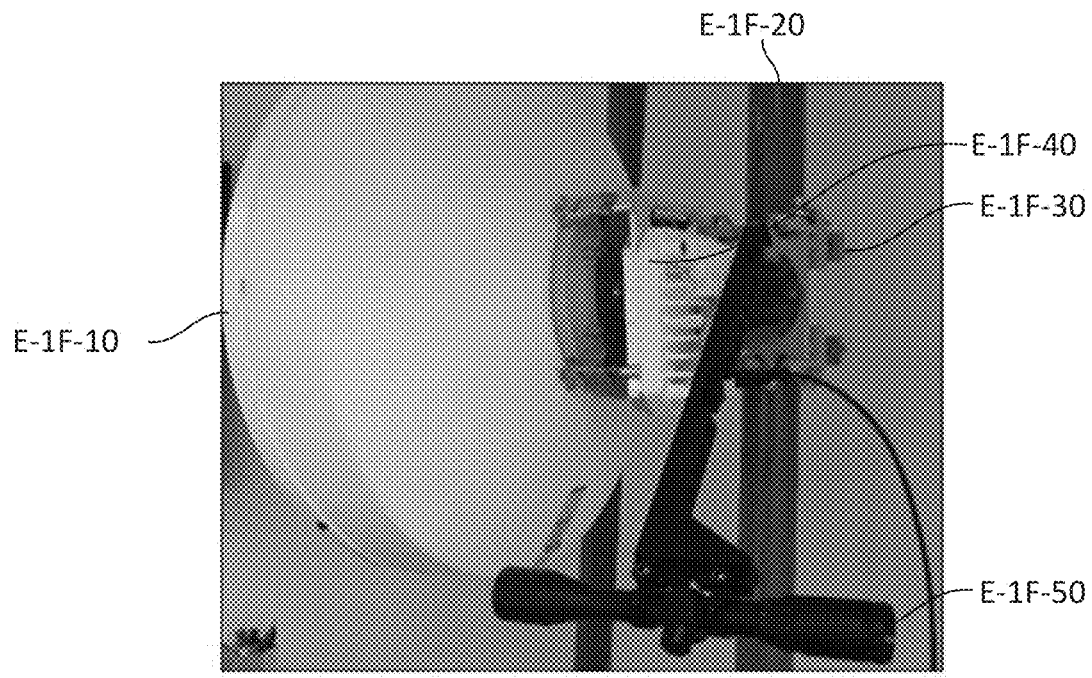
FIG. 1F is an exemplary depiction of an E-Band radio with an integrated 60 cm parabolic reflector antenna including an optical alignment scope attachment.
Figure 1G:
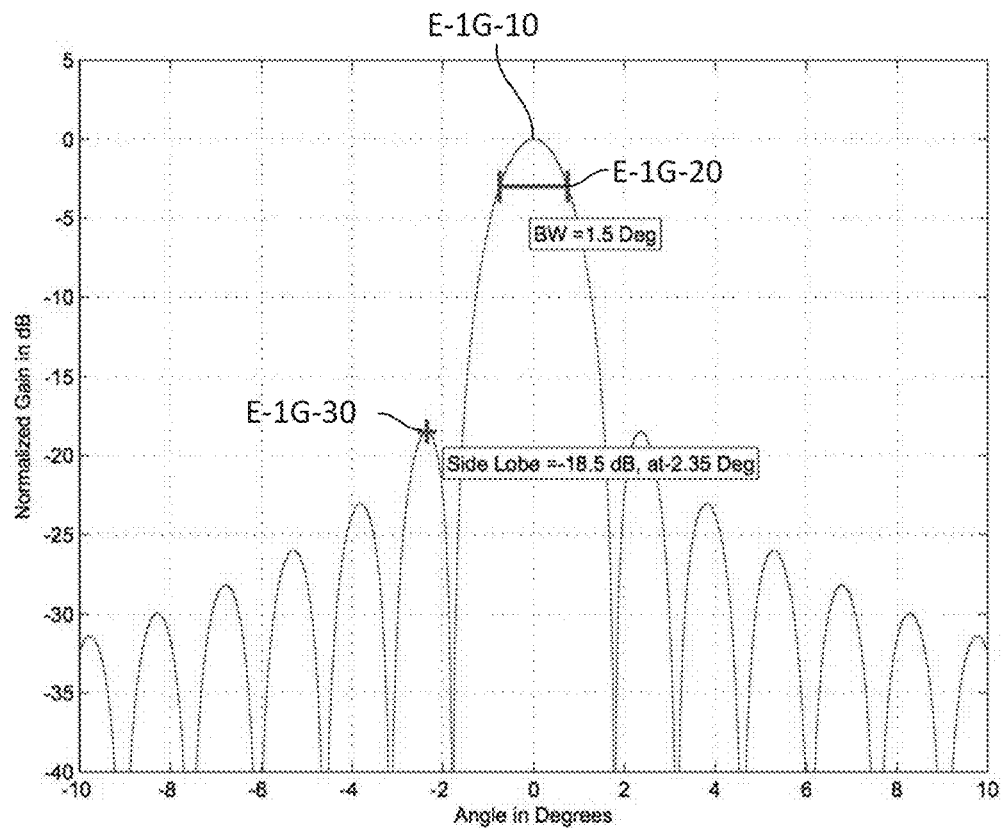
FIG. 1C provides an equation (EQ. E-1C) and associated definitions for an approximation for the antenna beam width of a parabolic dish Antenna.
FIG. 1D is an exemplary table of E-Band Parabolic Reflector diameters and associated antenna Gain and 3 dB radiation pattern beam widths.
Figure 1H:
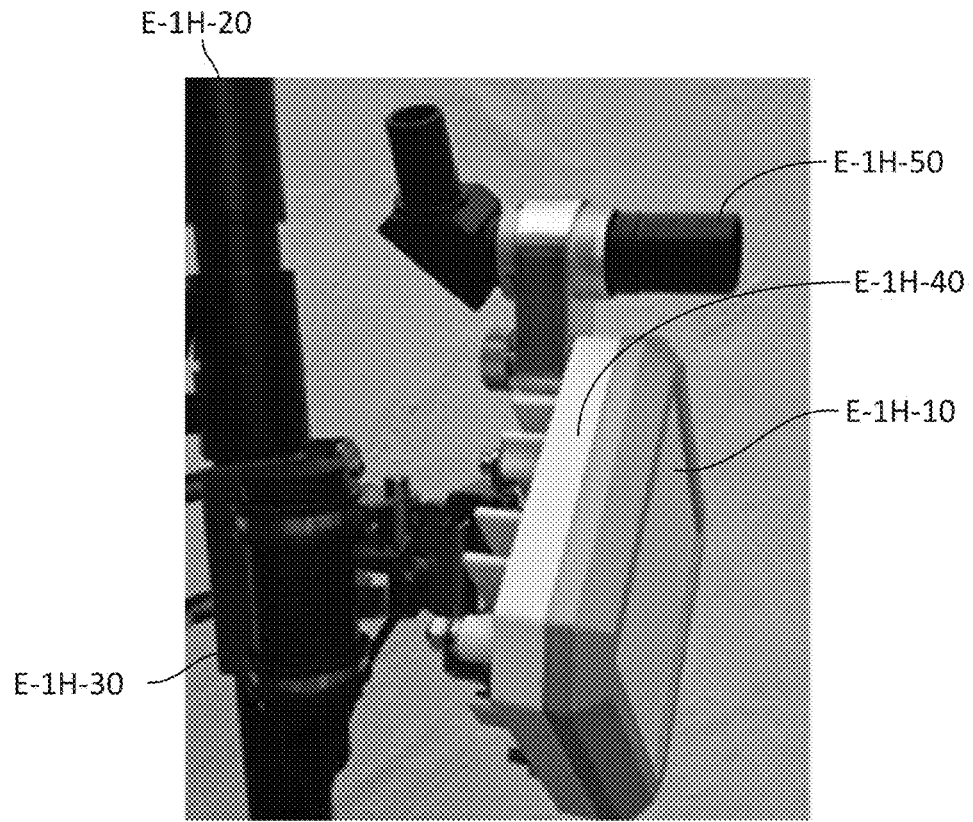

FIG. 1H is an exemplary depiction of a V band radio with an integrated array antenna including an optical alignment scope attachment.

Figure 2A:
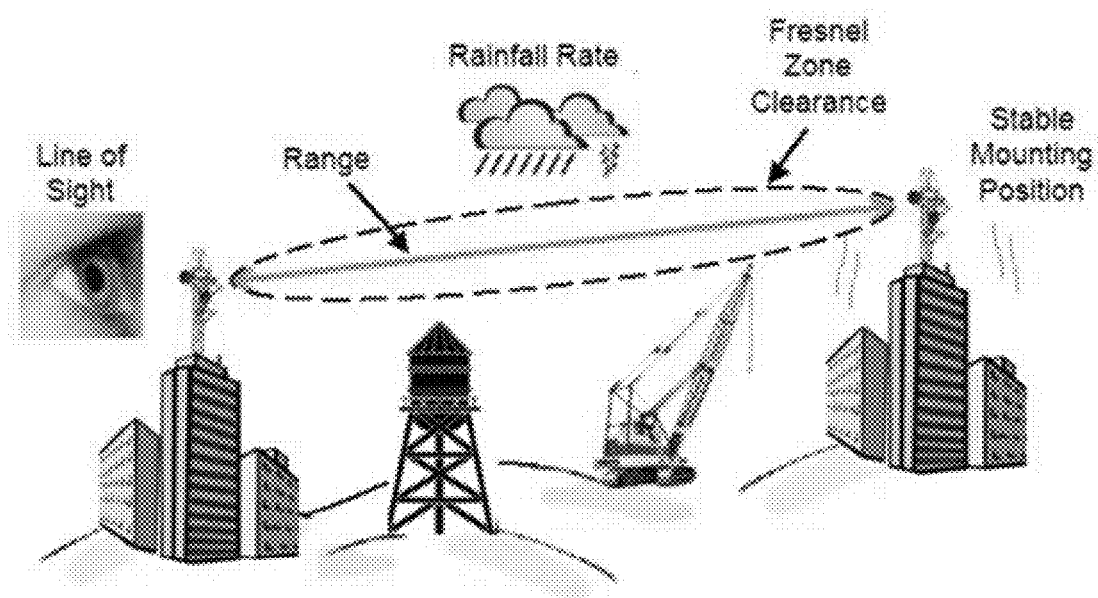

FIG. 2A provides an exemplary depiction of the use of an optical scope to align a line-of-sight link.

Figure 2B:

FIG. 2B provides an exemplary view of through an optical scope for use in aligning a line of sight link.

Figure 2C:
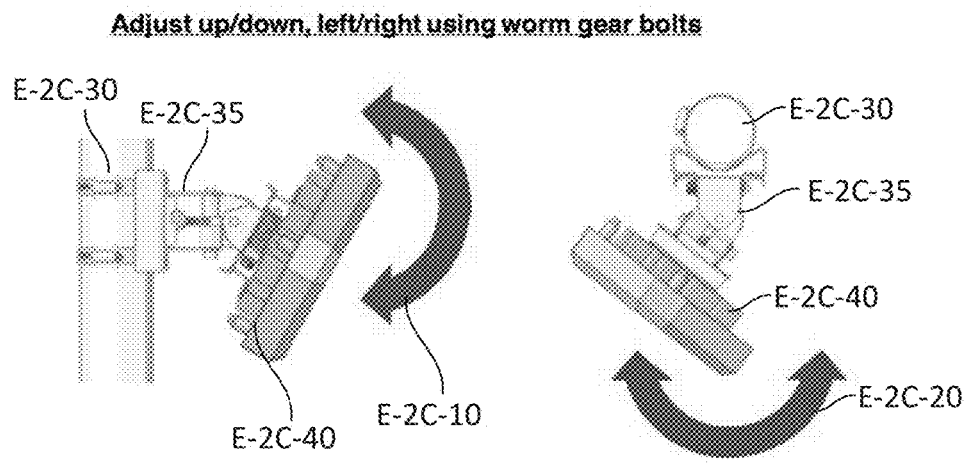

FIG. 2C provides a depiction of azimuthal and elevation adjustments utilized in aligning a line-of-sight wireless link.

Figure 2D:
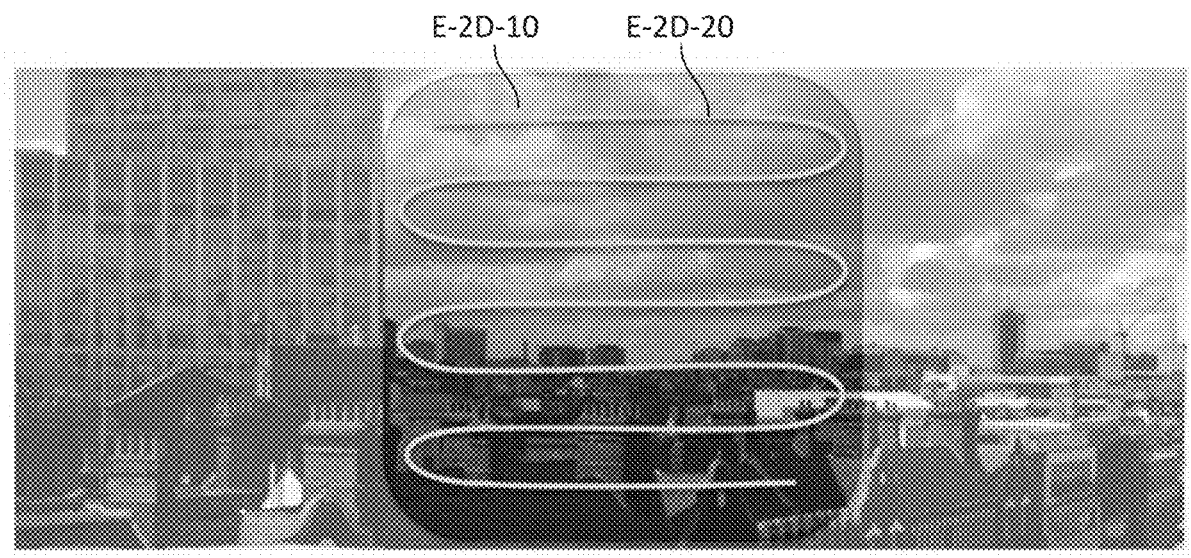

FIG. 2D provides an exemplary manual azimuth and elevation alignment search path for use in aligning a line-of-sight wireless link.

FIG. 3A provides a depiction of the size of the "3 dB" antenna beam pattern as the radius "r" relative to the downrange distance "L", as a function of 3 dB beam width "θ."

FIG. 3B provides a formulation of the size of the "3 dB" antenna beam pattern as the radius "r" relative to the downrange distance "L", as a function of 3 dB beam width "θ."

FIG. 3C provides a graphical depiction and exemplary alignment accuracy requirements to achieve antenna gain within 3 dB of the maximum achievable gain at various link distances for a specific exemplary antenna.

Figure 4A:
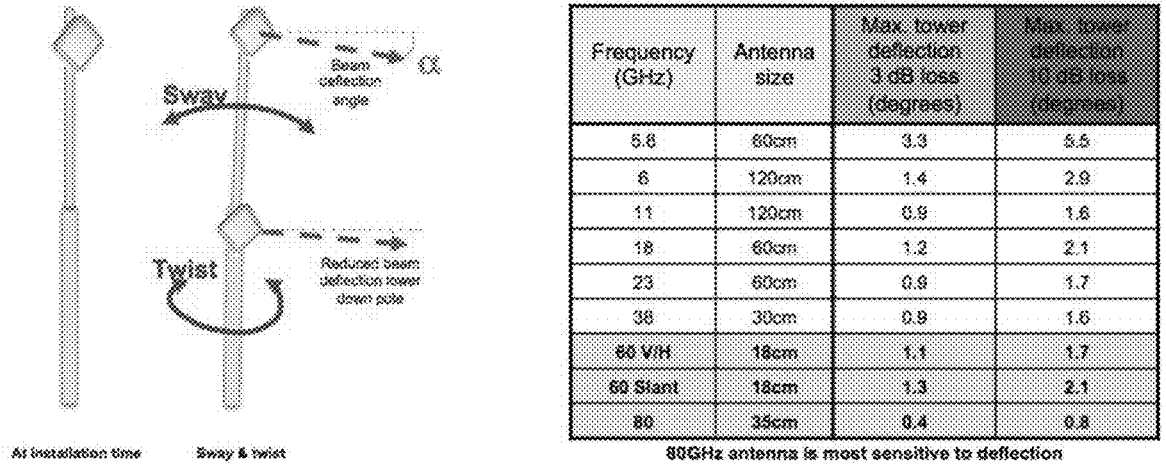

FIG. 4A depicts antenna environmental misalignment terminology and exemplary angular deflection tolerances for various frequencies, antenna sizes and maximum gain loss.

Figure 4B:
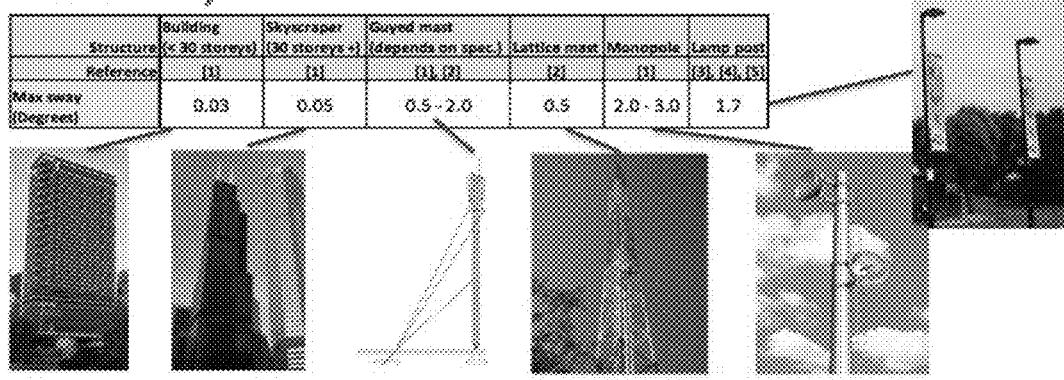

FIG. 4B provides exemplary environmental twist and sway misalignment in degrees for various structures.

Figure 5:
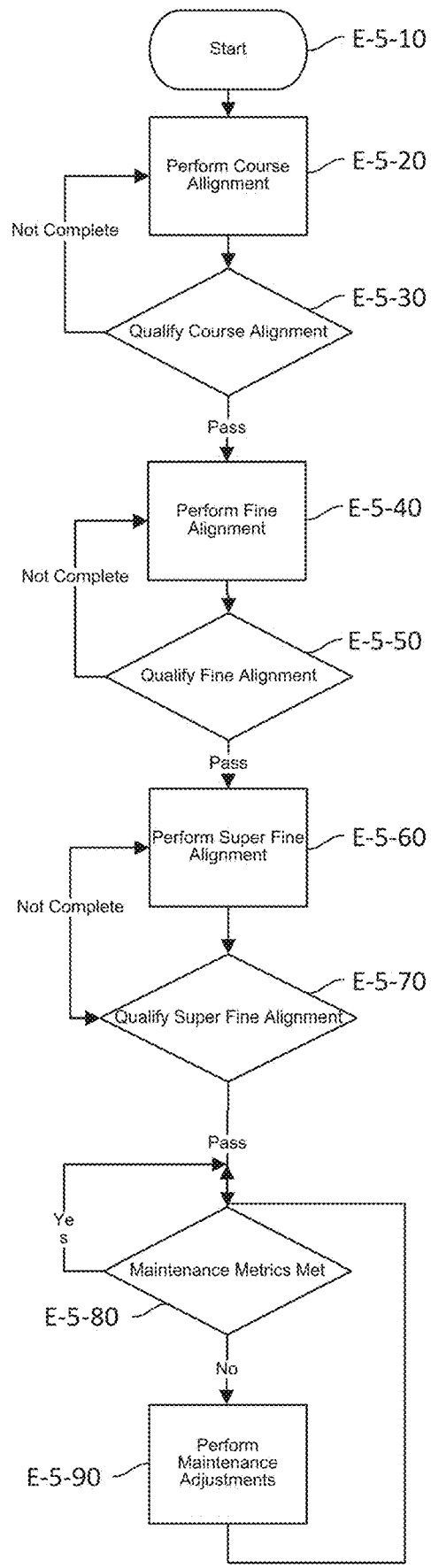

FIG. 5 is an exemplary flow diagram of an embodiment of a multi-stage point to point radio antenna alignment procedure for use in initial alignment and link parameter maintenance including on-going alignment in some embodiments.

Figure 6:
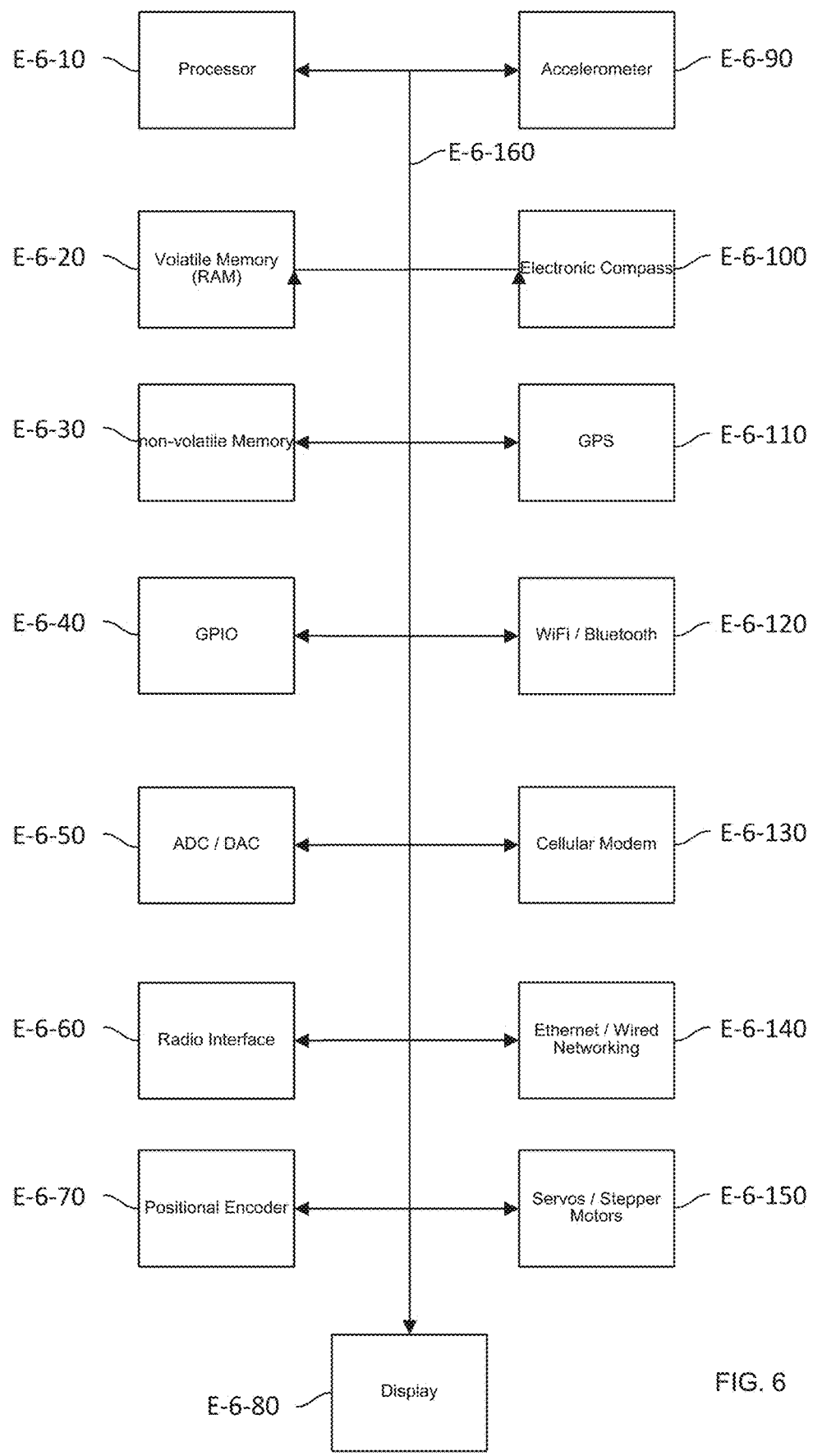

FIG. 6 depicts an exemplary block diagram of an embodiment of an alignment assisting device (AAD) for use in embodiments of installation procedures including initial alignment and maintenance embodiments.

Figure 7A:
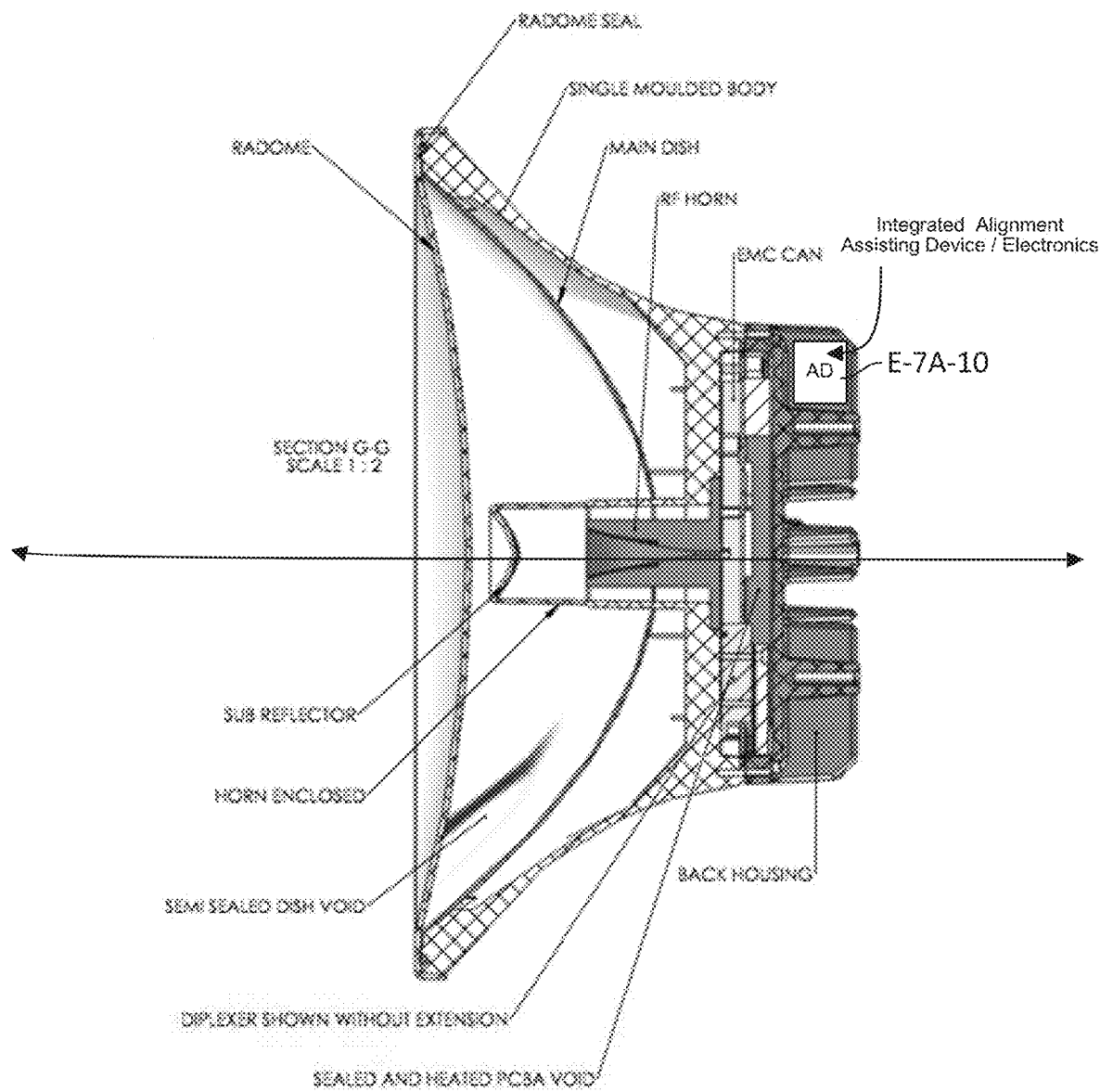

FIG. 7A is a depiction of an exemplary embodiment of a fixed point to point radio with an integrated parabolic reflector antenna and including an embodiment of an integrated alignment assisting device (I-AAD).

Figure 7B:
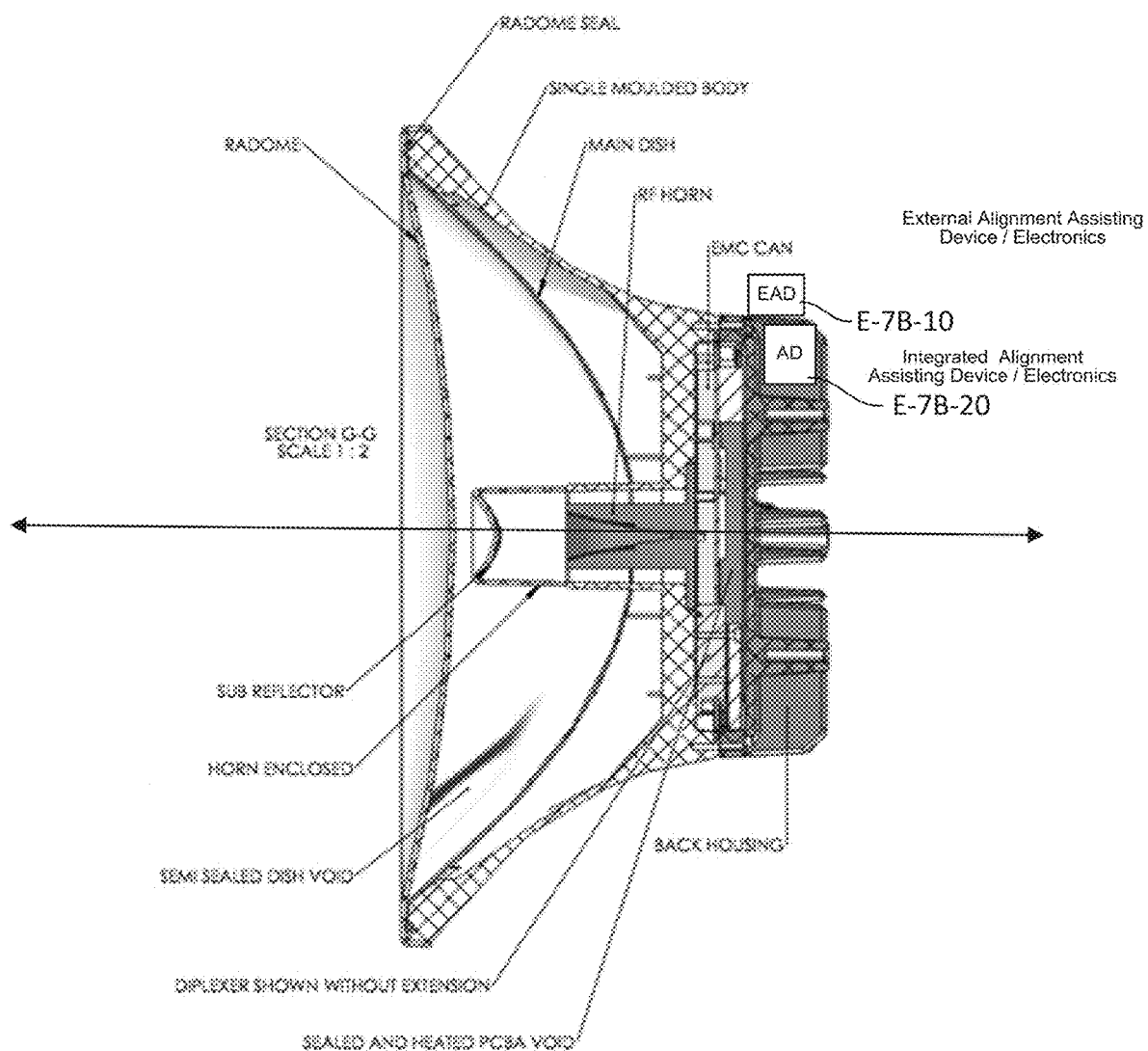

FIG. 7B is a depiction of an exemplary embodiment of a fixed point to point radio with an integrated parabolic reflector antenna and including an embodiment of an alignment assisting device (AAD) having both integrated (I-AAD) and external devices or electronics (E-AAD).

Figure 7C:
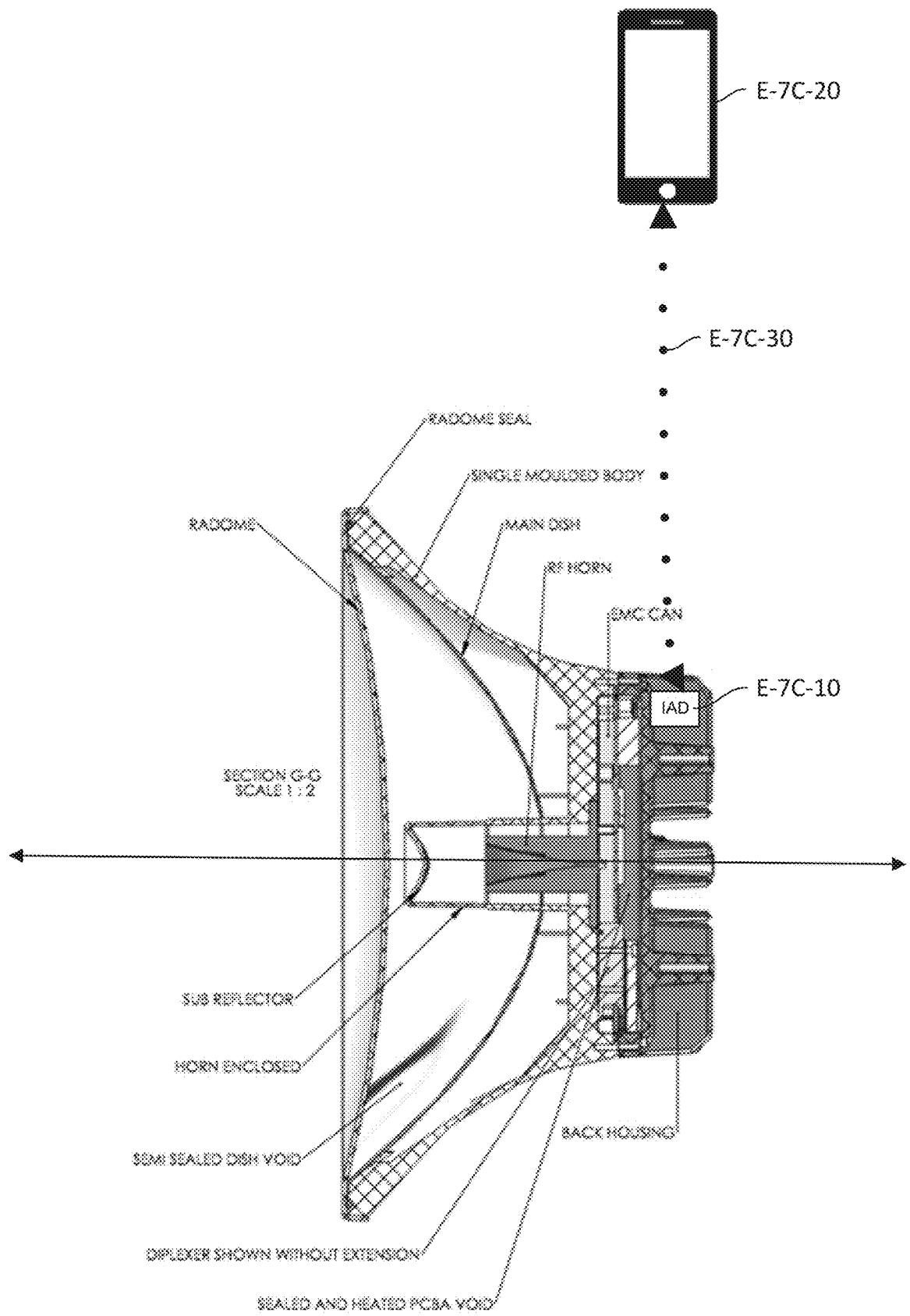

FIG. 7C is a depiction of an exemplary embodiment of a fixed point to point radio with an integrated parabolic reflector antenna and including an embodiment of an integrated alignment assisting device (I-AAD) with an exemplary interface to a mobile wireless device.

Figure 7D:
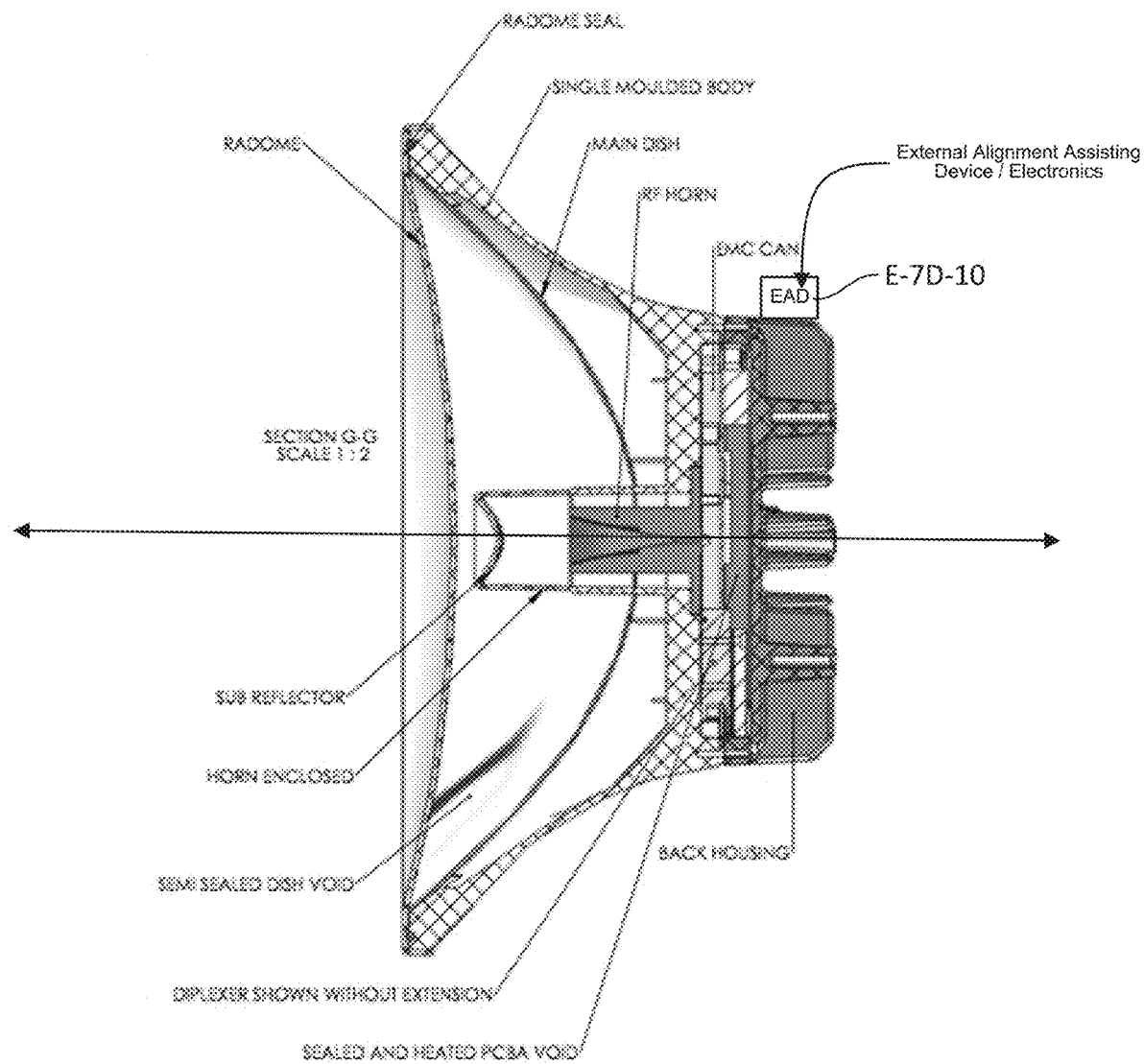

FIG. 7D is a depiction of an exemplary embodiment of a fixed point to point radio with an integrated parabolic reflector antenna and including an embodiment of an external alignment assisting device (E-AAD).

Figure 7E:
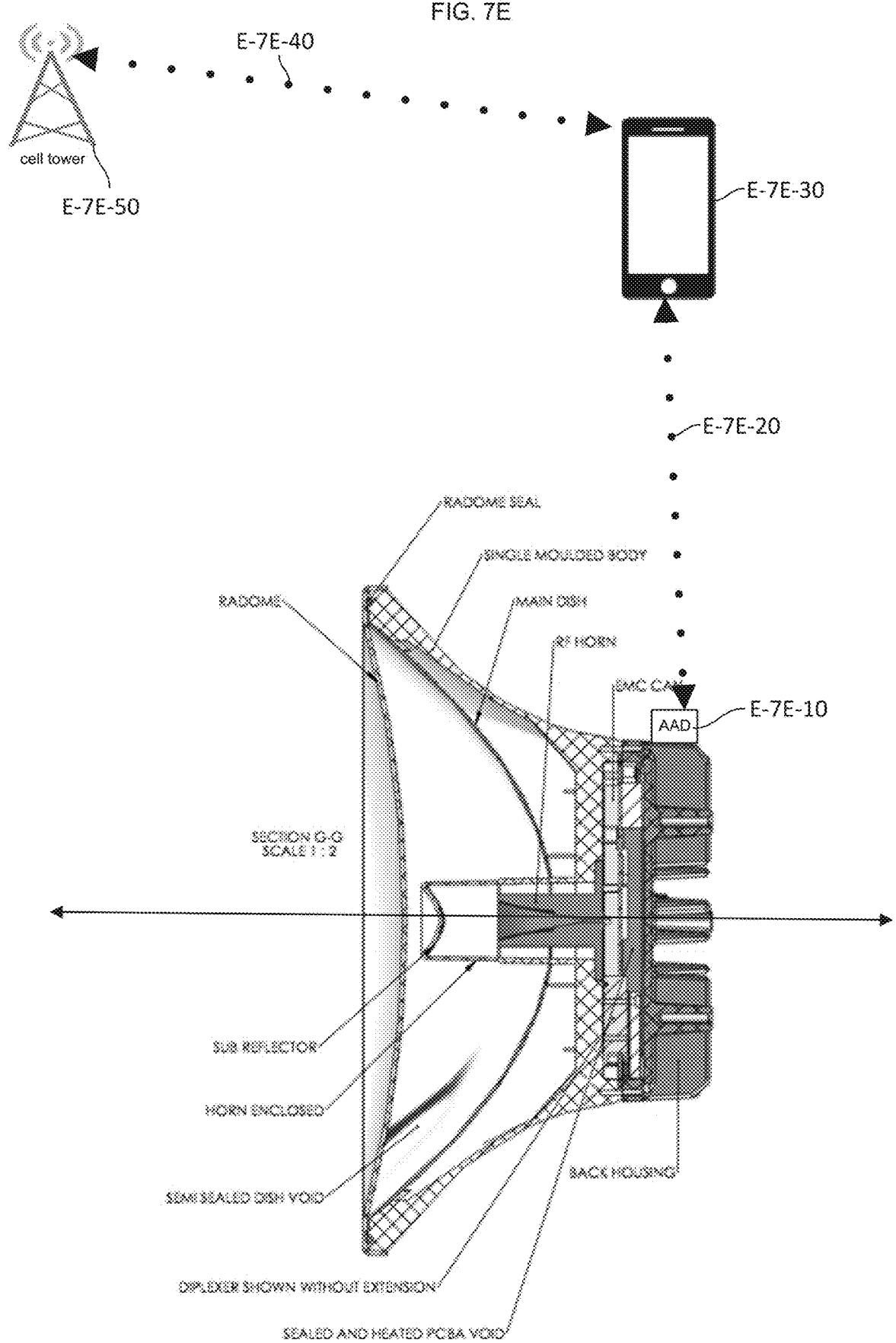

FIG. 7E is a depiction of an exemplary embodiment of a fixed point to point radio with an integrated parabolic reflector antenna and including an embodiment of an external alignment assisting device (E-AAD) with an exemplary interface to a mobile wireless device in communications with a cellular network.

Figure 8A:
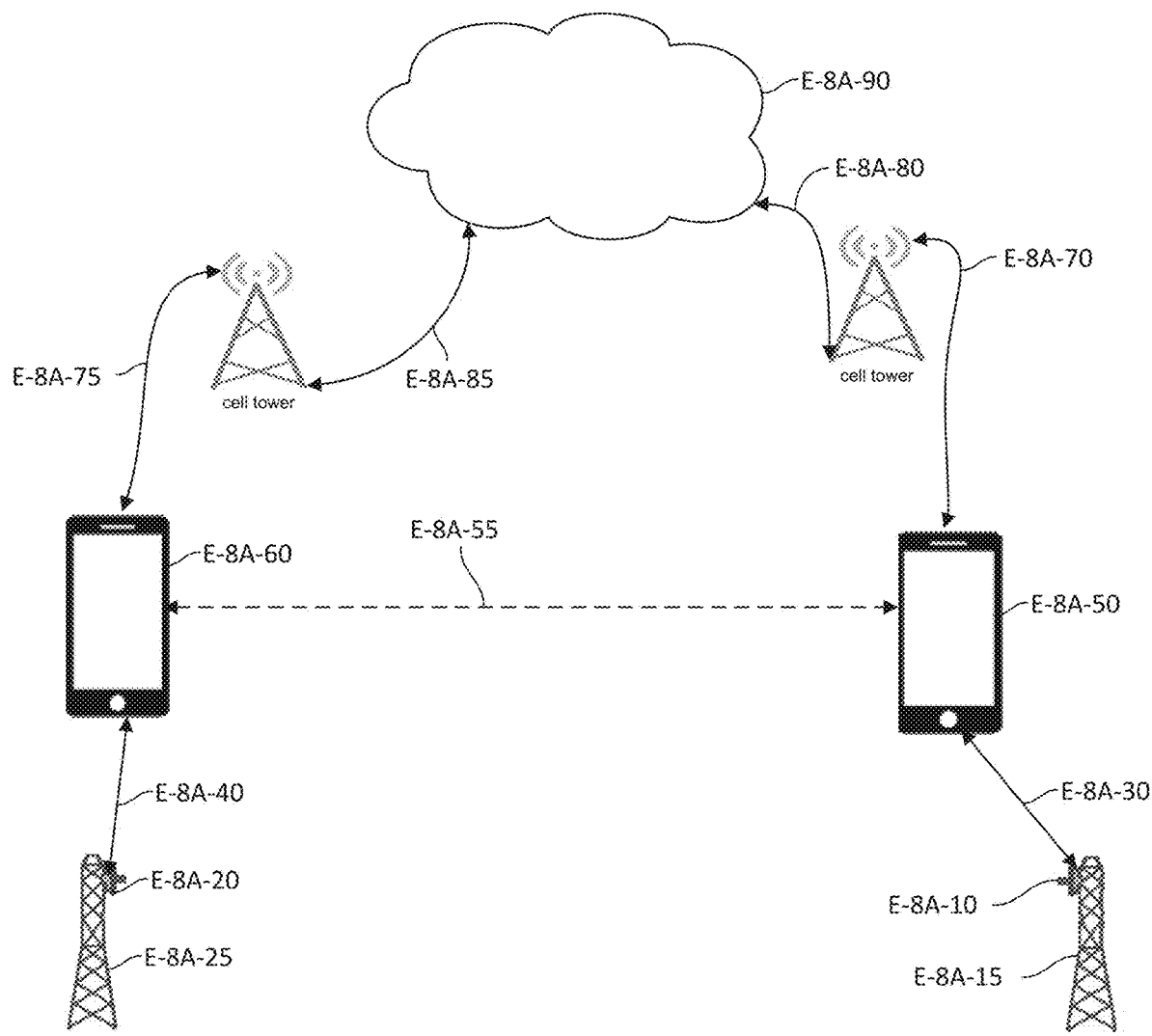

FIG. 8A is an exemplary illustration of the use of cellular devices to facilitate a communications link for use in embodiments of the initial alignment and configuration procedures in some embodiments.

Figure 8B:
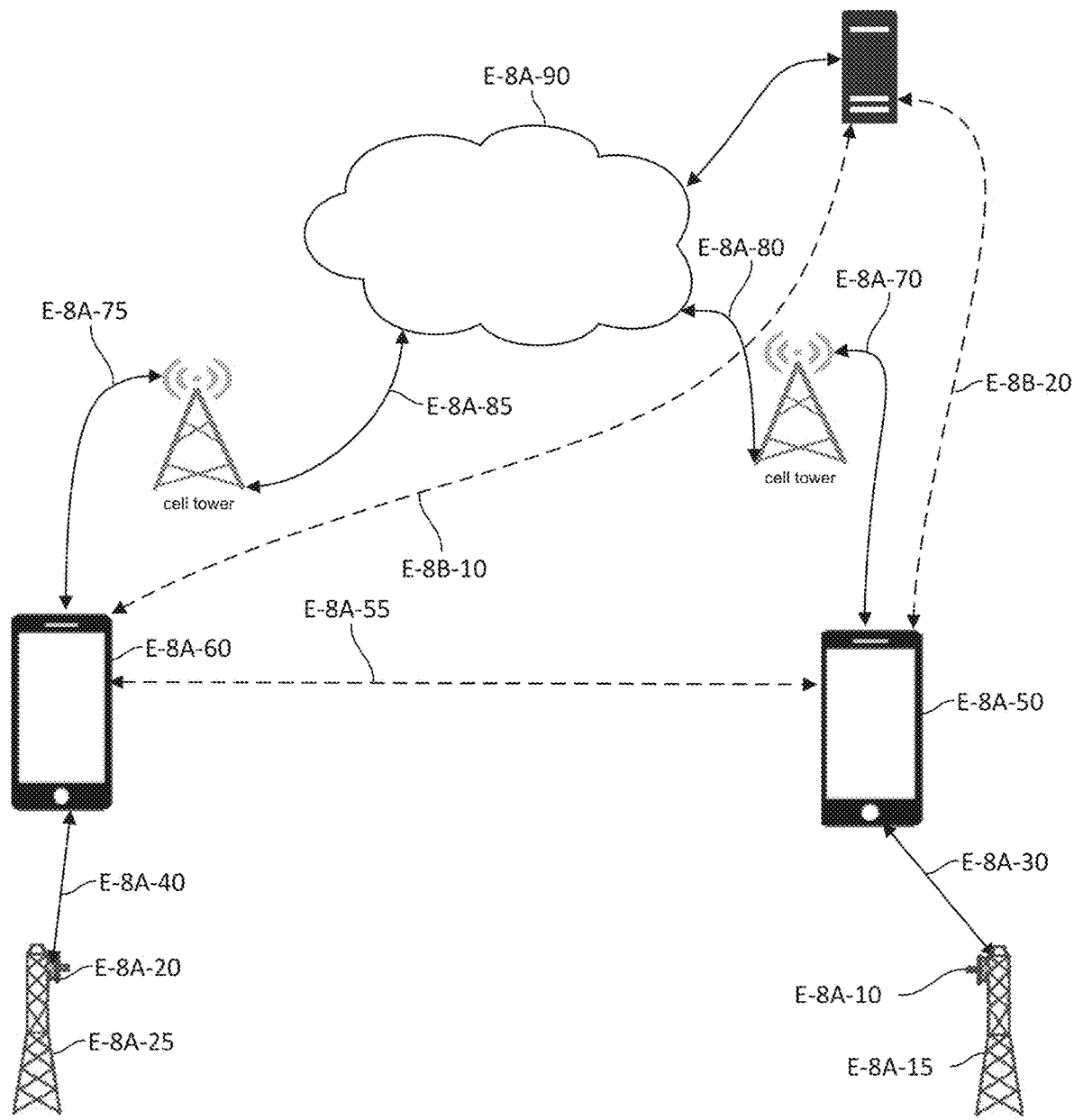

FIG. 8B is an exemplary illustration of the use of cellular devices to facilitate a communication link for use in embodiments of the initial alignment and configuration procedures including the use of a remote server in some embodiments.

Figure 9A:
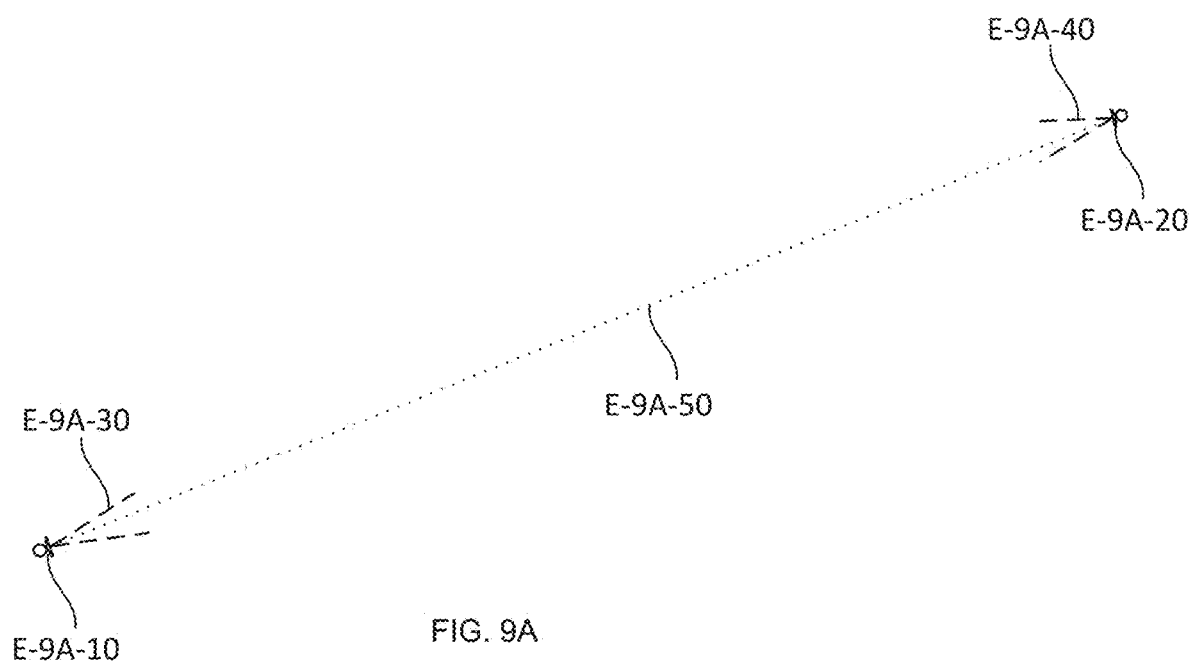

FIG. 9A is a diagram of an exemplary embodiment of a point to point link utilizing two backhaul radios having fixed high gain antennas where in alignment is sub-optimal based upon an exemplary "course alignment" procedure.

Figure 9B:
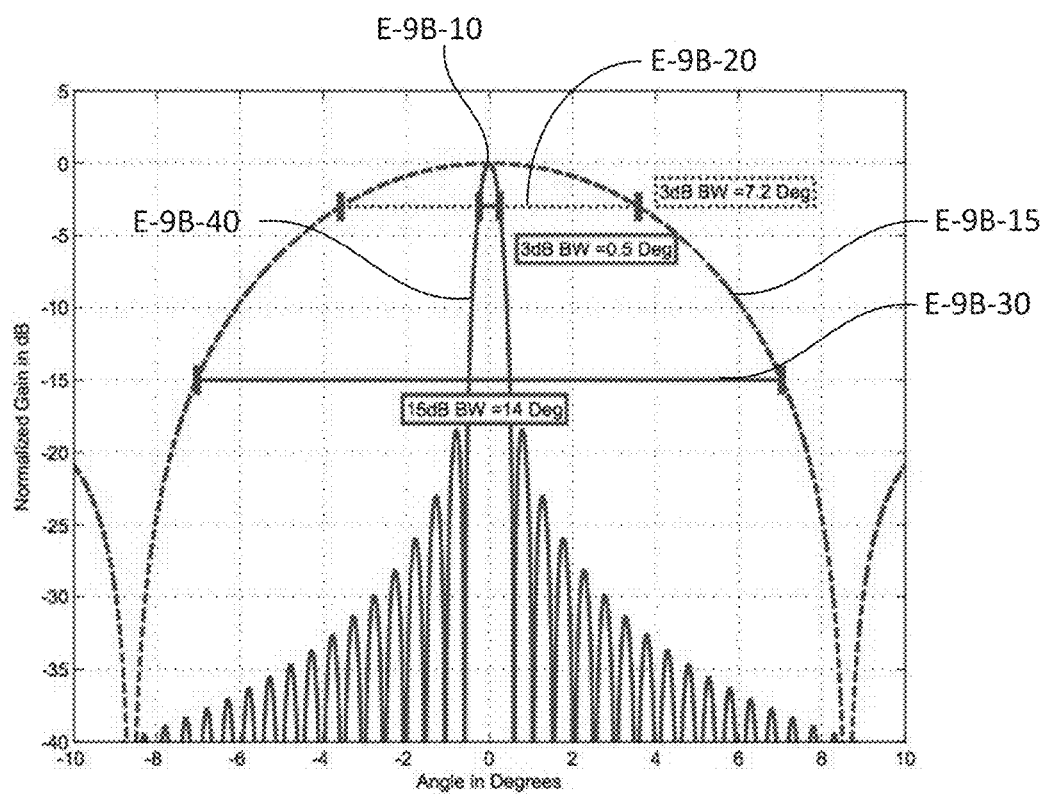

FIG. 9B depicts an exemplary plot of normalized antenna gain plots for embodiments of an exemplary hybrid backhaul radio depicting the main antenna lobes of each of a plurality antenna patterns having differing main beam widths.

Figure 10A:
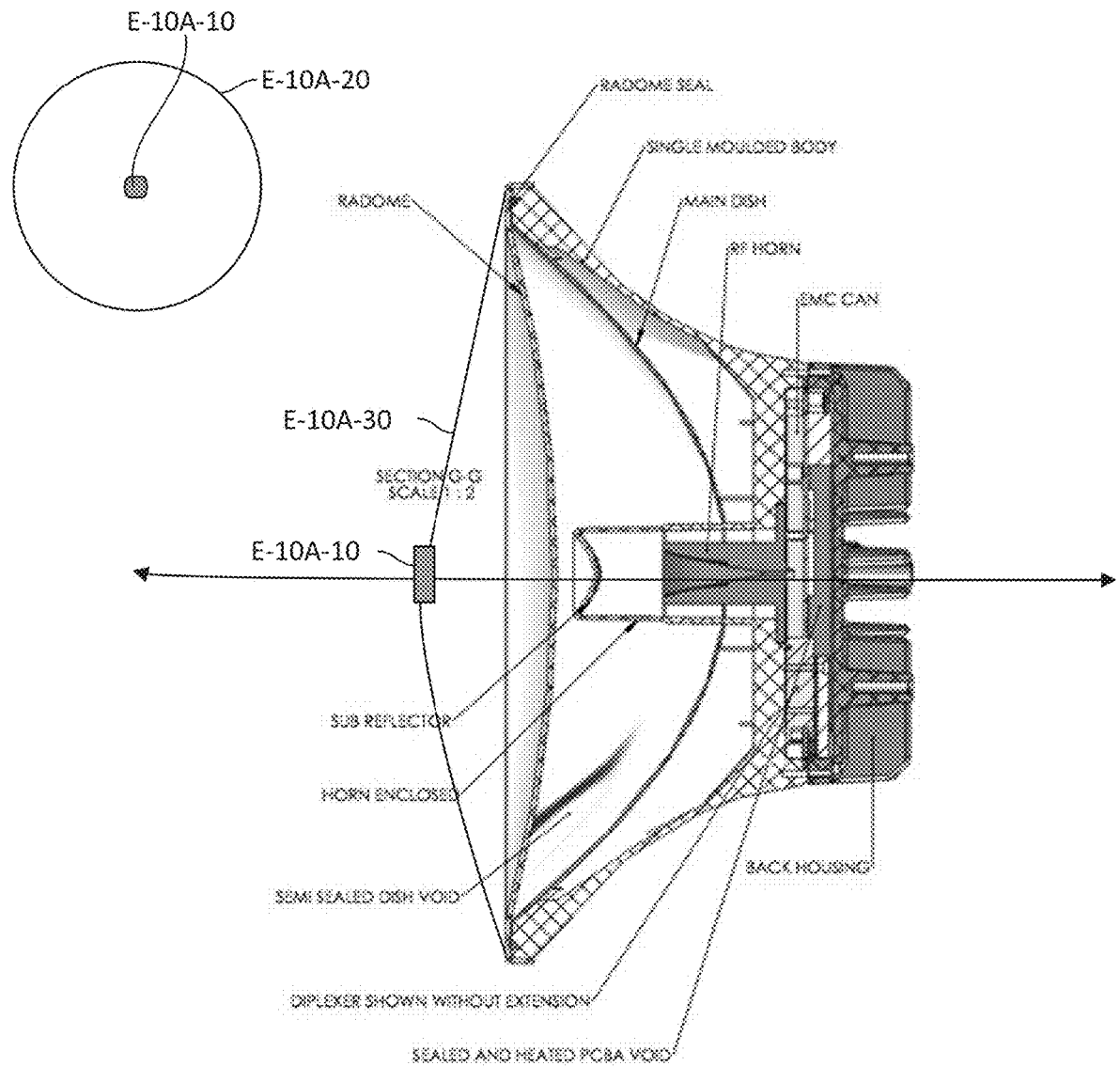

FIG. 10A is a depiction of an exemplary embodiment of a fixed point to point radio with an integrated parabolic reflector antenna and including an embodiment of one or more 5 GHz band auxiliary antenna(s) with central focal point alignment for use with one or more embodiments of the current invention.

Figures 1, 10B:
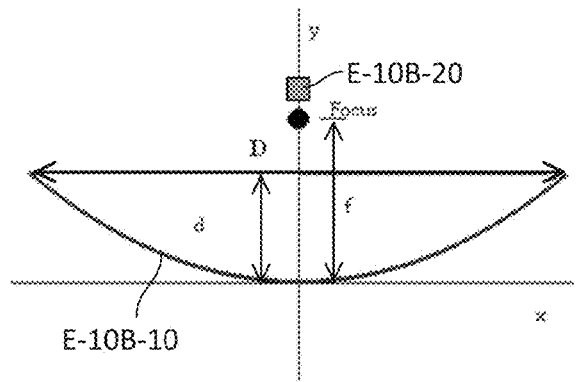

FIG. 10B-1 is a depiction of an exemplary placement of one or more auxiliary antenna(s) relative to the on-axis focal point of a parabolic reflector antenna with alignment on-axis but further from focus for use with one or more embodiments of the current invention.

Figures 2, 10B:
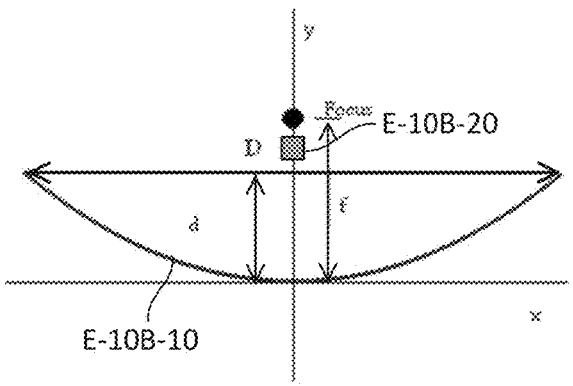

FIG. 10B-2 is a depiction of an exemplary placement of one or more auxiliary antenna(s) relative to the on-axis focal point of a parabolic reflector antenna with alignment on-axis but closer than the focus for use with one or more embodiments of the current invention.

Figures 3, 10B:
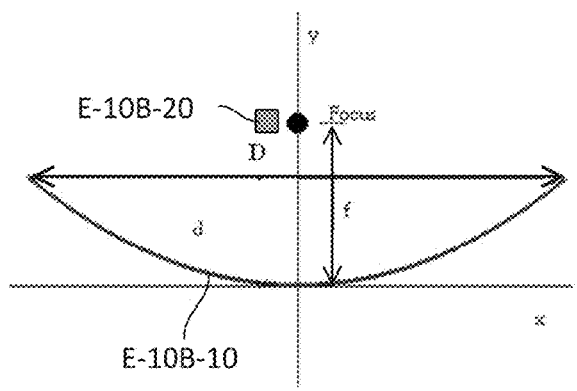

FIG. 10B-3 is a depiction of an exemplary placement of one or more auxiliary antenna(s) relative to the on-axis focal point of a parabolic reflector antenna with alignment off-axis but equidistant with the focus for use with one or more embodiments of the current invention.

Figures 4, 10B:
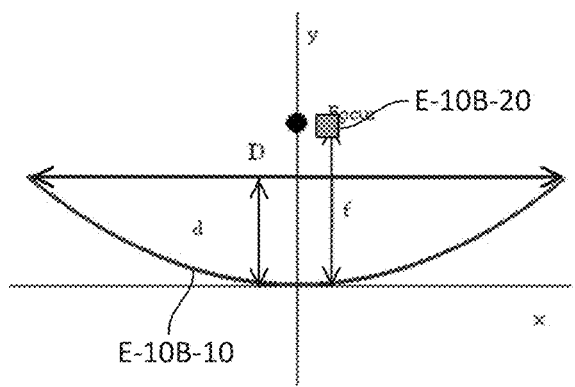
Figures 5, 10B:
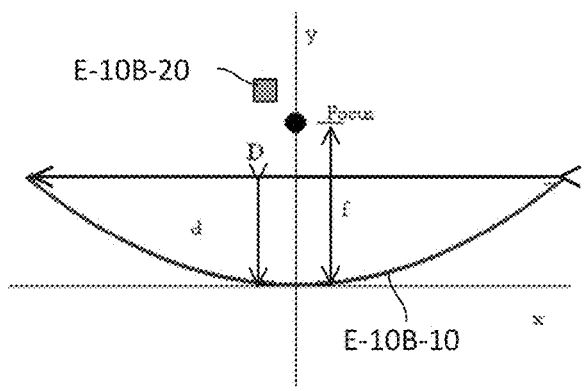
Figures 6, 10B:
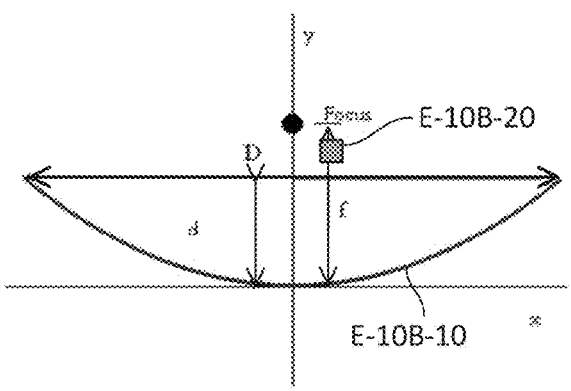

FIG. 10B-4 is an alternative depiction of an exemplary placement of one or more auxiliary antenna(s) relative to the on-axis focal point of a parabolic reflector antenna with alignment off-axis but equidistant with the focus for use with one or more embodiments of the current invention.

FIG. 10B-5 is a depiction of an exemplary placement of one or more auxiliary antenna(s) relative to the on-axis focal point of a parabolic reflector antenna with alignment off-axis and further than the focus for use with one or more embodiments of the current invention.

FIG. 10B-6 is a depiction of an exemplary placement of one or more auxiliary antenna(s) relative to the on-axis focal point of a parabolic reflector antenna with alignment off-axis and closer than the focus for use with one or more embodiments of the current invention.

FIG. 10C is a depiction of a multiple element array antenna having four antenna apertures, having narrow and wide radiation patterns.

FIG. 10D is a depiction of an arrangement of receive and transmit chains coupled to respective antenna elements is depicted.

Figure 11A:
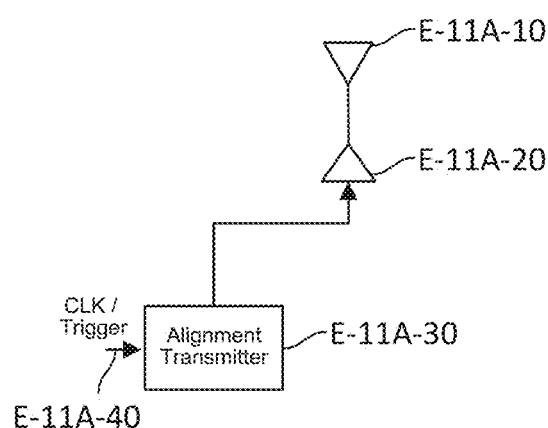

FIG. 11A is an exemplary block diagram of an embodiment of an "alignment transmitter."

Figure 11B:
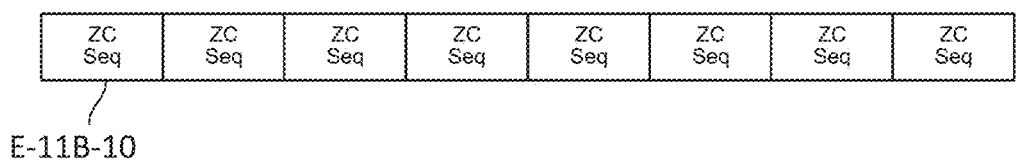

FIG. 11B is an exemplary embodiment of an alignment waveform utilizing Zadoff-Chu codes.

Figure 12:
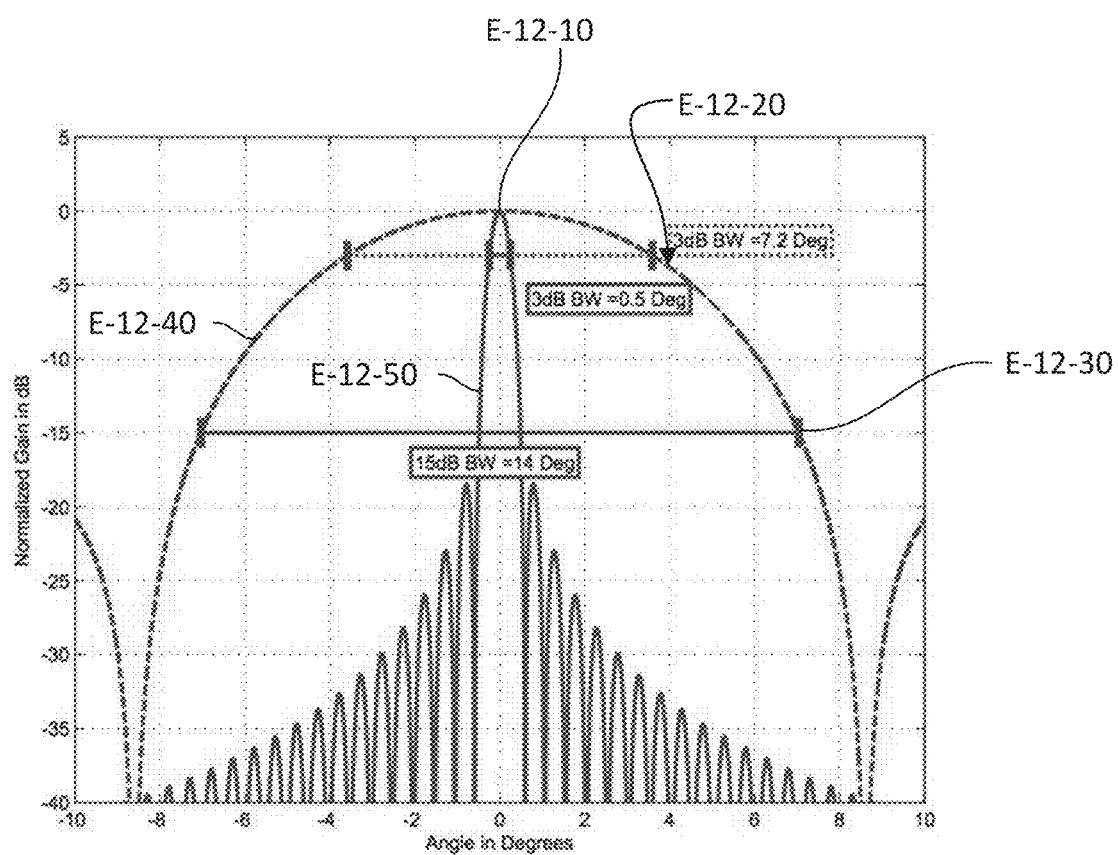

FIG. 12 depicts an exemplary plot of normalized antenna gain plots for embodiments of an exemplary hybrid backhaul radio depicting the main antenna lobes of each of a plurality antenna patterns having differing main beam widths and including exemplary measurements for use in alignment and alignment qualification.

Figure 13:
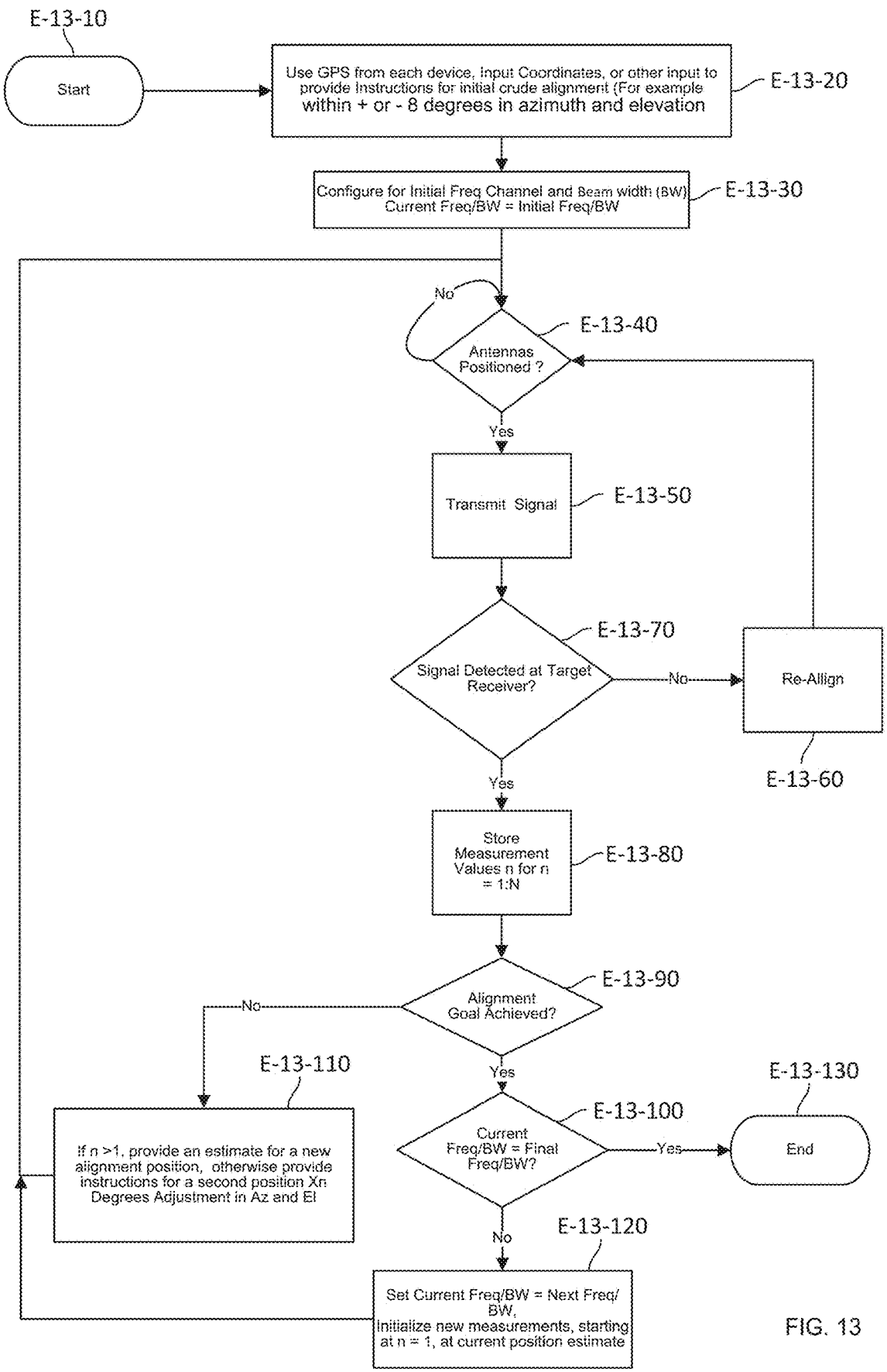

FIG. 13 is an exemplary flow diagram of an embodiment of a point to point radio antenna alignment procedure for use in initial alignment utilizing an alignment assisting device and one or more frequencies and beam widths for alignment measurements.

Figure 14:
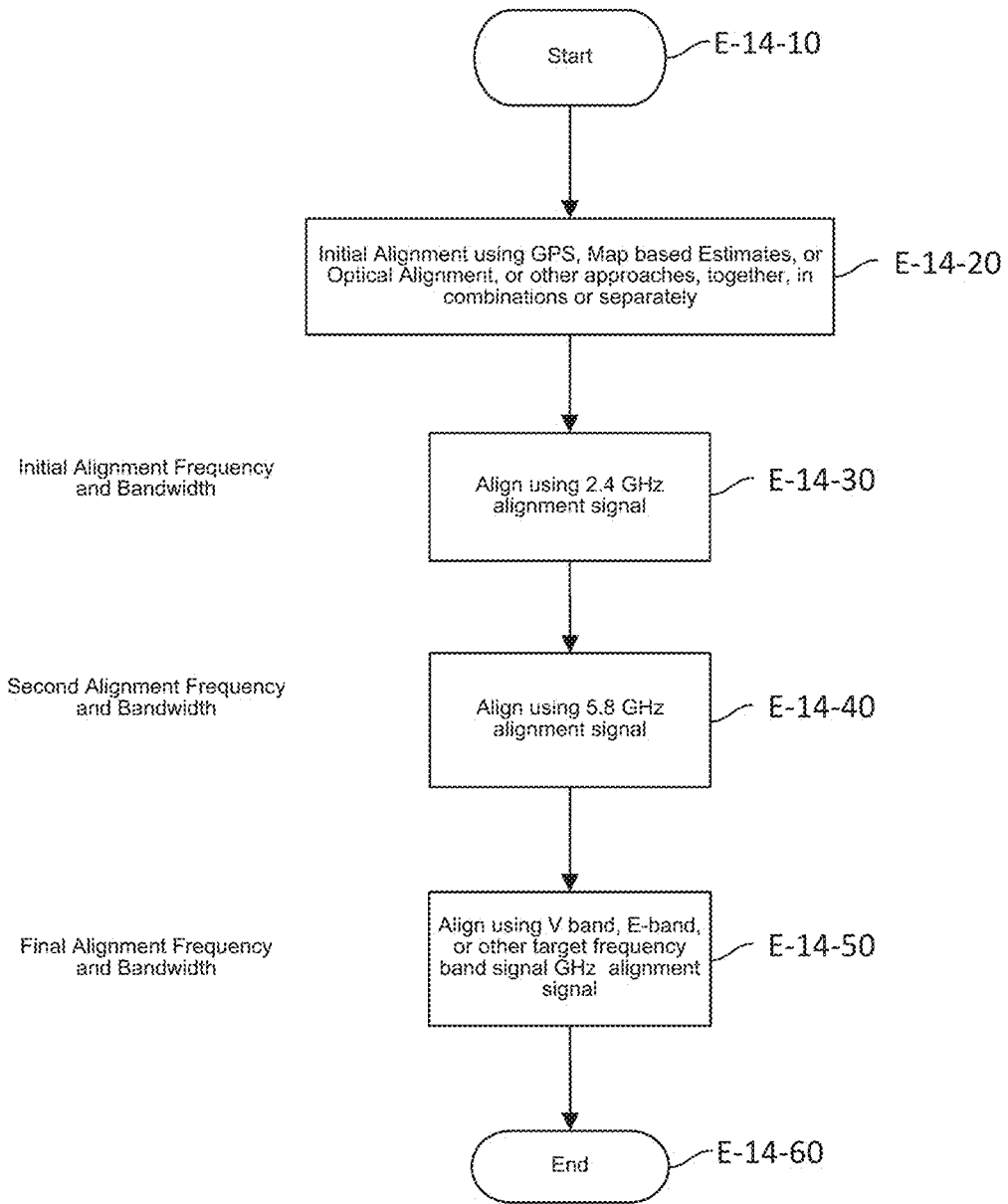

FIG. 14 is an exemplary flow diagram of an embodiment of a multiple stage point to point radio antenna alignment procedure for use in initial alignment utilizing an alignment assisting device and multiple frequencies and beam widths for alignment measurements.

Figure 15A:
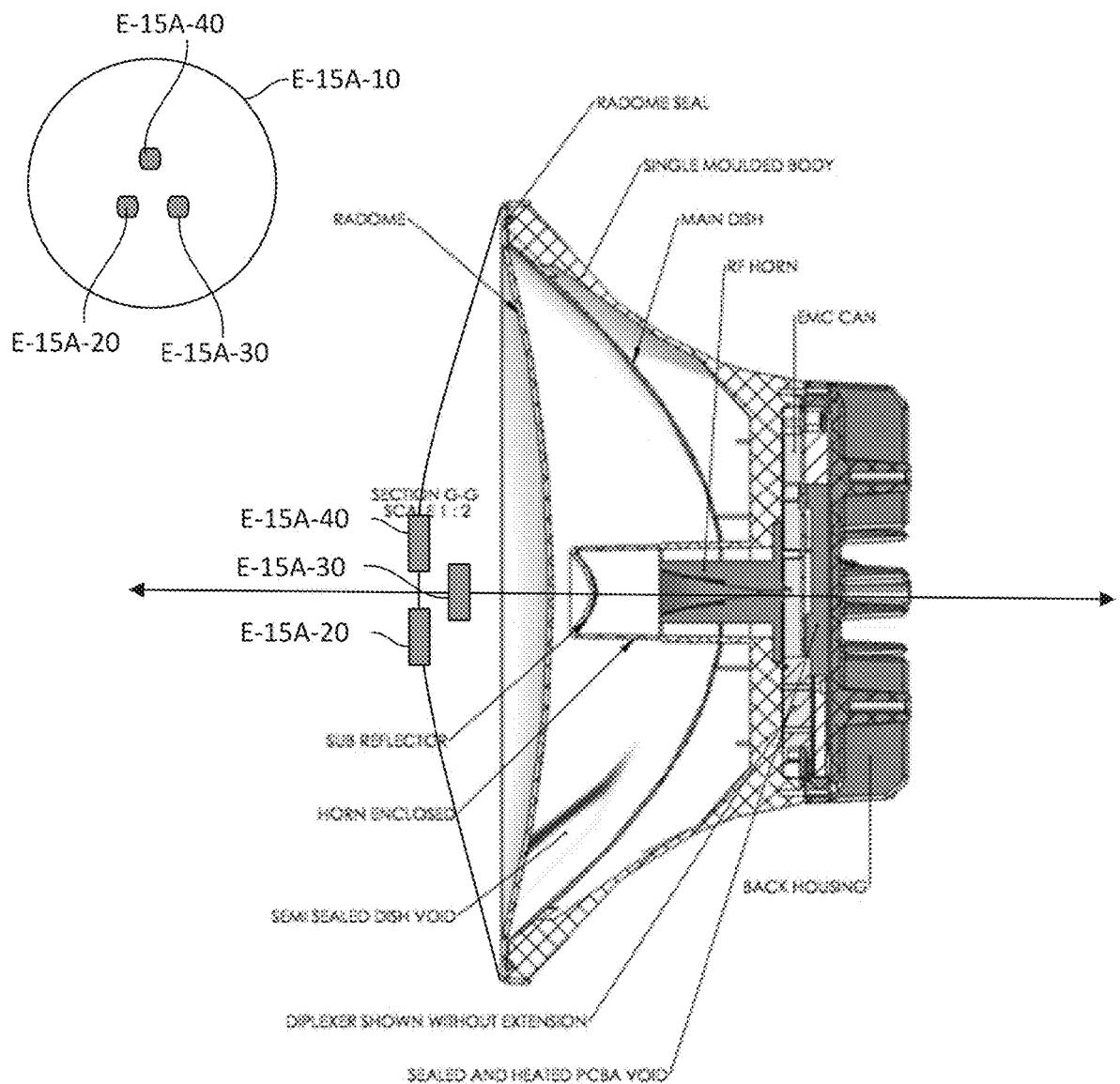

FIG. 15A is a depiction of an exemplary embodiment of a fixed point to point radio with an integrated parabolic reflector antenna and including an embodiment of multiple 5 GHz band auxiliary antenna(s) with offset focal point alignment for use with one or more embodiments of the current invention.

Figures 1, 15B:
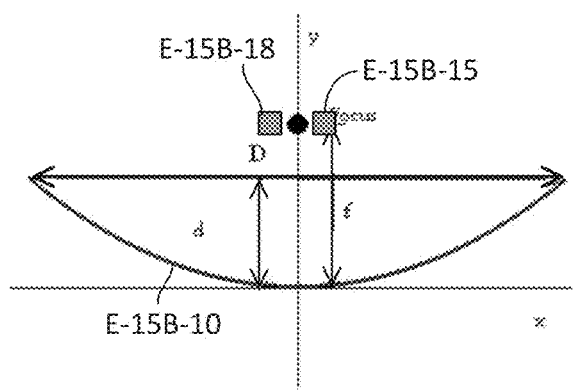
Figures 2, 15B:
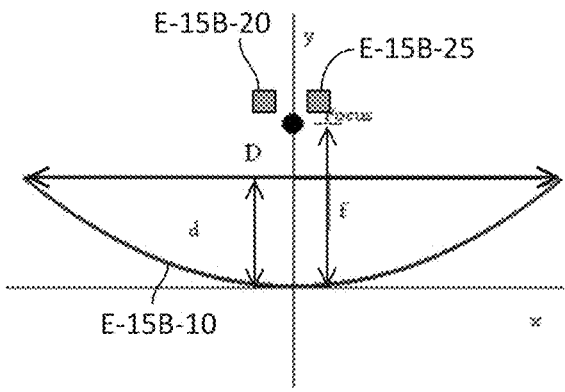
Figures 3, 15B:
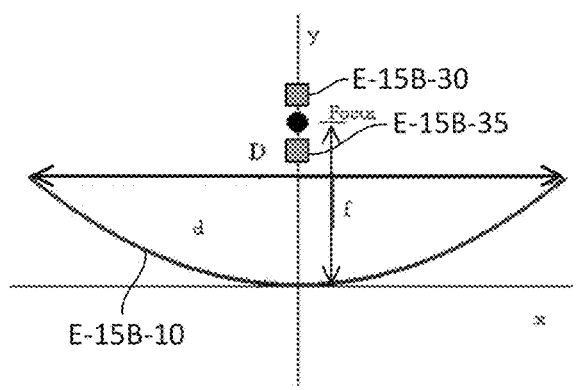
Figures 4, 15B:
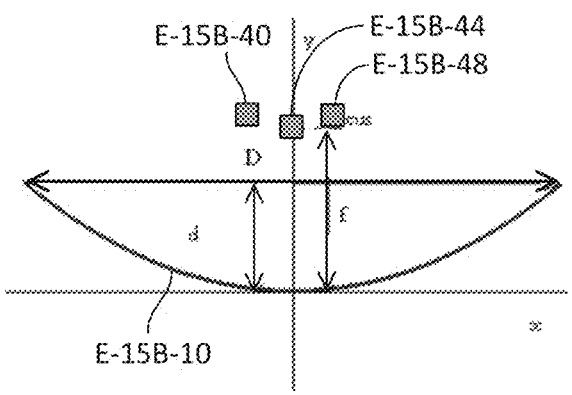
Figures 5, 15B:
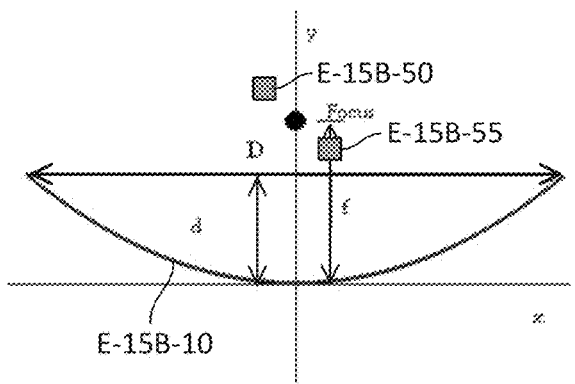
Figures 6, 15B:
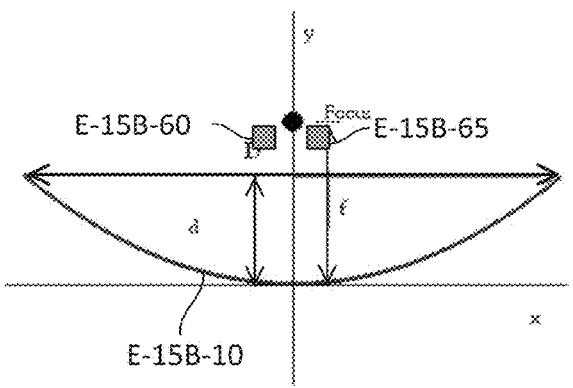

FIG. 15B-1 is a depiction of an exemplary placement of multiple auxiliary antenna(s) relative to the on-axis focal point of a parabolic reflector antenna with alignment off-axis but equidistant with the focal point for use with one or more embodiments of the current invention.

FIG. 15B-2 is a depiction of an exemplary placement of multiple auxiliary antenna(s) relative to the on-axis focal point of a parabolic reflector antenna with alignment off-axis and further then the focal point for use with one or more embodiments of the current invention.

FIG. 15B-3 is a depiction of an exemplary placement of multiple auxiliary antenna(s) relative to the on-axis focal point of a parabolic reflector antenna with alignment on-axis but offset in distance from the focal point for use with one or more embodiments of the current invention.

FIG. 15B-4 is a depiction of an exemplary placement of multiple auxiliary antenna(s) relative to the on-axis focal point of a parabolic reflector antenna with alignment both at the focal point, and off-axis but for use with one or more embodiments of the current invention.

FIG. 15B-5 is a depiction of an exemplary placement of multiple auxiliary antenna(s) relative to the on-axis focal point of a parabolic reflector antenna with alignment off-axis but offset in both nearer and further distance from the focal point for use with one or more embodiments of the current invention.

FIG. 15B-6 is a depiction of an exemplary placement of multiple auxiliary antenna(s) relative to the on-axis focal point of a parabolic reflector antenna with alignment off-axis but offset in distance nearer than the focal point for use with one or more embodiments of the current invention.

Figure 16:
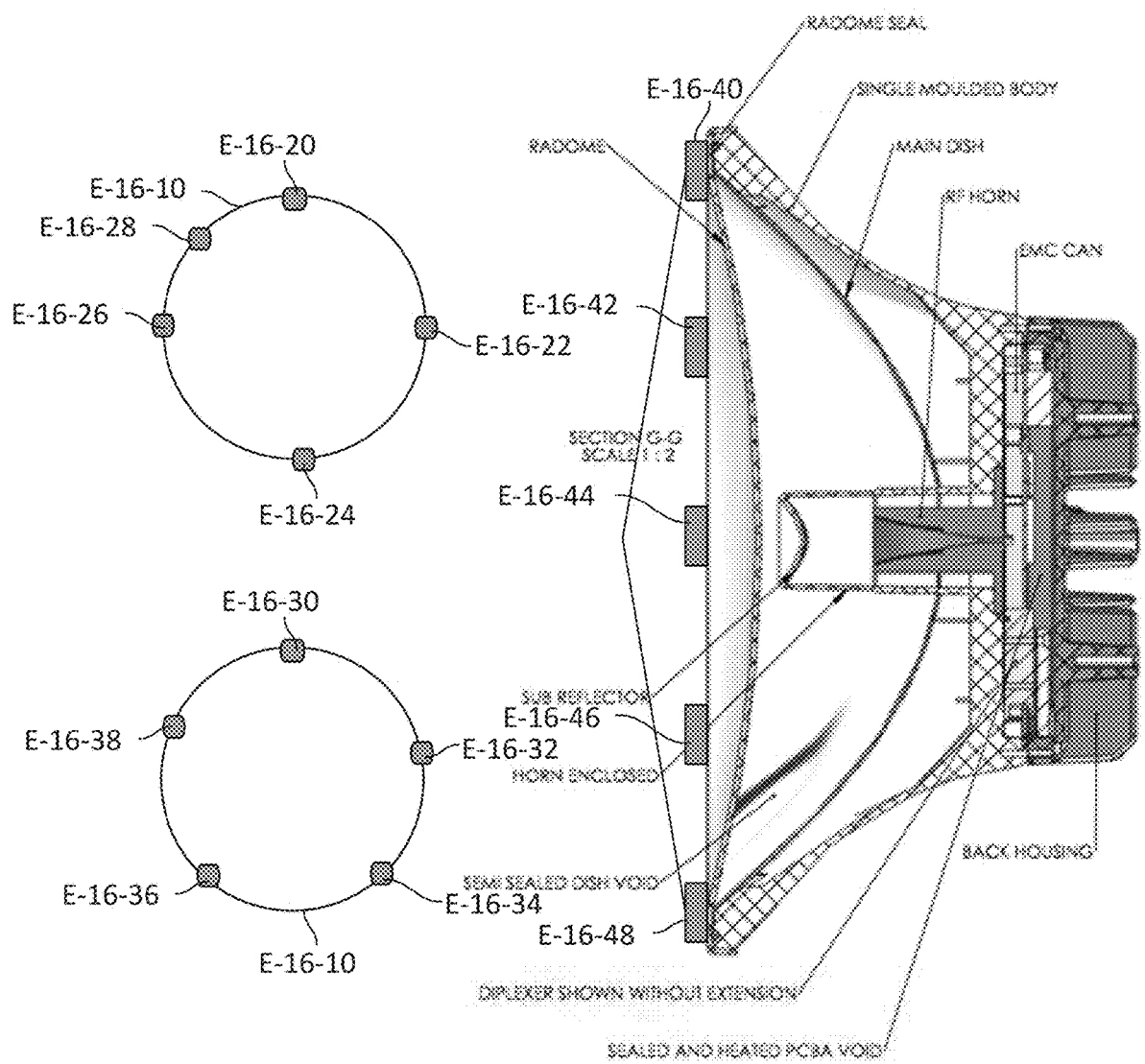

FIG. 16 is a depiction of an exemplary embodiment of a fixed point to point radio with an integrated parabolic reflector antenna and including an embodiment of multiple auxiliary antenna(s) with placed radially on the parameter of the parabolic for use with one or more embodiments of the current invention.

Figure 17:
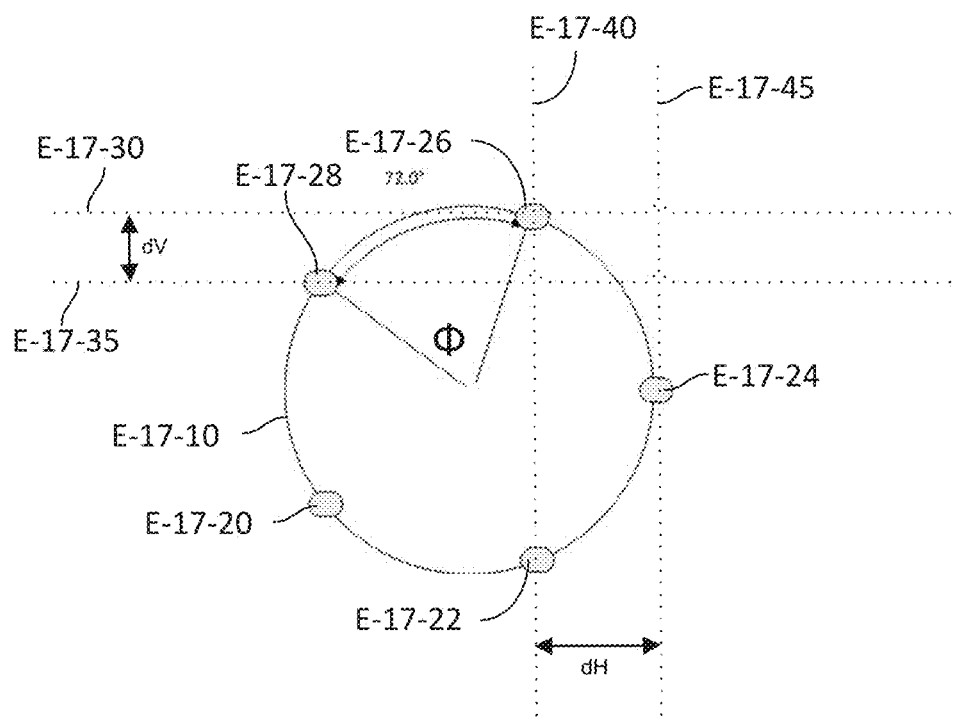

FIG. 17 depicts a diagram of an exemplary placement of auxiliary antennas radially on the parameter of a parabolic antenna according to some embodiments of the invention.

Figure 18A:
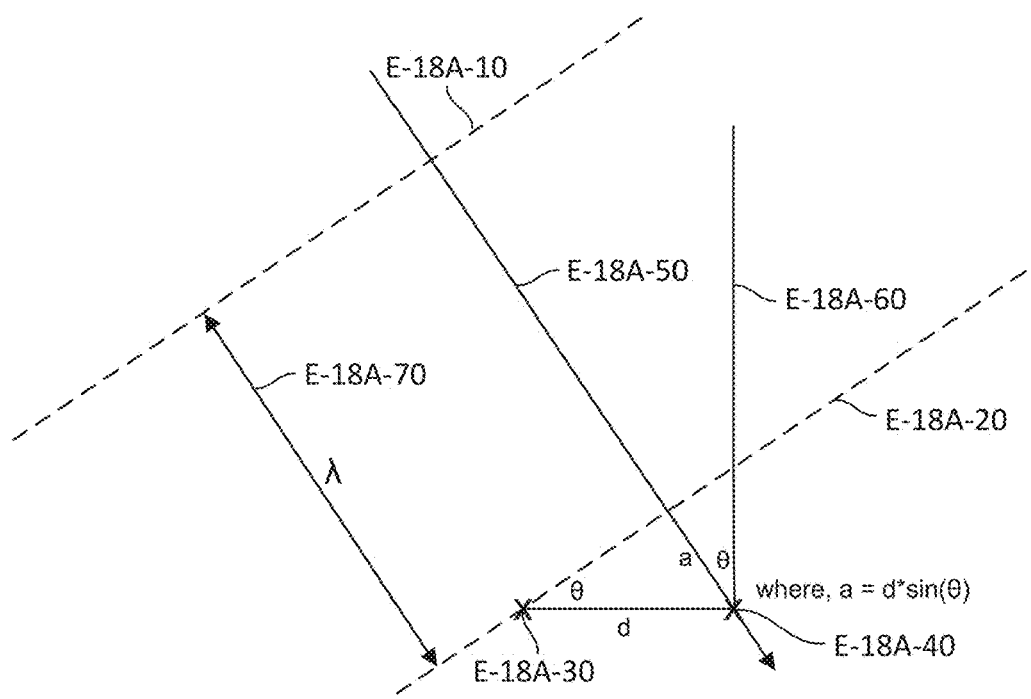

FIG. 18A is an exemplary illustration of the relationship between a waveform center frequency (wavelength λ) and the relative signal propagation difference detected between two antenna elements of an exemplary two element antenna array.

FIG. 18B is a plot of the absolute value of the maximum unambiguous angle of arrival relative to array broadside versus element spacing in wavelengths for a two element antenna array.

FIG. E18C provides EQ. E-18C describing a formula defining the maximum unambiguous angle of arrival relative to array broadside versus element spacing in wavelengths for a two element antenna array.

Figure 19A:
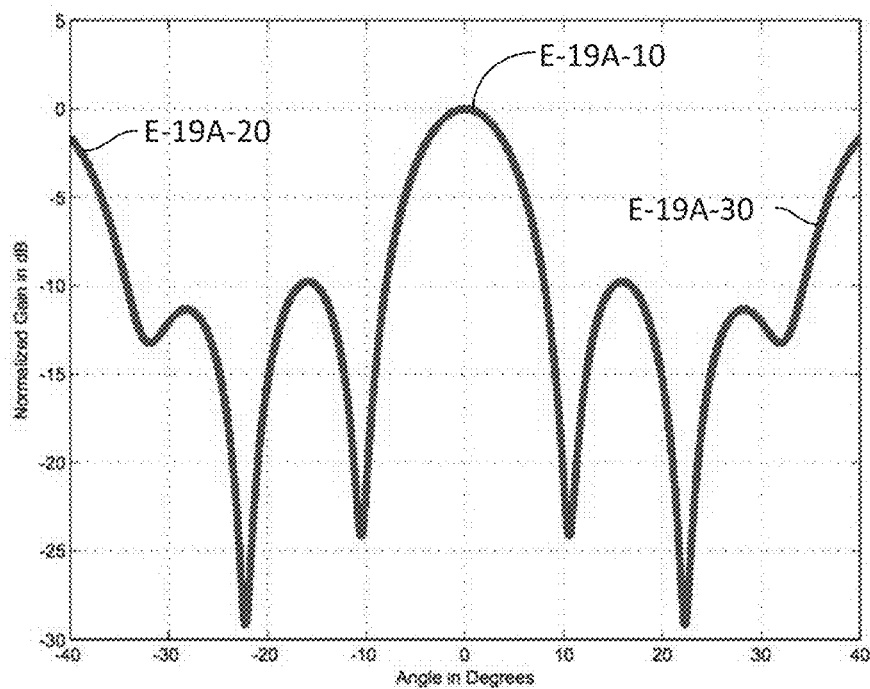

FIG. 19A depicts a plot of the normalized gain in dB relative to the angle of arrival for a signal received by a linear equally spaced (2.9λ) 4 element antenna array having a 60 cm total array baseline (11.6λ) for a ISM band signal (5.8 GHz) center frequency showing "spatial aliasing."

Figure 19B:
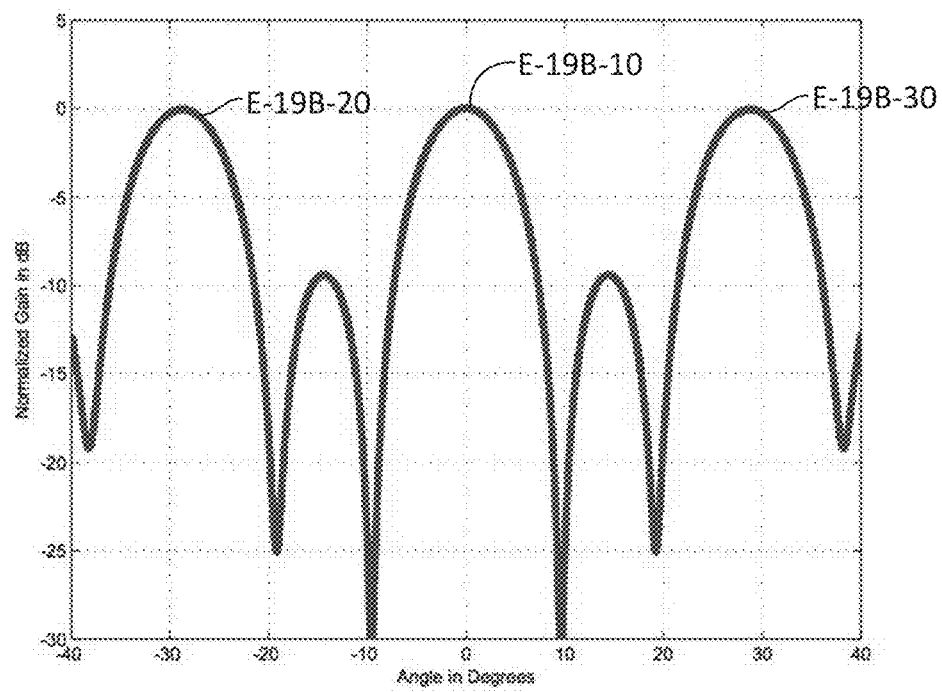

FIG. 19B depicts a plot of the normalized gain in dB relative to the angle of arrival for a signal received by a linear equally spaced (3.9λ) 3 element antenna array having a 60 cm total array baseline (11.6λ) for a ISM band signal (5.8 GHz) center frequency showing "spatial aliasing."

Figure 20A:
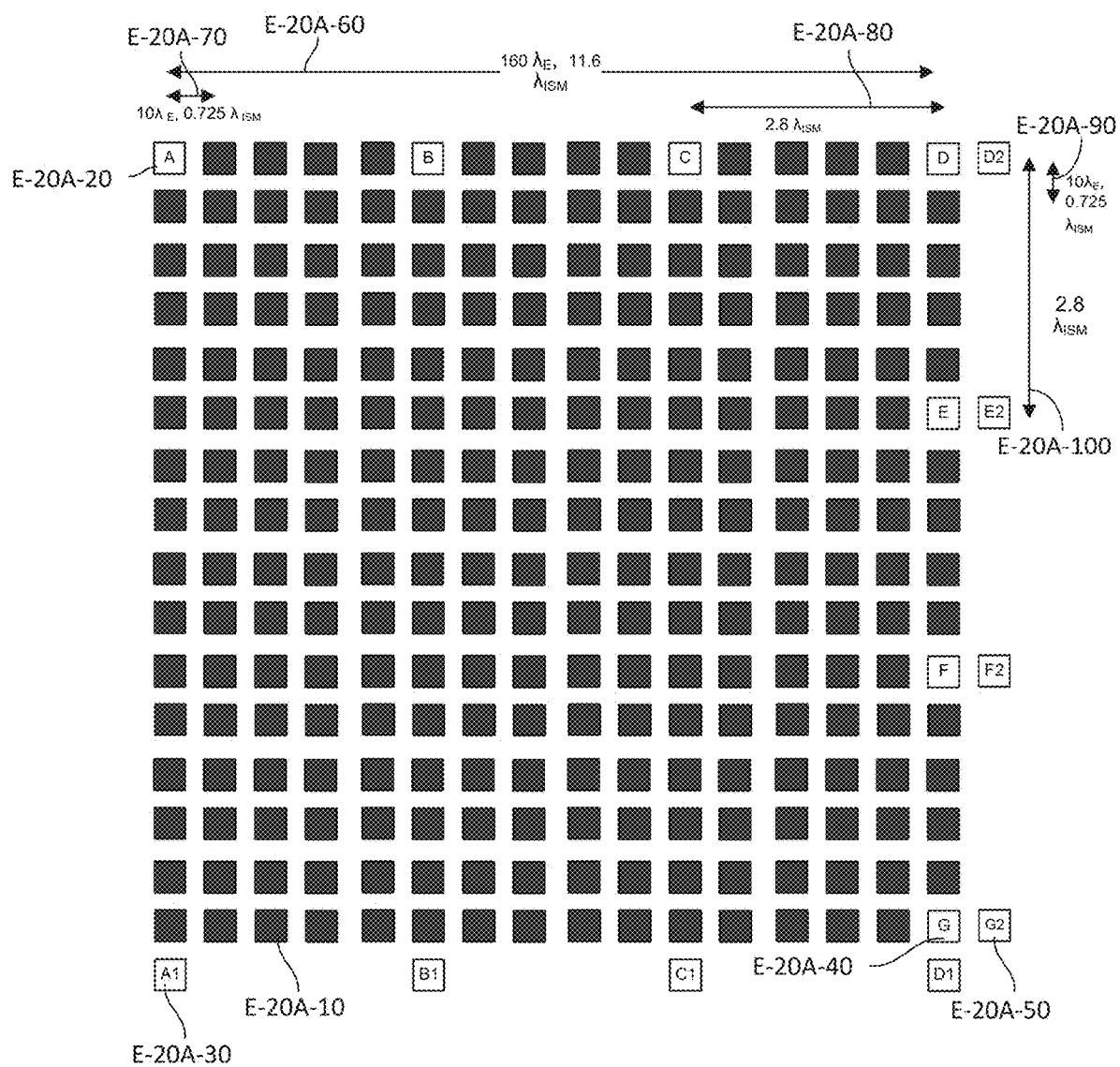

FIG. 20A depicts an exemplary E-Band antenna array having a grid of antenna element sets and auxiliary ISM (5.8 GHz) antenna elements for use in an embodiments of the present invention.

Figure 20B:
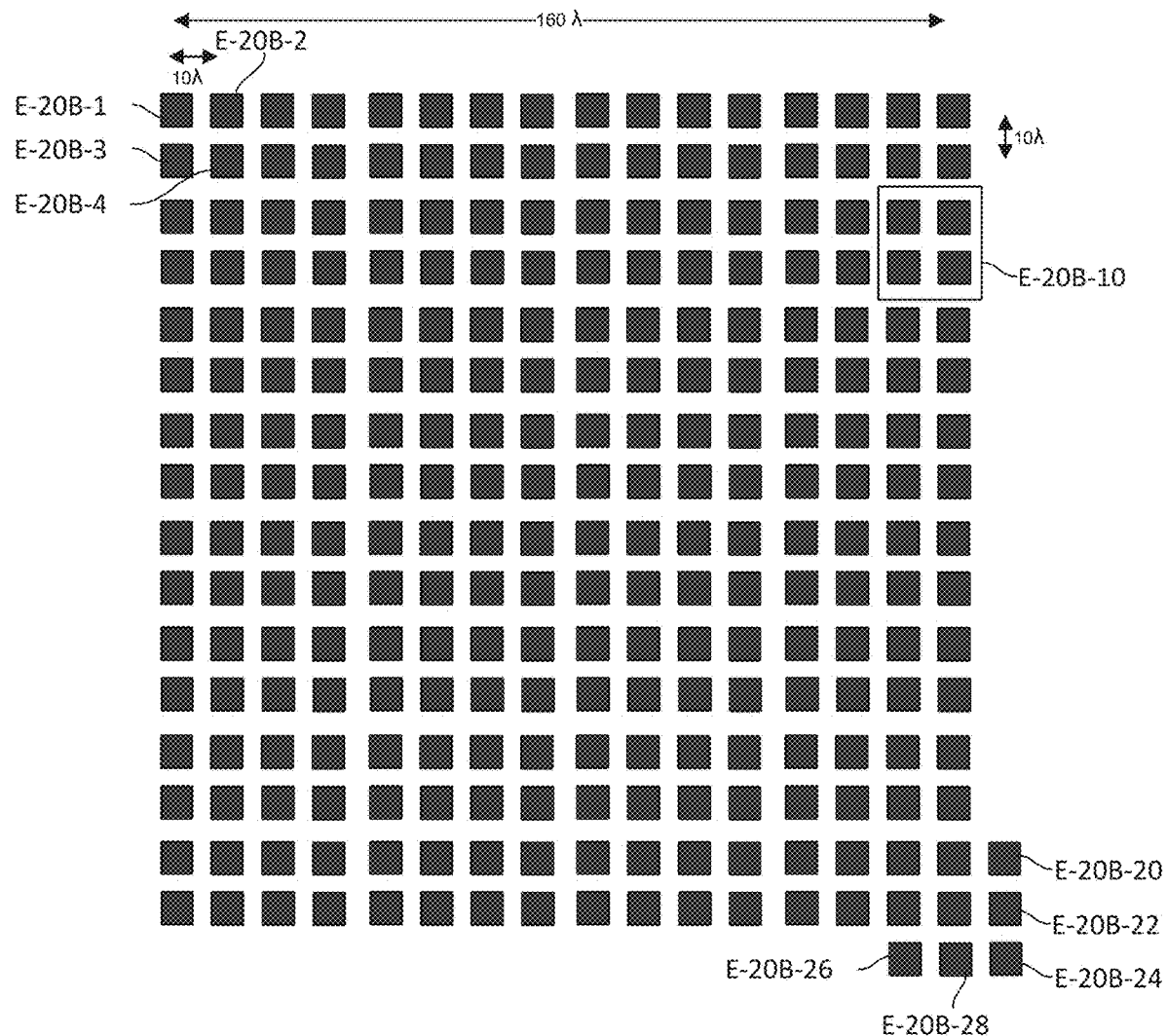

FIG. 20B depicts an exemplary E-Band antenna array having a grid of antenna element sets including auxiliary E-band sub-arrays and antenna element sets for use in an embodiments of the present invention.

Figure 20C:
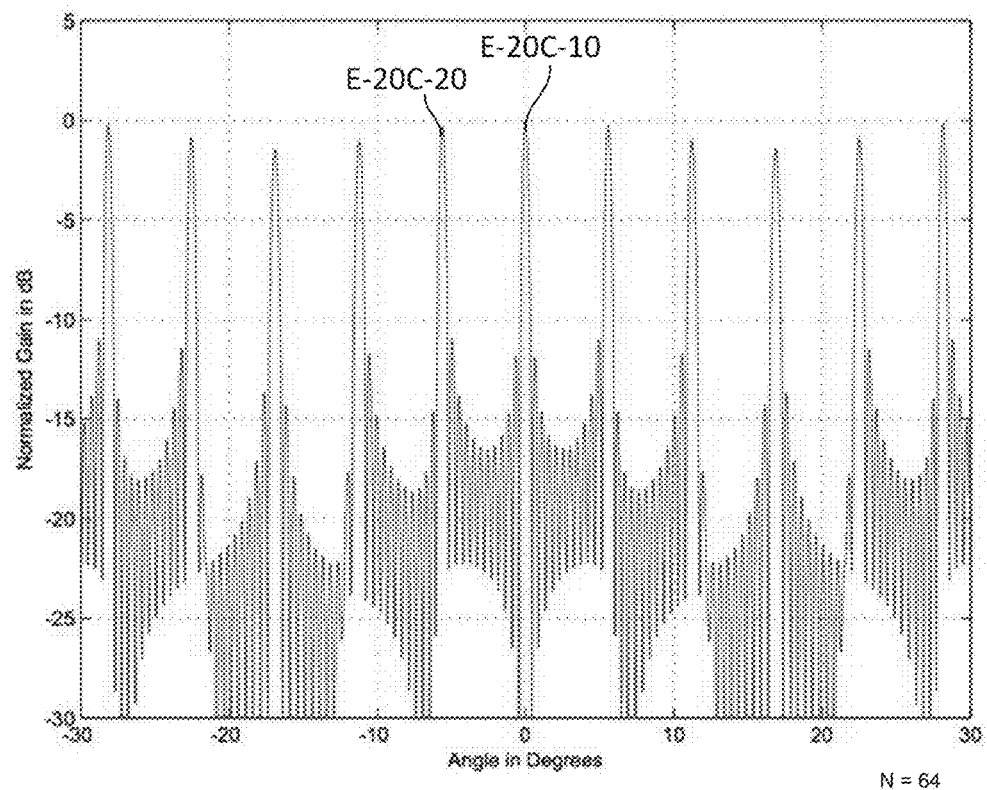

FIG. 20C depicts a plot of the normalized gain in dB relative to the angle of arrival for a signal received by two E-Band (80 GHz e.g., 3.75 mm$\lambda$) antenna "sub-arrays" having a composite 60 cm aperture baseline (160$\lambda$), where the phase center separation of the two sub-arrays is 32$\lambda$ demonstrating phase ambiguity epochs from spatial aliasing.

Figure 20D:
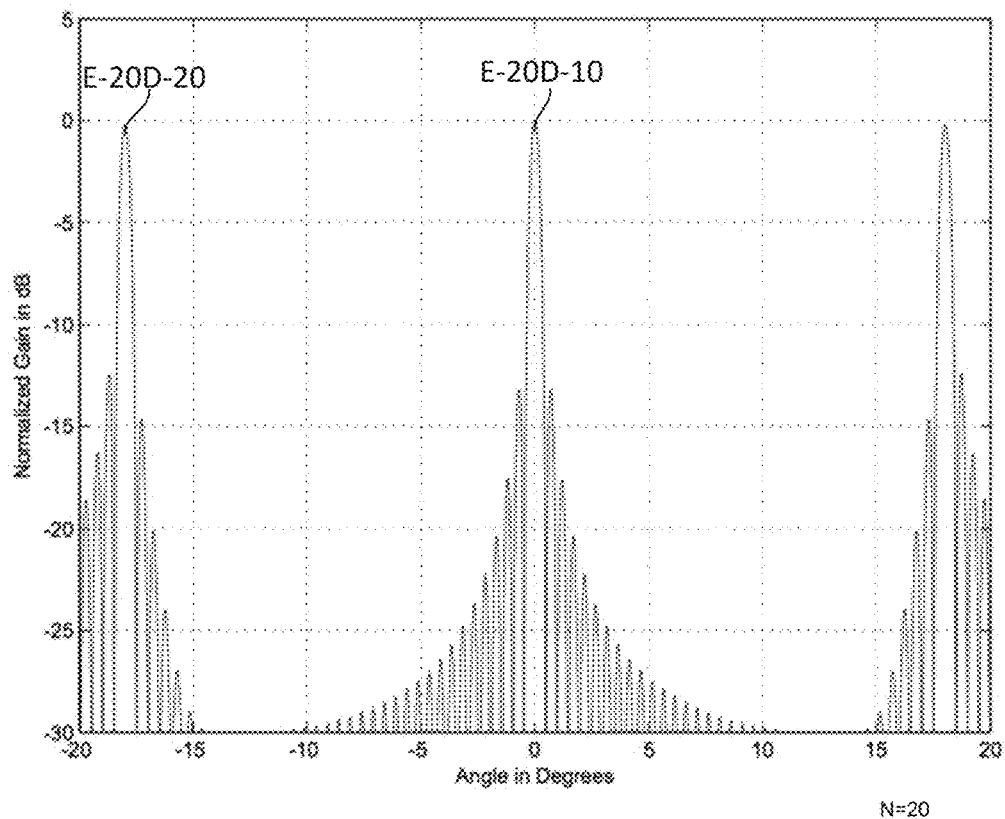

FIG. 20D depicts a plot of the normalized gain in dB relative to the angle of arrival for a signal received by two E-Band (80 GHz e.g., 3.75 mm$\lambda$) antenna "sub-arrays" having a composite 60 cm aperture baseline (160$\lambda$), where the phase center separation of the two sub-arrays is 10$\lambda$ demonstrating phase ambiguity epochs from spatial aliasing.

Figure 21:
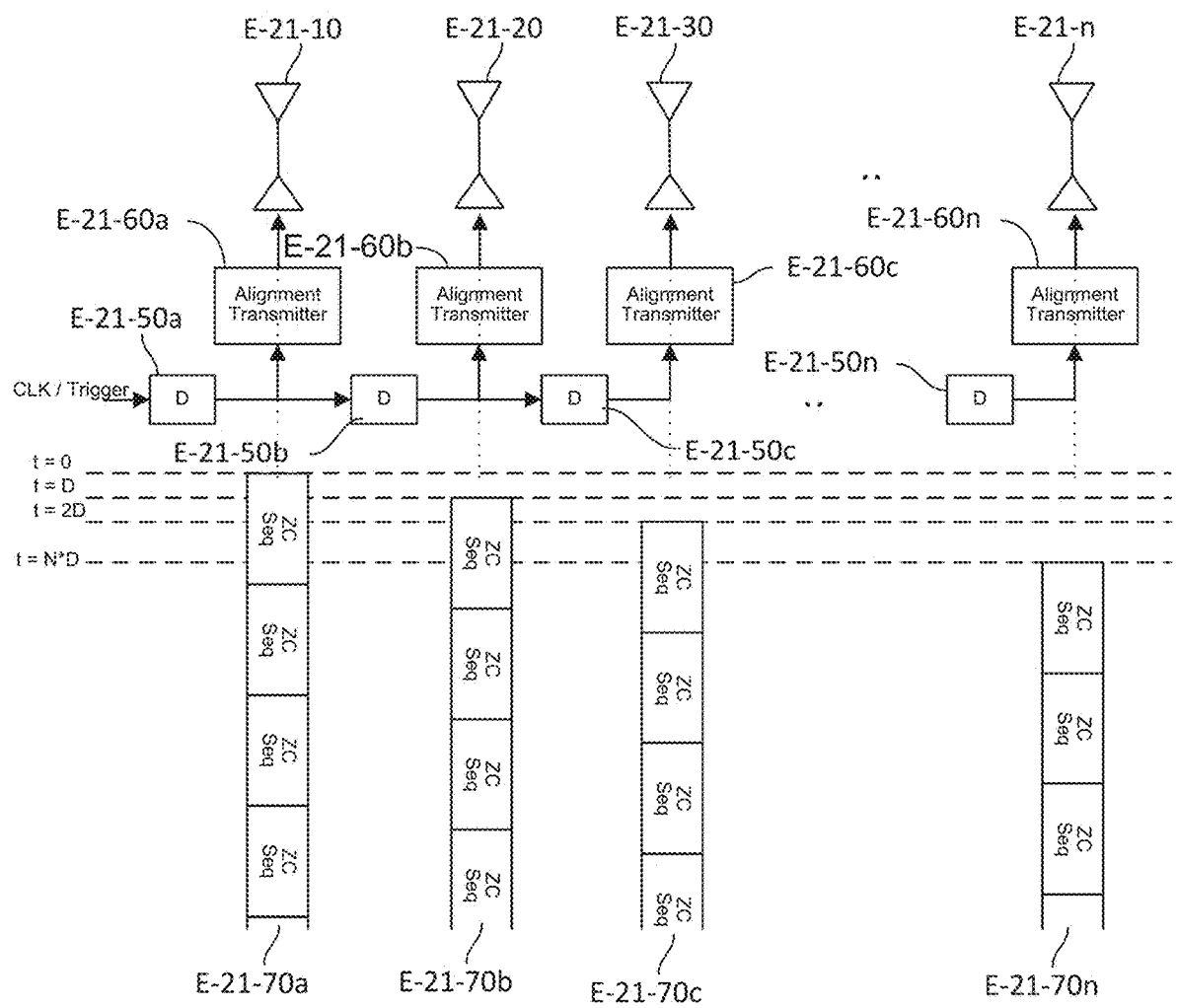

FIG. 21 depicts an exemplary block diagram of an alignment transmitter with separate transmitters and a depicting of the relative timing of transmitted alignment waveforms according to embodiments of the present invention.

Figure 22:
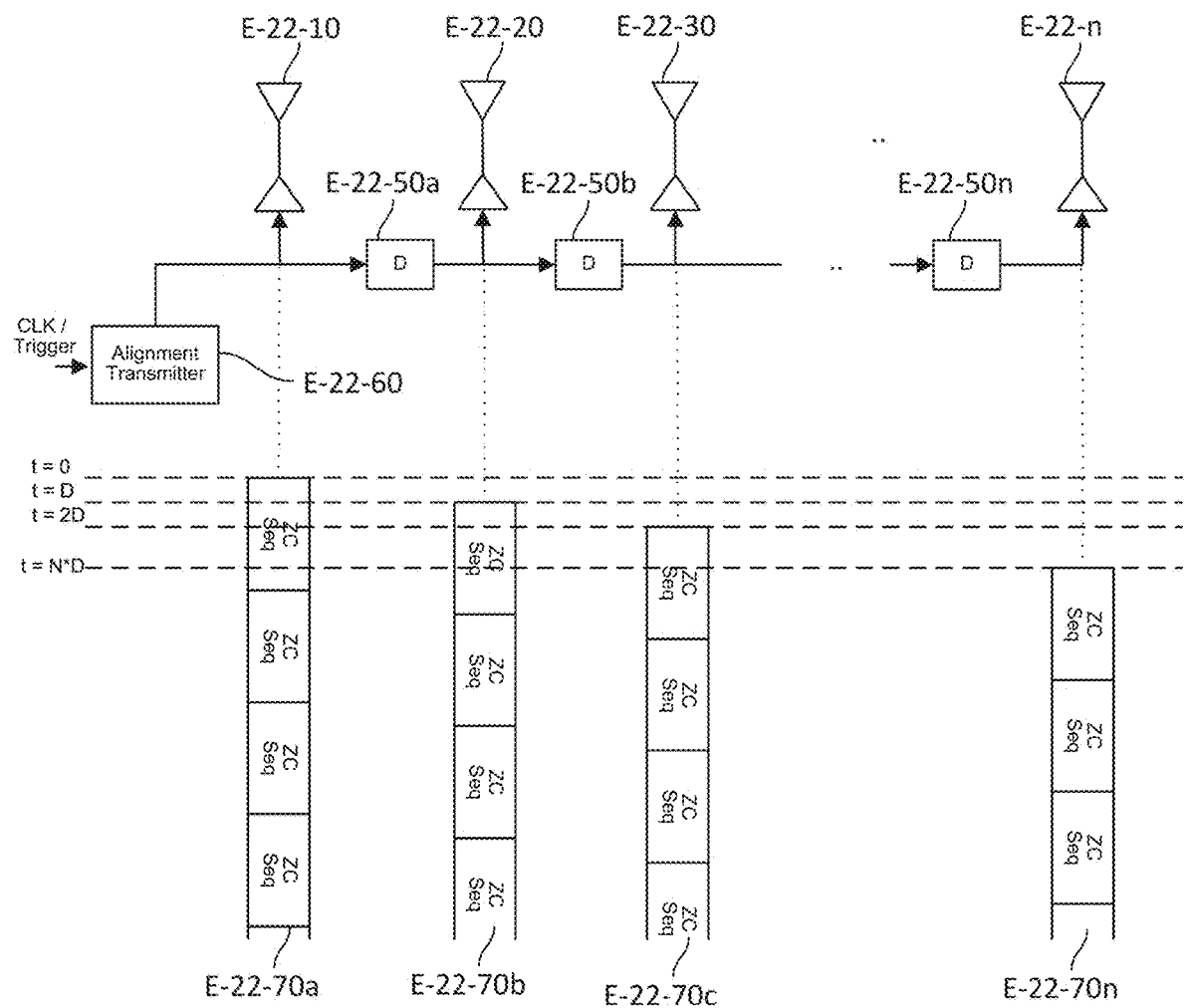

FIG. 22 depicts an exemplary block diagram of an alignment transmitter with a common waveform generator and separate radio frequency delays and a depicting of the relative timing of transmitted alignment waveforms according to embodiments of the present invention.

Figure 23A:
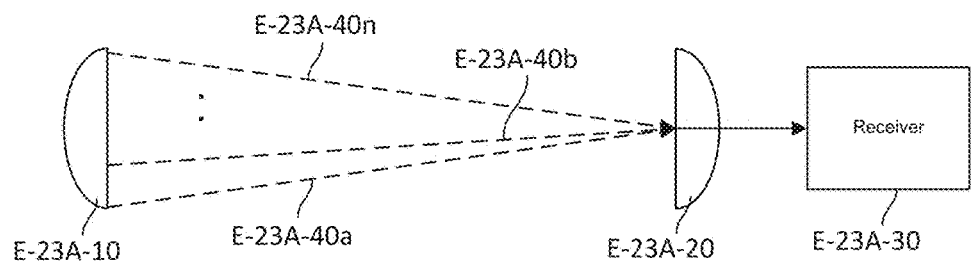

FIG. 23A depicts an exemplary illustration of a parabolic dish antenna having a plurality of radial ancillary alignment antenna element and a receiving backhaul radio utilizing one or more receiver for detecting the alignment waveform according to some embodiments of the present invention.

Figure 23B:
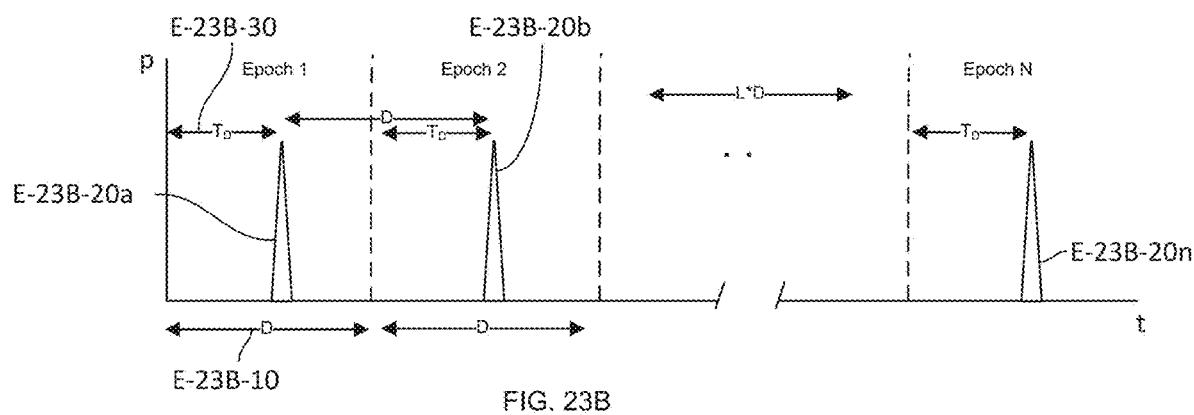

FIG. 23B provides an exemplary plot of receiver correlated alignment waveform power verses time for a plurality of receiver time epochs for use in receiving waveforms for use in detecting transmitter miss-alignment according to some embodiments of the present invention.

Figure 23C:
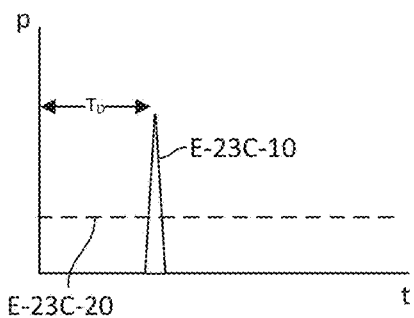

FIG. 23C provides an exemplary plot of receiver correlated alignment waveform power verses time for a combined receiver time epoch output according to some embodiments of the present invention.

Figure 23D:
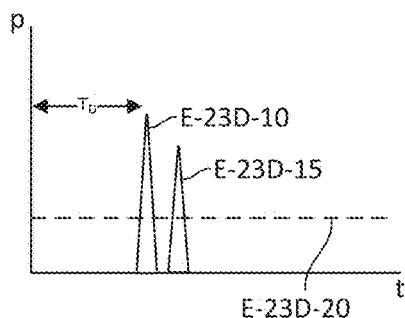

FIG. 23D provides an exemplary plot of receiver correlated alignment waveform power verses time for a combined receiver time epoch output according to some embodiments of the present invention, wherein multiple propagations paths of at least one alignment signal is detected.

Figure 24:
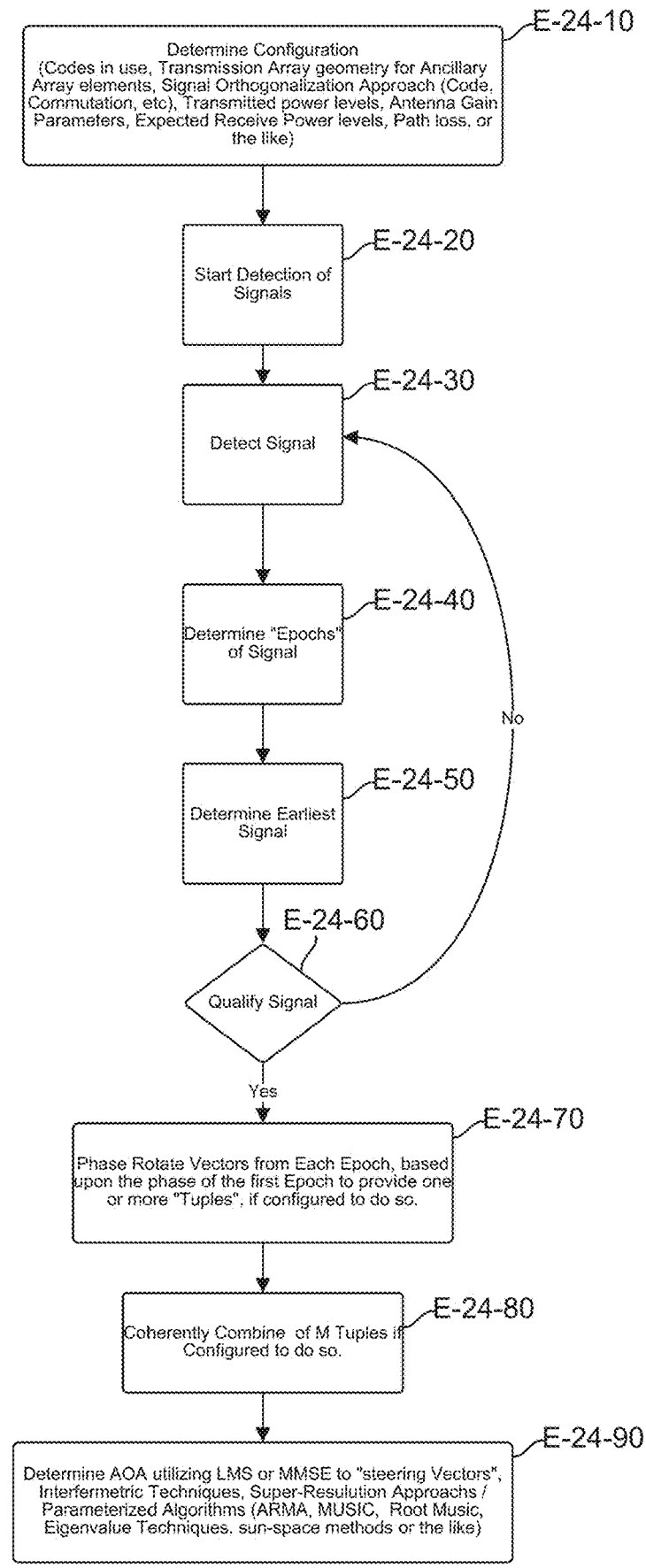

FIG. 24 depicts an exemplary embodiment of receiver processing steps for use during some embodiments of transmission antenna alignment to one or more intended receivers.

DETAILED DESCRIPTION OF THE INVENTION

Aspects of the present inventions provide for significant simplification of the installation processes in specific embodiments.

FIG. 5 is an exemplary flow diagram of an embodiment of a multi-stage point-to-point radio antenna alignment procedure for use in initial alignment and link parameter maintenance, including ongoing alignment in some embodiments. Other embodiments may include point to multipoint radios, of other configurations. The process is started in Step E-5-10 with a technician performing initial mounting of the antenna and radio hardware. Next, in Step E-5-20 a course alignment is performed utilizing one or more of the embodiments of the present invention, which will be discussed in more detail, associated with subsequent figures. In one embodiment, an alignment-aiding device may be utilized which may be integrated with and inside the physical enclosure and housing of the point-to-point radio or may be mounted to the exterior of the radio. The electronics may be comprised entirely or partially integrated and partially external to the radio housing, or in yet other embodiments entirely external. Such an alignment-aiding device in various embodiments may include a GPS receiver, an augmented GPS receiver, a differential GPS receiver or the like. It may further include an accelerometer or other capabilities as will be discussed further. Such an alignment-aiding device may have a display and inputs and an electrical interface to processors or other electronics of the radio. The alignment-aiding device may additionally include a wireless capability such as Bluetooth, Wi-Fi, NFC, or cellular communications capability. Some embodiments of the alignment-aiding device may interface with another wireless device such as a smart phone, which in some embodiments aid in installation. In some embodiments, the capabilities of the smart phone, such as the GPS receiver, may be utilized as part of the functionality of performing course alignment or other steps of the embodiments. Step E-5-30 provides an assessment of whether specific metrics associated with course alignment have been met. If they have not been met, the course alignment is performed again in Step E-5-20, and the process is continued until the course alignment is qualified as passing. The course alignment may include communications between two alignment-assisting devices or phones associated with such alignment-assisting devices so as to allow Internet protocol connectivity to associated alignment-assisting devices or to a central server providing for operation of the course alignment in terms of sharing data or performing calculations in the central server or in the smart phone or within an alignment-assisting device itself attached to or embedded within the radios for each end of a particular link various some embodiments.

Other embodiments may utilize point-to-multi-point link capability, and the current disclosures should not be considered to be limited to point-to-point links. The course alignment may include the calculation of headings utilizing an electronic compass heading and resulting in azimuth settings associated with the compass headings so as to point two point-to-point radio links at each other within a certain tolerance, for example, plus or minus 10 degrees in one embodiment.

In terms of elevation, the alignment-assisting device may include a level sensor and/or an altimeter for feedback in terms of the adjustment of the elevation angle of the antenna. In other embodiments, a GPS receiver may be utilized for both or either of course alignment in azimuth and elevation. As mentioned, an electronic compass may be included within the alignment-assisting device, or such a capability may be utilized from a smart phone or other electronics available to the radio or alignment-assisting device. Such capability may be utilized in feedback associated with azimuthal settings for course alignment. Such feedback may be an indication to an installer who will then manually set the azimuth and elevation settings for proper course alignment (or fine or super fine alignment in various embodiments). Feedback from the alignment-assisting device may be utilized by a technician who will manually make adjustments to the point-to-point radio-mounting bracket so as to align a device to the course alignment parameters, as specified. Additionally, an accelerometer mounted in the alignment-assisting device may be used to determine if adjustments have been made sufficiently and fed back to the technician when the appropriate adjustments have been made. Such feedback may also be based upon an electronic compass or otherwise in conjunction with an accelerometer so as to detect course alignment. Other methods of detecting course alignment may include hybrid radio techniques, which have wider beam patterns than, for instance, an E-band radio parabolic antenna, having a half a degree beam width. In contrast to an 80 GHz radio operating with a 60 cm aperture reflector, some embodiments utilizing a hybrid band radio will operate additionally at 5.8 GHz and having a much wider beam width, such as approximately 14 degrees, when utilizing the same reflector. Such a beam width may detect initial course alignment and provide further direction to the technician through measurements to refine the course alignment, or refinement of the subsequent fine alignment step. As mentioned, Steps E-5-20 and E-5-30 comprising the course alignment procedure and qualifying the course alignment being completed to a metric, may involve utilization of mapping data, manual input of coordinates such as latitude and longitude, GPS measurements or the like to generate a compass heading and an elevation heading, resulting in specific elevation and azimuth values communicated to a technician who may utilize an alignment-assisting device to receive those settings and to determine when the adjustments in azimuth and elevation to the point-to-point radio have been achieved in specific embodiments. The qualification of course alignment having been achieved in some embodiments may be the detection of an alignment signal by the remote peer radio, as transmitted from the local radio being adjusted, or the local radio detecting a remote signal.

Alternatively, settings may be communicated to the technician that are not absolute during course alignment (or other alignment phases), but may be related to adjustments to be made to allow for further measurements to be made. Such instructions provided to a technician in some embodiments may be a number of turns of a specific gear or screw which would be a relative adjustment based upon the current position in elevation and/or azimuth and allow the alignment-assisting device in mechanical registration with the antenna to be incrementally adjusted and provide feedback to allow for the further incremental manual adjustment of the azimuth and elevation of the point-to-point radio to be within the course alignment qualification criteria.

Such qualification criteria may be based upon the determination of the azimuth and elevation being within a target range or may be based upon the detection of a signal to a sufficient quality through either an absolute or iterative process in specific embodiments. Some embodiments may include a method or algorithm to determine if course alignment is not possible to meet. For example, in an embodiment in which signal detection is to be performed, after a number of trials at various azimuth and elevation settings, it may be determined that signal detection may not be achievable within an expected search space having been searched and recorded by the alignment assisting device for example. In one embodiment, it is determined based upon the recorded azimuth and elevation search space that attempting a differing configuration such as relocating the mounting location of one or both of the peer point-to-point radios may be warranted. Such a determination may be based, in one example; if it is determined that other deleterious conditions exist, such as lack of a structure-free Fresnel zone. In other conditions it may be determined that changing the frequency of operation may be warranted—for instance if significant interference is detected. Such measurements may be one criterion for determining whether course alignment (or other stages of alignment) has been achieved.

Alternatively, or in addition to other measured parameters, if the received signal power is not within a tolerance of what is expected, a conditional qualification of the alignment may fail. For example, it may be determined that a predicted signal level based upon a wireless propagation model is not realistic for a specific implementation topology and that too much signal or not enough signal is being received, under which conditions either blockage exists in the form of a structure or fading due to multi-path or an interference level degrading the signal-to-noise ratio or carrier-to-interference ratio (C/I) may, and that a particular goal is not achievable.

Regardless of the specific metric utilized for course alignment, such as RSSI or signal to noise ratio or alignment in terms of compass heading, the alignment process will continue until either the criteria are met or it is determined that too many attempts have been made. If it is determined that it is unlikely that the course alignment criteria will be met in the current configuration, such feedback may be provided to the technician utilizing the alignment-assisting device or through messaging to a smart phone or other display or by sending messages to a central server or the peer radio of the point-to-point link. The indication of, for example, a defined search space having been searched completely one or more times, allows proper action to be taken through reconfiguration of operating frequency or physical location or other physical reconfiguration. For example, a determination of interference sources interfering with the current configuration may be identified, and the adjustment of the antenna so as to minimize such interference may be made.

Following the criteria of the course alignment being met, fine alignment is performed in E-5-40, which would include, in embodiments, the detection of signal from the peer radio and the adjustment of the detecting radio's alignment. In other embodiments the detection of an alignment-assisting signal is utilized to provide feedback relating to adjustment of the remote radio's alignment in elevation, azimuth power or other link parameters. Based upon qualifying the fine alignment in Step E-5-50, it is determined if a fine alignment metric is met. This determination may involve the determination of the radio channel propagation impulse response which may include the determination of reflections from structures within Fresnel zone, meeting signal detection power levels, signal noise ration levels or the like. Feedback to a technician performing installation at one or both of the local and remote peer-to-peer radios of a desired link may be provided by the alignment assisting devices. Such feedback may include specifying an angle, elevation setting and power level to be achieved or may be feedback relative to the current parameters for alignment, for example adjusting 3 degrees in the positive direction of the azimuthal settings and 1½ degrees in positive elevation setting. Such adjustments may additionally include power level settings, or expected target levels in some embodiments. In other embodiments power levels may be adjusted automatically utilizing an automatic power control process and facilitated by the alignment assisting devices or other methods.

Further qualification may be based upon channel propagation modeling based upon the physical distance between the peer radios and a calculated radio propagation path loss between the two radios and knowledge of the transmitting power from one radio to the receiving radio. A tolerance in which the predicted power should be received relative to the received signal strength indication that is actually received may comprise a qualifying criterion in some embodiments.

Following qualification of fine alignment in Step E-5-50, superfine alignment may be performed in E-5-60 allowing for the determination and refinement of the absolute peak of the antenna radiation patterns. In one embodiment course alignment may be made based upon calculated angle and azimuth settings, where fine alignment may be determined based upon a hybrid radio utilizing 5.8 GHz (i.e. "ISM") band transmissions, and superfine alignment may be achieved utilizing the intended data link operating frequency such as E-band 80 GHz or V-band 60 GHz operation. Further details of embodiments of a hybrid radio may be found in U.S. Pat. No. 9,572,163. The adjustment of angle and azimuth during the superfine alignment determination may be based, in some embodiments, upon the detected power at the intended receiver and indications to a technician making adjustments to the transmitter's alignment. In such an embodiment, a scan of a series of receive or transmission antenna settings may be used to search for the absolute peak of the antenna patterns. The determination of the peck alignment, in some embodiments, is based upon direction of the signal by the alignment-assisting device. The alignment assisting device may provide indication of the adjustments to be made, and current alignment settings, the detected power levels at those settings and/or other link parameter measurements to the technician, a remote server, a remote alignment-assisting device, and one or both of the smart phones involved in the communication link in various embodiments. The recoding of the power levels or other link parameters and the associated alignment settings may be recorded by one or more of the devices or servers, and a determination of the peak alignment made, so as to prevent the technician from having to recorded such measurements and positions in some embodiments. In other embodiments the actual determination may be made by the technician, utilizing the information from the scan process presented on a display of a device such as a smartphone. Such presentation of the data may be processed and displayed in a form different from that in which it was recoded. For example, the order of the measurements, the indications of the values, or the like may be made in a form intuitive for the user, rather than in tabular and ordered form as the information was recorded. For example "heat maps" may be presented showing a color indicating an alignment criteria value relative to an X-axis or a Y-axis indicating angular settings in azimuth and elevation, in one embodiment. Other graphical or numerical presentations are further contemplated.

In one embodiment of E-5-70, once superfine alignment is qualified based on the determination meeting a power level within a tolerance, and a maximum power level relative to adjacent detected levels (and potentially other criteria further qualifying the link and being acceptable), the operation proceeds to E-5-80 where maintenance metrics are monitored. In some embodiments the "further criteria" may include the determination of multipath signal being detected indicating structures within the Fresnel zone, the structural stability of the antennas based upon detected power levels, or sensors of the alignment assisting devices, or the like. Similar metrics may be utilized in E-5-80 where the maintenance metrics are monitored. If maintenance metrics are satisfied then operation in maintenance mode will continue at E-5-80. Such metrics may include received power levels, received signal noise ratios, supportable data rates, frame error rates, bit error rates, or the like. Other metrics may include impulse response characteristics such as a single propagation path being detected versus multiple paths, or the ability to equalize the channel versus the ability to not equalize the channel in various embodiments.

If the metrics are not met, for instance the signal power drops by more than some tolerance then processing proceeds to Step E-5-90 to perform maintenance adjustments which may be automatic such as power level adjustments or may be manual such as sending a notification to the network operations center or other monitoring device, alerting them to the state of the link and their ability to determine whether a site visit of a technician is warranted or not.

In some embodiments minor alignment adjustments may be achievable through electronic tuning of the antenna. Such tuning may involve mechanical adjustment using motors or other methods or may be electronically tunable such as utilizing parasitic elements or phased array or beam-former techniques. It is intended that the maintenance mode between Steps E-5-80 and E-5-90 will not terminate in some embodiments but would operate continuously while the data link is operating.

Referring now to FIG. 6, a block diagram of functional elements of an alignment-assisting device is shown for some embodiments of the current invention. Such functional elements may be physically integrated with a radio of the current invention while other embodiments such an alignment-assisting device may be external and mounted to the radio allowing for mechanical registration of the alignment-assisting device to the radio. In other embodiments the functionality of the alignment-assisting device may be partially integrated and partially external to the radio. In yet further embodiments, some elements of an alignment-assisting device embodiment may be integrated with the radio, some may be physically mounted external to the radio so as to be reusable or removable and replaceable, and yet other elements may be not physically mounted to the radio at all, but be comprised as part of a smart phone or other device with some of the capability being provided as part of the alignment-assisting device functionality.

Referring to FIG. 6, a processor to execute software instructions in one embodiment is provided (E-6-10), the processor having access to volatile memory (random access memory—RAM, for example) E-6-20, and non-volatile memory E-6-30 (for instance flash memory in one embodiment).

General-purpose input and output may be provided as GPIO block E-6-40. Such GPIO may include interfaces to displays or LEDs or controls interfacing to the radio or alarm OA&M systems. Block E-6-50 provides analog to digital conversion and/or digital to analog conversion for interfacing with voltage levels that may be used to control aspects of the radio and/or its alignment of its directional antennas, or to receive indications of received signal strength and/or other proper alignment metrics received as analog voltages and converted to digital through an analog-to-digital converter in some embodiments.

Block E-6-60 is a radio interface that may be a serial port, a bus, a USB or other digital interface or analog interface allowing for communication between the alignment-assisting device and a radio. For instance such an interface may allow for processor E-6-10 to be in communication with a processor of a radio.

Display E-6-80 may be used to provide feedback to an operator or a technician providing performance metrics such as current data rate, received signal strength indication, the radio's identification information as well as the identification information of a peer radio with which a link has been established, interference levels, indications of adjustments to be made in azimuth, elevation, or other link parameters, the current link parameters including the current angle of azimuth and angle of elevation as well as a desired azimuth and elevation setting, or the like in various embodiments. Input from the user may further be received on the display for instance, using a touch screen display of E-6-80 in some embodiments or a keyboard or switches or other buttons may be included with such a display. GPIO of E-6-40 may be utilized in conjunction with the display for user input and output.

Positional encoder E-6-70 may be utilized by processor E-6-10 in some embodiments to determine the azimuth and elevation settings currently set within the current configuration or may be used to determine an amount of angular or azimuthal change that has occurred during adjustments by a technician or by motorized or other methods of adjustment so as to provide feedback to the control of such adjustments. For instance, the technician or a programmable control loop may be controlled or instructed to make adjustments to the positioning of the propagation direction of the directional antenna in various embodiments.

Accelerometer E-6-90 may be utilized by processer E-6-10 in some embodiments to determine adjustments that are made in angle of azimuth or elevation during the installation process. Further the accelerometer may be used as an installation-qualifying metric to determine the amount of sway or twist of a structure and to determine if such structure is mechanically rigid or not to maintain the link or if some indication should be fed back to a technician or a monitoring authority that the tolerance of sway and/or twist or other mechanical vibration has exceeded a target threshold. Such qualification may be utilized associated with the alignment qualification steps for instance of FIG. 5, the qualifying course alignment E-5-30, qualifying fine alignment E-5-50, qualifying superfine alignment E-5-70, or the maintenance metrics of E-5-80, any of which in various embodiments may utilize input from any or all of the sensors associated with FIG. 6 including the accelerometer E-6-90.

An electronic compass is included in some embodiments E-6-100 so as to determine an absolute pointing vector in azimuth allowing for alignment. For example, course alignment of one or more of a local or remote point-to-point radio in some embodiments may be made. A GPS receiver E-6-110 may be included which may allow for the calculation of a desired heading in azimuth between two defined points (radio locations) using known location of both of the radios to calculate an azimuthal and/or elevation angle of alignment for each of the two radios so as to provide direction during the installation process. Such a GPS receiver may be external for instance within a smart phone or separate electronic device and interface to the alignment-assisting device so as to provide GPS location during installation and may be removed and reused elsewhere as part of an installation equipment. The alignment-assisting device may further include a Wi-Fi or Bluetooth capability E-6-120 in some embodiments. Such an interface may be utilized to communicate with the GPS E-6-110 or the electronic compass E-6-100 or any other sensors or capabilities including interfacing to a cellular modem E-6-130. Such a cellular modem may be included within the alignment-assisting device, may be included integrated with the radio, external to the radio, or as part of a separate cell phone or smart phone in communication with the alignment-assisting device as a further capability. Such communication with the cellular modem may be performed by Wi-Fi or Bluetooth or by a wired connection such as Ethernet, wired networking E-6-140, or a USB interface. Servers or stepper motors may be interfaced by E-6-150 or may comprise one or more of the interfaces, the drivers or the motors themselves. Such motors may be utilized in the process of course, fine or superfine or all or any combination of such alignment processes. Feedback to perform adjustments may be determined by processor E-6-10. Processer E-6-10 may be embedded within the radio, may be part of the radio integrally, may be external to the radio and mounted with an external alignment-assisting device, or some or all of the processing capability may be performed by a separate processor such as that of a smart phone running an application installed on that smart phone for example an Android phone running an Android application or an Apple phone running an iOS application or a iPad, computer or even a remote server such as a central server to perform off-loaded calculations or control of one or more of the processes which would otherwise be performed by processor E-6-10.

Referring now to FIG. 7A a point-to-point radio with an integrated parabolic reflector antenna is shown diagrammatically as one example of an E-band radio having an alignment-assisting device integrated within the housing of the radio itself as E-7A-10 integrated alignment-assisting device/electronics.

Referring now to FIG. 7B the same E-band radio in the current embodiment includes an internal alignment-assisting device E-7B-20 and an external alignment-assisting device E-7B-10 which together may comprise a complete alignment-assisting device or may require further capabilities from external processors or sensors as previously discussed in various embodiments. One reason for having split electronics associated with alignment-assisting device might be a requirement to have a highly accurate differential or surveying quality GPS receiver integrated in the external alignment-assisting device which would not be required during continual operation but may be mountable to the antenna/radio during the installation process and be in communication with alignment-assisting device E-7B-20. Internal alignment-assisting device E-7B-20 in some embodiments would include the sensors and capabilities required for maintenance qualification but not require potentially expensive sensors and capabilities not required during maintenance qualification during link operation. Such an external assisting device may be reused associated with other installations. Such an external alignment-assisting device may include data links to central servers or other external or integrated alignment-assisting devices allowing for communication between the two, in some embodiments using the Internet protocol and encryption links and potentially using the Internet as an intermediary communication network, either public or private Internets as specified in RFC-791 or the like.

FIG. 7C is a depiction of an exemplary embodiment of a fixed point-to-point radio with an integrated parabolic reflector antenna and including an embodiment of an integrated alignment-assisting device (I-AAD) with an exemplary interface to a mobile wireless device. An integrated alignment-assisting device E-7C-10 is shown with a point-to-point radio, in one embodiment, with a communication link E-7C-30 to a smart phone E-7C-20 in associated embodiments. Other embodiments may provide for a higher performance device being external and including cellular communication capability. Some embodiments may include other sensors such as highly accurate GPS or other positioning determination electronics such as Glonass or the like. In one embodiment a smart phone E-7C-20 may be used to provide Internet protocol access to public or private networks allowing for interfacing with other servers or other alignment-assisting devices.

FIG. 7D is a depiction of an exemplary embodiment of a fixed point-to-point radio with an integrated parabolic reflector antenna and including an embodiment of an external alignment-assisting device (E-AAD). In one embodiment, an external alignment-assisting device is interfaced with the radio, the radio having no integrated alignment-assisting device components. The external alignment-assisting device E-7D-10 in various embodiments would comprise any combination of the sensors and components/capabilities associated with FIG. 6 or other embodiments discussed herein.

FIG. 7E is a depiction of an exemplary embodiment of a fixed point-to-point radio with an integrated parabolic reflector antenna and including an embodiment of an external alignment-assisting device (E-AAD) with an exemplary interface to a mobile wireless device in communications with a cellular network. FIG. 7E provides an exemplary depiction of point-to-point radio interfaced with an alignment-assisting device E-7E-10, a data link E-7E-20 to smart phone in one embodiment E-7E-30. The link E-7E-20 may be Bluetooth, Wi-Fi, USB wired or any other means of communication between the two devices. Wireless link E-7E-40 in the current embodiment is envisioned to be comprised of one or more of GSM, GPRS, 1xEV-DO, CDMA, WCDMA, HSUPA, HSDPA, LTE, Wi-Max, or other 2G, 3G, 4G, 5G data capability. Such a data capability may further be utilized to allow for communication of information associated with the alignment-assisting device of two respective peer radios of a point-to-point link or in other embodiments a plurality of radios in a point-to-multipoint link. Such capability may further be utilized associated with disclosures associated with the self-organizing backhaul radio (SOBR) capabilities of U.S. patent application Ser. No. 14/624,365 by the same inventors of the present inventions and incorporated herein by reference, in its entirety. Cellular tower E-70-50 would comprise a cellular base station, a BTS, a NodeB, or an eNodeB (or the like) and associated electronics and backhaul data interfaces as is known in the industry to connect to a core network of a cellular operator or to other data networks and allowing for connectivity to a packet data network including public or private Internets.

FIG. 8A is an exemplary illustration of the use of cellular devices to facilitate a communications link for use in embodiments of the initial alignment and configuration procedures in some embodiments. FIG. 8A depicts aspects of embodiments of the present invention showing two towers E-8A-25 and E-8A-15. Within the current embodiment, point-to-point radios respectively E-8A-20 and E-8A-10, each having a parabolic reflector antenna in one embodiment, said radios being peers in a desired point-to-point line-of-sight radio link in the current embodiment. In the present embodiment smart phones E-8A-60 and E-8A-50 are respectively in communication with alignment-assisting devices integrated with radios E-8A-20 and E-8A-10 respectively. In one embodiment, communications between the two smart phones are performed utilizing logical link E-8A-55 performed utilizing, in the present embodiment, the cellular network depicted in the diagram. The cellular network provides such communication utilizing a cellular link as previously described E-8A-75 to a cellular base station. Said cellular base station utilizes a backhaul data link E-8A-85 to a core network E-8A-90 to a further backhaul network E-8A-80 to cellular base station providing cellular link E-8A-70 to smart phone E-8A-50 in the present embodiment. Other alternatives may be utilized as previously discussed and elsewhere within the present application in further embodiments.

Such a communication link E-8A-55 allows for the sharing of alignment-assisting device information between the two radios E-8A-20 and E-8A-10. In some embodiments data associated with the radios, such as their location for use in calculating course alignment values, operating frequency channels, for use in setting common operating channels, and other configuration information may be communicated. Such configuration information may further include data rate information, modulation types, forward error correction (FEC), encryption, security keys and the like. Further provisioning information is additionally contemplated as being provided to the radios either independently or in a coordinated fashion.

Based upon known map coordinates or GPS measurements or other location measurements the course alignment, azimuth and elevation may be calculated by one or both of the alignment-assisting device processors, by one or both of the smart phones, or by a separate processor entirely either remotely or distributed across plurality of sub-processors. Further link E-8A-55 may be used to communicate transmitted power levels and modes of operation during installation between the two radios including parameters to configure such modes such as the use of a specific bandwidth and frequency, signals to be transmitted and detected such as specific Zadoff-Chu channel codes, base codes, code shifts, and scrambling information including encryption keys and times of activity.

In some embodiments the blooming process of related applications such as the self-organizing back-call radios (SOBR), U.S. patent application Ser. No. 14/624,365, previously incorporated, may be provided as well as any and all techniques associated with SOBR and related applications included herein by reference.

In one embodiment the performance of course alignment, fine alignment and superfine alignment and the associated waveforms and operation of each radio may be controlled or coordinated via link E-8A-55. The alignment quality criteria may be measured and data fed back associated with satisfying associated metrics over link E-8A-55 as well.

In one embodiment the authentication of a peer radio as being an authentic an radio may be performed by transmitting varying power levels, varying information, one-time use codes or the like over a primary link during one or more modes of the installation process and fed back over the out-of-band channel E-8A-55 to satisfy the question of authenticity of one peer radio relative to the first and vice versa.

FIG. 8B is an exemplary illustration of the use of cellular devices to facilitate a communication link for use in embodiments of the initial alignment and configuration procedures including the use of a remote server in some embodiments. Additional logical communication links E-8B-10 and E-8B-20 are provided to a remote server which allows for the control of the radios in one embodiment, allows for performance of calculations remotely in other embodiments, and allows for provisioning in yet further embodiments in any and all approaches discussed herein.

FIG. 9A is a diagram of an exemplary embodiment of a point-to-point link utilizing two backhaul radios having fixed high gain antennas wherein alignment is suboptimal based upon an exemplary "course alignment" procedure. Referring now to FIG. 9A, a diagram of an exemplary embodiment of a point-to-point link is depicted utilizing two backhaul radios having fixed high gain antennas wherein the alignment is suboptimal based upon an exemplary coarse alignment procedure but is sufficient relative to a course alignment criteria in one embodiment. The coarse alignment procedure, in some embodiments, is one step associated with embodiments of FIG. 5 and more specifically Step E-5-20 and associated Step E-5-30. The point-to-point radios in one embodiment are labeled E-9A-10 and an associated peer point-to-point radio E-9A-20. Each of the two point-to-point radios having a high-gain antenna in one embodiment in which multiple beam widths are utilized. For example where an ISM band 5.8 GHz alignment is utilized to perform fine alignment following the coarse alignment procedure as described in FIG. 5. In specific embodiments, the coarse alignment would be made using latitude and longitude information associated with the location of the two point-to-point radios derived from a map or from GPS or other information. In such an embodiment in which multiple beam widths are utilized. The beamwidth may be determined by operation of a parabolic dish at an ISM band resulting in a higher beam width antenna and then subsequently at the desired operational frequency such as V-band or E-band wherein the same parabolic antenna is utilized but having a resulting larger effective aperture size relative to the operational wavelength. As discussed the 3 dB beam width of a parabolic reflector antenna is dependent upon the operational wavelength as well as the diameter. If the physical diameter remains constant and the wavelength is reduced then the effect of aperture in wavelengths is significantly larger resulting in a narrower beamwidth. Such a relationship can be seen associated with Equation E-1C as depicted in FIG. 1C approximation for the beam width of parabolic dish antenna. The numerator contains $\lambda$ (wavelength) and the denominator contains D (the diameter of the parabolic dish antenna). As $\lambda$ deceases so does the resulting 3 dB beamwidth. The relative beamwidths will be proportional to the relative difference in operational wavelengths. For example two different signals being transmitted from the same parabolic dish one having twice the wavelength of the other would have twice the effective 3 dB beamwidth, respectively.

In one more typical example, an E-band signal having 80 GHz frequency operation having 1 degree 3 dB beamwidth would have a corresponding a beamwidth of 13.8 degrees when operated at 5.8 GHz, using the same parabolic reflector. In one embodiment the 5.8 GHz signal would is designated by the dash lines E-9A-30 and E-9A-40 (not to scale) relative to the ideal alignment between Radio E-9A-10 and E-9A-20, indicated by dotted line E-9A-50 signifying the point-to-point link between the two radios.

FIG. 9B depicts an exemplary plot of normalized antenna gain plots for embodiments of an exemplary hybrid backhaul radio depicting the main antenna lobes of each of a plurality antenna patterns having differing main beamwidths. For example, an E-band radio using a parabolic dish antenna having a 3 dB beamwidth of 0.5 degrees indicated by the solid line, E-9B-40 would have a proportionally wider 3 dB beamwidth utilizing the same parabolic reflector antenna when operating at 5.8 GHz resulting in a 3 dB beamwidth of 7.2 degrees as indicated by E-9B-20 and the antenna pattern E-9B-15. Furthermore, a 15 dB beamwidth for the 5.8 GHz antenna pattern would be indicated by E-9B-30 as having a beamwidth of 14 degrees.

Referring back to FIG. 9A one can see that radio E-9A-10 is misaligned relative to its ideal point-to-point link E-9A-50 based upon the nonsymmetrical nature of the dash lines (not to scale) associated with the beamwidth indicated by E-9A-30. Such coarse alignment in one embodiment being based upon a goal of getting coarse alignment to within the 14-degree beamwidth of the 5.8 GHz antenna characteristics. The same situation is apparent associated with radio E-9A-20 as the beamwidth E-9A-40 (also not to scale) is not ideally aligned with point-to-point link E-9A-50. Therefore the coarse alignment has achieved, in one embodiment, alignment within the 15 dB beamwidth of the 5.8 GHz signal (within 14 degrees) which would allow performance of fine alignment as discussed previously and utilizing a 5.8 GHz signal and proportionally wider beamwidth to be detected for use in the fine alignment process. Following the coarse alignment, a fine alignment may be performed utilizing the detection of the 5.8 GHz signal in various embodiments so as to subsequently align to within the main beamwidth of the 80 GHz signal having a 3 dB beamwidth of 0.5 degrees, or a 15 dB beamwidth of 1 degree. Such a beamwidth within a 15 dB beamwidth (1 degree) would be able to be detected over a larger angular alignment. Therefore in one embodiment the goal of the fine alignment would be to align within a 15 dB beamwidth of the 80 GHz point-to-point radio antenna beamwidth so as to allow superfine alignment at 80 GHz frequency operations. Other embodiments may allow for modification of the beamwidth by parasitic antennas, beam forming, phased array, sub-array or other antenna arrangements as discussed elsewhere within this application, or related applications such as U.S. Pat. No. 9,572,163. In other embodiments a modification of the beamwidth may be performed at the same frequency and not requiring a hybrid radio or multi-frequency operation for the alignment procedure. Such embodiments are described associated with FIGS. E-10C, E-10D, E-13, E-20A, E-20B, and elsewhere.

FIG. 10A is a depiction of an exemplary embodiment of a fixed point-to-point radio with an integrated parabolic reflector antenna and including an embodiment of one or more ISM band auxiliary antenna(s) with central focal point alignment for use with one or more embodiments of the current invention.

Referring now to FIG. 10A, in one embodiment, is an E-band point-to-point radio with an integrated parabolic antenna as discussed elsewhere in this application, but with the addition of a dielectric supporting structure which may be a radome E-10A-30 and further central 5 GHz antenna E-10A-10. The perimeter of the parabolic antenna is depicted in a frontal view as E-10A-20 and showing the center 5 GHz antenna E-10A-10. Antenna E-10A-10 may be a cavity-backed patch antenna that radiates toward the reflector. It may also be polarized so as to have horizontal and vertical transmission feeds allowing for the transmission of differing signals or the same signal in various embodiments. It may also be a composite antenna having more than one antenna element allowing for the transmission of offset signals from the central axis within an integrated antenna array package. Such offsets from the central axis would result in an offset radiation pattern and a relative phase difference between each of the transmitted signals depending upon the angle of the main reflector relative to detecting receiver. The placement of antenna E-10A-10 is aligned with sub-reflector as indicated in FIG. 10A. The sub-reflector for the E-band antenna receives transmissions from a feed horn that then reflects signal back toward the main reflector. Therefore a shadowing effect along the axis to the left would occur. As a result, antenna E-10A-10 radiating toward the reflector would be in a "blind spot" to the transmitting E-band operation and would not interfere in some embodiments with the operation of the E-band antenna due to a radio-frequency shadowing effect. Likewise, antenna E-10A-10 may be constructed so as to have an antenna beam pattern in which less signal is transmitted axially and more signal is transmitted so as to avoid transmission at the sub-reflector and allow for transmission toward the main reflector in terms of the antenna pattern of the 5 GHz antenna pattern. Such an arrangement would allow for a convenient method of utilizing both a 5 GHz transmitter/receiver and the E-band 80 GHz transmitter receiver operation which may be performed individually or may be performed at the same time. When performed individually such operation may be utilized only for installation purposes in one embodiment while in other embodiments it may be utilized jointly for ongoing maintenance alignment operation or for the coordination with other point-to-point links. For instance, such coordination may aid to assess the potential for interference of an E-band or V-band link.

FIG. 10B-1 is a depiction of an exemplary placement of one or more auxiliary antenna(s) relative to the on-axis focal point of a parabolic reflector antenna with alignment on-axis but further from focus for use with one or more embodiments of the current invention.

Referring now to FIGS. E-10, B-1 through E-10B-6 the placement of an ancillary transmitter (in one embodiment for 5 GHz) is depicted in various configurations. Such configurations may be used individually or jointly in combinations of these figures. Referring specifically to FIG. 10B-1 reflector E-10B-10 is utilized by antenna E-10B-20 where specifically in FIG. 10B-1 the location of the ancillary antenna is outside or further from the reflector than the focal point. By moving the location of the antenna beyond the focal point it will cause a "defocusing" of the resulting antenna pattern utilizing the reflector. As a result, the relative antenna beamwidth would be modified to be wider than would otherwise be the case in the far field of the antenna.

FIG. 10B-2 is a depiction of an exemplary placement of one or more auxiliary antenna(s) relative to the on-axis focal point of a parabolic reflector antenna with alignment on-axis but closer than the focus for use with one or more embodiments of the current invention. A similar condition exists associated with FIG. 10B-2 where the antenna E-10B-20 is moved closer than the focal point to reflector E-10B-10. This too would result in a broader beamwidth for the signal propagating from transmitter E 10B-20.

FIG. 10B-3 is a depiction of an exemplary placement of one or more auxiliary antenna(s) relative to the on-axis focal point of a parabolic reflector antenna with alignment off-axis but equidistant with the focus for use with one or more embodiments of the current invention. Referring to FIG. 10B-3 in this instance antenna E-10B-20 is offset from the bore sight Y axis relative to reflector E-10B-10 which would cause the signal pattern to be offset from the axis moving the peak radiation to the right of the Y axis.

FIG. 10B-4 is an alternative depiction of an exemplary placement of one or more auxiliary antenna(s) relative to the on-axis focal point of a parabolic reflector antenna with alignment off-axis but equidistant with the focus for use with one or more embodiments of the current invention.

FIG. 10B-4 would have the ancillary transmitting element E 10B-20 offset to the right of the Y-axis causing the peak radiation of the antenna pattern to be offset to the left of the Y-axis.

FIG. 10B-5 is a depiction of an exemplary placement of one or more auxiliary antenna(s) relative to the on-axis focal point of a parabolic reflector antenna with alignment off-axis and further than the focus for use with one or more embodiments of the current invention.

FIG. 10B-5 has placed the ancillary antenna element both further than the focal point of the antenna and also to the left of the bore sight Y-axis resulting in a broader beam pattern and offset to the right of the bore sight pattern.

FIG. 10B-6 is a depiction of an exemplary placement of one or more auxiliary antenna(s) relative to the on-axis focal point of a parabolic reflector antenna with alignment off-axis and closer than the focus for use with one or more embodiments of the current invention. FIG. 10B-6 has moved the ancillary transmitter element E-10B-20 closer than the focal point and to the right causing the radiation pattern to be offset to the left and to be broadened relative to the beamwidth transmitted from the focal point itself. As mentioned these elements may be used individually or may be used in combination to allow for tuning of the antenna beam pattern resulting in the ability to detect separate signals from each transmitter or each position of the antenna allowing for a determination of the alignment of the transmitting antenna relative to the intended receiver. The specific types of waveforms to be transmitted in some embodiments may be a standard point-to-point link signal where detection may be performed based preambles or other known sequences or may be a specific alignment signal such as that of CAZAC, PN, Walsh, Zadoff-Chu code or other sequence which will be discussed further associated with subsequent figures in this disclosure.

An alternative antenna structure will now be discussed, in which alternative radiation patterns are achieved from multiple elements, having a plurality of antenna pattern main lobe widths. Referring to FIG. 10C, a multiple element array antenna is depicted, having four antenna apertures. Each aperture may be implemented as one or more individual elements comprising the overall radiating individual radiating structure referred herein as an aperture. The upper half of the array comprises a narrow beam width antenna aperture $TX_N$ (E-10C-10) used for transmission in the present embodiment, and a wider beam width antenna aperture $RX_W$ (E-10C-20), utilized for reception in the current embodiment in one configuration. An isolating dielectric area E-10C-60 separates the two radiating structures. It should be noted, the beamwidths of the various antennas are inversely proportional to the each antenna aperture size, for a given radiating radio frequency signal. Such a relationship was discussed associated with EQ. E-1C of FIG. 1C for a parabolic dish antenna. A similar principle applies in the current discussion for non-circular radiating apertures as well. For example, for a rectangular aperture having a dimension with a more narrow length will have a wider angular radiating pattern as compared to a wider dimension of the rectangle, with all other factors held constant. Similarly, a larger dimensioned aperture (a rectangle in the current embodiment) will have a narrower radiating pattern than a smaller but proportional radiating rectangular aperture. Given $RX_W$ fits within the area of $TX_N$, $RX_W$ will have a wider radiating main lobe beam width. The area "missing" from $TX_N$ occupied by $RX_W$ will cause a reduction in the over gain of the element, but generally not significantly the beam width of the main radiating pattern. That is not to say the pattern, in some implementations will not be effected. Side lobe radiation energy, in some embodiments, may be increased and account for a reduction in peak radiation of the main radio pattern.

The lower half of the antenna away includes a narrow beam width antenna aperture E-10C-50 ($RX_N$) and within its area, a wider beam width transmit antenna aperture E-10C-70 ($TX_W$) with isolating region E-10C-40.

In other embodiments the narrow and wide beamwidth antenna apertures may be separated such the smaller area wide beamwidth patterns are adjacent to the narrow beamwidth apertures rather than contained within as depicted in FIG. 10C.

In some embodiments, the selection of either the wide or narrow patterns for either reception or transmission may be selected using the depicted antenna arrangement. In other embodiments, only wide or narrow patterns may be selected jointly for transmit and receive simultaneously.

For example, referring to FIG. 10-D, an arrangement of receive and transmit chains coupled to respective antenna elements E-10D-10 is depicted.

In one embodiment, transceivers $BGT_1$ (E-10D-40) and $BGT_2$ (E-10D-45) are each usable for either up-conversion for transmission, or down-conversion for reception but not both at any one time. For example, in some embodiments the term BGT represents a "Single-Chip SiGe Transceiver Chipset for V-band Backhaul Applications from 57 to 64 GHz" produced by Infineon as part number "BGT60" (See http://www.infineon.com/dgdl/Infineon-AN-v01_00-NA.pdf?fileId=5546d4624ad04ef9014aed1c06120a5e. Note that in some embodiments the up-conversion is a direct conversion architecture where a baseband in-phase (I) and quadrature-phase (Q) signal is converted to an RF carrier frequency such as those of the 60 GHz band. In other embodiments, an intermediate frequency (IF) may be utilized and then upconverted to an RF carrier frequency such as those of the 60 GHz band. Similarly, either direct conversion or heterodyne conversion via an intermediate frequency (IF) may be utilized in the receive direction.

In the current embodiment, while $BGT_1$ is used for reception, $BGT_2$ is used for transmission, and vice-versa. In such an arrangement, a narrow receive antenna pattern $RX_N$ may be used at the same time as a narrow transmission pattern antenna $TX_N$. For example, the transmit signal (comprising two signals, such as an in phase and quadrature signal) $TX_{1,Q}$ is fed to quadrature up converter E-10D-42 of $BGT_1$ (E-10D-40) and using local oscillator signal E-10D-46 of E-10D-40. The output of the up conversion is optionally filtered using optional band pass filter E-10D-30, and optionally amplified using optional amplifier E-10D-20, and coupled to transmit antenna $TX_N$. Each antenna E-10D-10 may be, in different embodiments, any one of the aforementioned antenna apertures. In the current embodiment wide beamwidth reception antenna $RX_W$ would not be utilized concurrently with $TX_N$ as a particular one of $BGT_1$ or $BGT_2$ operates as either a up converter or a down converter at any given time (even if the overall radio operates in full duplex). In the current arrangement, $BGT_2$ would be configured to receive while $BGT_1$ is configured to transmit, thus allowing for full duplex operation using such components developed for time division duplexing.

Continuing with the current embodiment, while $TX_N$ is transmitting, $RX_N$ would be operating and coupling receive signal to optional low noise amplifier E-10D-55, optional band pass filter E-10D-65, and to quadrature downconverter E-10D-44 of $BGT_2$ (E-10D-45). A local oscillator signal E-10D-46 is used for down converting the received signal (in quadrature in the depicted exemplary embodiment) to $RX_{1,Q}$. It should be noted that for full duplex operation, the two local oscillator signals feed to each $BGT_1$ and $BGT_2$ are generally not the same, and are offset be the frequency duplex separation. However, in some embodiments, such as versions of "Zero Division Duplexing" the frequency duplexing separation may be eliminated. Further detail of Zero Division Duplexing may be found in U.S. patent application Ser. No. 14/572,725, the entirety of which is incorporated herein by reference.

When it is required that the wider beamwidth antenna patterns are utilized, the transmit signals would utilize quadrature up converter E-10D-42 of E-10D-45 ($BGT_2$), optional band pass filter E10D-35, and optional power amplifier E-10D-25 coupled to antenna E-10D-10, which in the current embodiment is $TX_W$.

Likewise the wide beamwidth reception antenna structure $RX_W$ would be utilized in the current embodiment, passing signal to optional low noise amplifier E-10D-50, optional band pass filter E-10D-60, and quadrature downconverter E-10D-44 of $BGT_1$, producing $RX_{1,Q}$.

Other embodiments may utilize alternative arrangements, for example allowing simultaneous use of the narrow and wide beam width antenna, with no limitation of full or half duplex components.

It is contemplated that the wider beam width antenna radiation patterns may be utilized for course alignment procedures, while the more narrow beam width antenna elements may be utilized during a fine alignment procedure, as described in various embodiments and flowcharted in this disclosure.

It is further contemplated that the wider beamwidth radiation pattern may be utilized as a "fall back" operation mode, if during operation the narrow patterns become misaligned, or it is not possible to otherwise alignment sufficiently. One such a scenario may be in the case of excessive mechanical vibration, rotation, or sway. In other embodiments, the wider beamwidth radiation pattern may be utilized with initial installations only.

Referring now to FIG. 11A an alignment transmitter is depicted showing an antenna E-11A-10, an amplifier E-11A-20, and the up-converter modulator itself E-11A-30. This radio may be the main point-to-point radio itself or may be a secondary radio utilized for alignment and or maintenance detection such as an in-band embedded code sequence, as discussed in U.S. patent application Ser. No. 14/624,365 (SOBR), incorporated herein by reference. Such a transmitter may be operated alone during initial alignment in some embodiments. Then as an embedded in-band signal at significantly lower power levels than a desired payload-bearing signal utilized by the point-to-point link. In some embodiments, the alignment transmitter may be utilized at the same frequency as the main link or may be utilized at a different frequency. For example, the alignment transmitter may be 5.8 GHz while the point-to-point link itself bearing payload may be the 80 GHz E-band or the 60 GHz V-band. Alternatively, both may be E-band or V-band signals and operate jointly or separately. Furthermore, the alignment transmitter may operate at different frequencies at different times such as initially operating at 2.4 GHz, then at 5 GHz, then at V-band or E-band subsequently or any combination thereof.

FIG. 11B is an exemplary embodiment of an alignment waveform utilizing Zadoff-Chu codes (ZC Code) in one embodiment.

Referring now to FIG. 11B is a Zadoff-Chu sequence E-11B-10 is repeated which may comprise, in some embodiments, an alignment signal. Such alignment signals may be detected at a receiver and the power of the received signal may be utilized based upon azimuth and elevation adjustments of the transmitters parabolic antenna or an antenna array to determine the alignment of the transmitter relative to the intended receiver. In other embodiments a phase of the signal may be utilized to determine such alignment. A single receiver and single transmitter pair may be utilized to perform such alignments based upon multiple positioning of the point-to-point radio where these multiple "positionings" would be measured for example in one embodiment by an accelerometer or positional encoder and fed back to an operator technician during installation where an alignment-assisting device provides guidance to the technician to make adjustments in azimuth and elevation so as to measure a gradient of the antenna beam pattern at one or more frequencies of operation so as to predict across a main lobe of the antenna radiation pattern where the bore sight alignment would be and then provide guidance to the technician as to what adjustments to make in angle of elevation and the angle of azimuth so as to align the transmitter appropriately.

In other embodiments such adjustments may be made based upon received signals rather than transmitted signals. In further embodiments a plurality of transmitters or receivers may be used to make measurements of the relative signal phases to make more direct measurements of alignment and misalignment as opposed to measuring received power levels and adjusting signal based upon the measured power differences fitting to the gradient of the antenna pattern.

In some embodiments mechanical vibration for incremental offsets in azimuth or elevation may be made utilizing electrical components such as positioning motors or vibration-inducing mechanisms so as to allow for a measurement of the gradient at any particular angle and azimuth position then providing feedback to the operator of the direction to make adjustments in angle and or azimuth so as to follow the steepest ascent toward maximum power to be received at the intended receiver based upon adjusting the alignment of the transmitting directional antenna.

In some embodiments this may be a parabolic antenna element utilizing a reflector while in other embodiments it may be an antenna array, while in other embodiments it may be a beam former, phased array or other directional antenna system as disclosed elsewhere in this disclosure and related incorporated disclosures.

FIG. 12 depicts exemplary normalized antenna gain plots for embodiments of a hybrid backhaul radio depicting the main antenna lobes of each of a plurality of antenna patterns having differing main beam widths and including exemplary measurements for use in alignment and alignment qualification. Referring to FIG. 12, in one embodiment successive measurements based upon a steepest "ascent" (or "descent") algorithm are made during operation at 5 GHz associated with antenna pattern E-12-40. One can see that a first measurement "Measurement A" may be made at location E-12-30 resulting in a −9 dB signal level relative to the peak achievable power. "Measurement B" is the current example is made at 4 degrees from the bore sight measurement, and results in −4 dB from the peak power achievable at E-12-10. It should be noted that in practice, the values measured at these points would be actual signal levels generally measured in dBm or another unit of received signal strength. Such measurements may be used associated with the qualification of the fine alignment and, in some embodiments, based upon achieving within ±0.5 degrees in both azimuth and elevation of the ideal alignment so as to be aligned within the main lobe of the E-band signal. If utilizing a power gradient approach (steepest descent for example) for the fine alignment process, measurements to achieve such an alignment must be within a 0.25 dB tolerance of the peak receivable signal level at perfect alignment. Such an alignment would ensure that when super fine alignments were performed utilizing the E-Band signal, the received signal would be within 15 dB of the peak achievable power of the main E-band signal. Therefore alignment of the 5 GHz band signal in the present embodiment would require alignment to within better than a quarter of a dB for example of the peak power of the 5 GHz radiation pattern which would be at E-12-10. Once a tolerance such as 0.25 dB is achieved then operation would be satisfied for fine alignment and E-band signal would be operated and a steepest ascent algorithm performed at E-band to maximize alignment of the E-band antenna pattern labeled E-12-50 with a similar tolerance for example of 0.25 dB of a predicted maximum measured power level or of an achievable power level based upon a gradient search. A gradient search may be performed mechanically or may be performed based on an alignment-assisting device providing input to a technician who adjusts alignment settings utilizing worm screws so as to tweak the azimuth and elevation based upon, in some embodiments, direction from the alignment-assisting device.

In alternative embodiments, the FIG. 12 may represent antenna patterns at the same frequency of operation by utilizing two separate antennas or antenna configurations. In some embodiments, the forgoing description may be applied to a single radio switched between configurations. In other embodiments, the forgoing description applies to a single frequency or frequency band, utilizing multiple transceivers, with multiple antennas. One example is described in embodiments of FIG. 10-C and embodiments of FIG. 10-D.

In one embodiment, simultaneous detection (or near simultaneous detection) may be used at a single frequency, but utilizing multiple antenna patterns, and multiple orthogonal or uncorrelated codes, (or other CDMA approaches) to detected the signal powers received by each antenna pattern (or transmitted from each antenna pattern) to a common receiver. Such an embodiment allow for a relative signal strength measurement between the signals associated with each pattern. In some embodiments, the same signal may be detected by one or more receivers associated with each of the antenna patterns, based upon each receiver being associated with a separate antenna patterns, or a single receiver alternated between the antenna patterns.

In some embodiments, a comparison of the relative signal power receiver associated with each antenna pattern may be utilized to air in alignment during course, fine and/or super-fine alignment procedures. Such a relative measurement may be utilized to indicate if a signal is being received utilizing the main lobe of narrow pattern (E-12-50), for example within ±0.25 degrees in both azimuth and elevation of the ideal alignment so as to be aligned within the main lobe of the narrow antenna pattern. Further, the signal strength received utilizing the wider pattern (E-12-40) would be less then +15 dB larger than that of the signal received utilizing the narrow pattern (E-12-50) when aligned within ±0.4 degree alignment of the main lobe of the narrow pattern. Additionally, when a signal from the wider pattern is more than 15 or 20 dB larger then that of the narrow pattern, it can be determined that alignment is significantly off, and likely associated with a side lobe of the narrow pattern. Gradient searches around a given alignment may provide further information for use in estimating a current alignment, based upon the local antenna pattern gradients for each of the narrow and wide patterns when detecting a common signal. Further, in some embodiments, least mean square (LMS) fit to between the local (current alignment) gradients (slightly and/or significantly adjusted measurements in azimuth and/or elevation) to known antenna values of the narrow and wide antenna patterns, thus determining an estimated current alignment and input into an estimate of proposed improved alignment settings. Such settings may be provided to an operator to make the proposed adjustments, or provided to an automated capability.

FIG. 13 is an exemplary flow diagram of an embodiment of a point to point radio antenna alignment procedure for use in initial alignment utilizing an alignment assisting device and one or more frequencies and beam widths for alignment measurements. Referring now to FIG. 13, in a more specific example, the process is begun in Step E-13-10, which in some embodiments includes initial settings and mounting of the equipment including initial provisioning. Following initialization the process proceeds to Step E-13-20 where a GPS receiver is used associated with each device, in one embodiment, to input coordinates to provide instructions for coarse alignment for example within plus or minus 8 degrees in azimuth and elevation. Following this step the process proceeds to E-1B-30 where configuration of the initial frequency channel and antenna beam width (radiation pattern main lobe width) is performed so that the current frequency and beam width is equal to initial frequency and associated beam width.

Next a determination is made whether the antenna has been positioned appropriately in Step E-13-40 and signal is transmitted, if it has been positioned appropriately in Step E-13-50. If it has not been positioned appropriately then operation continues in E-13-40. Such assessment of the positioning may be based upon an electronic compass, positional encoder, accelerometer or other inputs such as a manual determination of such alignment through an optical alignment scope and subsequent input to the alignment-assisting devices in various embodiments.

As mentioned, once antennas are deemed to be in position within for example plus or minus 8 degrees the ideal alignment, signal is transmitted (for example the Zadoff-Chu sequences previously discussed, or other signals) in Step E-13-50. Next processing proceeds to E-13-70 where a determination if signal has been detected at the target receiver based upon feedback is made. The feedback may be provided either manually or utilizing communication links between alignment-assisting devices as discussed. If no signal is detected, realignment must be performed in Step E-13-60 and the antenna positioning tests of E-13-40 repeated. If signal is detected at the target receiver then processing proceeds to Step E-13-80 where measurements of the alignment signals are performed and values associated with them are stored for a particular measurement. The measurements are numbered from 1 through N where N is the iteration of the measurement number. Such a measurement number is utilized to derive a particular gradient or determination of where within a main lobe, and associated gradient a particular angle and azimuth is located. Next, a determination of whether an alignment goal has been achieved is performed in Step E-13-90. Such an alignment goal may be the detected peak power or other qualification such as signal to noise ratio, signal to interference ratio or the like. However, it is anticipated in at least one embodiment, the received power or a predicted received power would be utilized to determine whether a maximum power matches a predicted power level and when a detected power level is within the tolerance of a predicted power level, so as to determine when such a goal would be deemed to have been achieved.

In other embodiments the received power level may be based upon the determination that a peak power is within a tolerance associated with tuning or aligning an antenna to determine that a maximum of a steepest descent algorithm has been achieved. Such a test may be used in combination with the tolerance associated with the predicted power level so that a peak steepest assent determined maximum power must be within a predicted power range such as plus or minus 1 dB of the predicted power range in another embodiment.

If such a goal is not achieved then processing proceeds to E-13-110 where if n is greater than 1 (meaning that more than one measurement has been made) the algorithm then will provide an estimate for a new alignment position based upon a determined gradient. In other embodiments, a specific value of n must be achieved prior to an estimate being determined (for example n=N). Such a gradient is determined in some embodiments based at least in part upon one or more of the position encoder, electronic compass, an accelerometer and the relative measurements and angular positions and relative power levels between those two positions resulting in a prediction of a further adjustment in angle and azimuth so as to increase a detected power level based upon following the "slope" of the detected power in angle and azimuth adjustments. Such a processing step in some embodiments may provide instructions to a technician for a second position in degrees or adjustment in angle and azimuth. When only a single measurement has been made at a particular location, further measurements in some embodiments must be made allowing a refinement of a gradient value.

In other embodiments when a sufficient gradient has not been determined the process will provide instructions to a technician to make adjustments to allow for the determination of a gradient prior to producing a predicted azimuth and elevation adjustment which will allow for maximization of received signal power in a next step associated with a steepest descent (or assent) algorithm or other gradient based algorithm. In one embodiment, instructions to a technician for angle and azimuth adjustments processing will return to Step E-13-40 where a determination as to whether the antennas have been positioned as instructed is determined. Such a determination, in embodiments, may be based upon an accelerometer or positional encoder or electronic compass in combination or alone determining whether or not the appropriate adjustments have been made by the technician and qualified by the electronic sensors and the alignment-assisting device. In other embodiments, stepper motors or other positioning electronics may be used in lieu of a technician's input or and yet further embodiments the technician's adjustment themselves may be utilized in conjunction with the positional sensors to determine when to instruct a receiver to make further measurements or for instruction to the technician to stop adjusting the antenna. In such an embodiment, a technician may be instructed to begin turning an adjustment screw until told to stop.

In yet further embodiments measurements may be made fast enough that detections of received signal levels on an intended receiver may be made while a technician is making positional adjustments in azimuth or elevation allowing for plurality of measurements made at an associated and respective plurality of positions to further refine a gradient measurement. For example, the technician may be instructed to begin making adjustments, in one embodiment, of both elevation and azimuth following a zigzag pattern or sufficient adjustments in a small circle or other shape, or even randomly, and tracked by the positional sensors while simultaneously making measurements at the receiver. In some embodiments, the measurement values are associated with the measurements of the positional sensors and correlated appropriately. Such a gradient may be utilized to determine where on a main lobe of a particular beam pattern the alignment is currently positioned and the gradient developed from such adjustments. The resulting gradient measurement process, in some embodiments, will result in additional instruction as to the direction of adjustment in angle and elevation being provided to the technician so that the technician will be directing the further adjustments toward the peak radiation power alignment.

In one embodiment the technician may be instructed to adjust angle back and forth with turns of a screw several times until a gradient is determined, at which time the technician is instructed to adjust elevation back and forth a number of times or until sufficient gradient has been determined. Following this, a prediction of the appropriate combination of elevation and azimuth adjustment will be instructed to the technician. In embodiments the elevation and azimuth may be performed independently. For example, the technician may be instructed to turn an adjustment back and forth in elevation, then instructed to leave the adjustment in one position or the other after sufficient measurements and certainty has been achieved as to what the gradient is to a specific quality, resulting in instruction with that particular adjustment. Next the same process may be performed in azimuth where the technician is instructed to wobble the setting back and forth until such a point that a predictable gradient has been achieved, at which time instruction to the technician to leave the position in one or the other or some fraction of the determined position or some multiple of the determined position is made.

As can be seen alternating this process in azimuth and elevation then azimuth and elevation will result in a steepest descent algorithm, which will migrate to the peak radiation power over time, in one embodiment. Following the alignment goal having been achieved, for instance for a fine alignment, processing may proceed to superfine alignment where in Step E-13-100 a current frequency/beamwidth is adjusted to the final frequency/beamwidth.

Hence, the process is continued as Step E-13-120 is performed where the next frequency/beamwidth is set, new measurements are initialized and the last iteration from 1 to N is erased or stored for later use, and a new n equals 1 is set at the current position and the process is begun again for the current frequency and beamwidth. This process is continued until such a time that the current frequency and beam width is equal to the final frequency beamwidth. Once the processing goal has been achieved, processing proceeds to E-13-130 where alignment goals have been achieved and the process terminates or proceeds to maintenance alignment instead of initial commissioning alignment.

In some embodiments, the forgoing process may be applied utilizing a single frequency band of operation, and making adjustments to the antenna patterns (beamwidths). For example, the antenna structure of FIG. 10C, and radio of E-FIG. 10D may be utilizing with the embodiments of FIG. 13. Furthermore, embodiments of array antennas of FIG. 20A, and FIG. 20B may be utilized with the forgoing embodiments of FIG. 13, utilizing a single or multiple receivers. Additionally, embodiments of array antennas of E-10C, FIG. 20A, and FIG. 20B, and other disclosed and known antenna structures may be utilized with the embodiments of FIG. 14, utilizing a single or multiple receivers.

FIG. 14 is an exemplary flow diagram of an embodiment of a multiple stage point-to-point radio antenna alignment procedure for use in initial alignment utilizing an alignment-assisting device and multiple frequencies and beamwidths for alignment measurements.

Referring now to FIG. 14 the process starts in E-14-10 and proceeds to E-14-20 where initial alignment using GPS-based estimates or optical alignment or other approaches together or in combinations or separately is performed for a coarse alignment. The initial alignment frequency and beamwidth are set, and aligned using 2.4 GHz alignment signal in Step E-14-30, in one embodiment. Next a second alignment frequency and beam width are set and alignment is performed utilizing 5.8 GHz alignment signal in Step E-14-40. Next a final alignment frequency and beamwidth is set. For example, in the current embodiment using V-band, E-band or other target frequency band signal in Step E-14-50 and once alignment has been satisfied processing proceeds to E-14-60 where the process terminates for initial installation alignment.

FIG. 15A is a depiction of an exemplary embodiment of a fixed point-to-point radio with an integrated parabolic reflector antenna and including an embodiment of multiple low band (i.e. 2.4 GHz or 5 GHz) auxiliary antenna(s) with offset focal point alignment for use with one or more embodiments of the current invention. FIG. 15A depicts an exemplary E-band radio with integrated parabolic antenna array. The arrangement is similar to that described associated with FIG. 10A, but with three separate low band ancillary antenna structures mounted at or near the focal point of the antennae rather than a single structure of FIG. 10A at the focal point. Such antenna elements may comprise one or more individual elements and are labeled E-15A-10, E-15A-30, and E-15A-40. In the present embodiment the structures are located off axis of the bore site of the parabolic antenna array but near the focal point. Ideally, the individual antenna structures of the ancillary elements would be placed within or near the shadowing effect of the sub-reflector of the integrated parabolic antenna. The circumference of the parabolic reflector is depicted as E-15A-10, and each of the three ancillary antenna element structures shown relative to the frontal view of the antenna also called out as E-15 A-20, E-15 A-30, and E-15 A-40. In associated embodiments, the placement of the ancillary antenna structures would allow for offset radiation patterns relative to each of the individual elements and relative to the main radiating pattern of the parabolic reflector when using the sub-reflector by the primary antenna link in the E-band. Further, the radiation patterns produced by each of the ancillary antennas in the present embodiment would be offset from an individual single element, for example, as depicted in E-10A which is located at the focal point and on axis of the bore site of the reflector antenna. The three individual ancillary antennas may transmit one at a time or may all transmit simultaneously. For example, when transmitting simultaneously, separate single may be transmitted form each, or the same signal. In some embodiments, phase array or beam forming approaches may be utilized so as to produce different transmissions in different directions. It is contemplated in some embodiments the signal transmitted by each of the three elements would be modified so as to be distinguishable from one another, either individually, or on a per beam formed or spatially multiplexed "stream" basis.

For example, the alignment signal previously described associated with FIG. 11B may be transmitted by using separate Zadoff-Chu codes. In one embodiment, each code being orthogonal to the respective other codes from each ancillary antenna element. Such codes may be generated by utilizing a single "base sequence" producing separate orthogonal codes by circular shifts of the base sequence. Each circular shift in some embodiments would be of a different number of samples allowing for the signals from each ancillary element to be distinguished relative to one another. The amount of each circular shift should be sufficient so as to provide for a contemplated maximum channel propagation impulse response including any multi-path propagation due to reflections from structures within the "Fresnel" zone. As discussed, in other embodiments, each code may be passed to all the ancillary elements, and passed so as to perform a beam steering process which may be static or adaptive. In some embodiments, the adaptation is based upon the stage of the alignment procedure, the desired separate beam patterns, or the overall beam widths.

A receiver, as will be described subsequently and in related applications, for receiving the particular alignment sequence would perform a correlation in some embodiments. For example, U.S. patent application Ser. No. 14/624,365, previously incorporated herein in its entirety by reference provides for a number of such correlating receiver structures. The result of the correlations in some embodiments in which a single code is transmitted form each of the auxiliary elements for example, would show three individual correlation peaks associated with the transmissions from each of the three ancillary elements and providing for a time delay between the correlation peaks in the output of the correlating receiver corresponding to the relative circular shifts associated with each of the Zadoff-Chu codes transmitted from respective ancillary elements.

The detection of the three correlation peaks, in some embodiments, will allow for determination of the phase of the signal from one peak relative to another peak and relative to the final peak producing a vector of in-phase and quadrature (or real and imaginary) signals for each of the three peaks. Determining the relative phase between the three peaks $[V_1, V_2, V_3]$ may be provided by subtracting the phase of the subsequent two peaks $(V_2, V_3)$ from that of the first peak $(V_1)$.

For example, a clockwise rotation of a vector by an angle $\theta$ may be provided by the linear transformation:

$$\begin{bmatrix} x' \\ y' \end{bmatrix} = \begin{bmatrix} \cos\theta & \sin\theta \\ -\sin\theta & \cos\theta \end{bmatrix} \begin{bmatrix} x \\ y \end{bmatrix}$$

where $\theta$ is the angle to rotate the "first" or reference vector $(V_1)$ to the real axis, and calculated as $$\theta = 2\pi - \tan^{-1}\left(\frac{\text{Im}\{V_1\}}{\text{Re}\{V_1\}}\right) \text{ for } \text{Re}(V_1) \geq 0, \text{ and}$$

$$\theta = \pi - \tan^{-1}\left(\frac{\text{Im}\{V_1\}}{\text{Re}\{V_1\}}\right) \text{ for } \text{Re}(V_1) < 0$$

Such phase may be utilized associated with interferometry techniques known in the industry and will be described further. In other embodiments, so called Super-resolution, sub-space, or Eigenvector techniques to determine angle of arrival may be utilized. In some embodiments, parametric estimators including autoregressive models, "MUSIC" models or root MUSIC models, may be employed.

Furthermore, subsequent detections of the output-correlated signals may be combined as well. For example, in some embodiments, coherent integration within a single correlation of the receiver may not be possible for certain periods of time due to the phase noise of the receiver and transmitter resulting in a lack of carrier coherency beyond the particular integration time. However, receiving signal and coherently correlating within the coherence time of the channel or of the transmitter receivers may be performed for a given correlation output sample. Additional coherent integration may be performed based upon relative samples of sequential correlation outputs. For example, following the step of performing correlation from a correlating receiver and identification of the three correlation peaks resulting from transmission from the ancillary elements of FIG. 15A, the real and imaginary values of the particular sample of the first peak $(V_1)$, second peak $(V_2)$ and third peak $(V_3)$ may be rotated mathematically such that the first correlation peak is aligned with zero phase or resulting in a positive "real number", with no imaginary component (e.g. the imaginary component's value is zero). The associated detected signal vectors for the second peak and third peak may be phase rotated based upon the amount of phase rotation of the first peak resulting in an identical magnitude of all three vectors but at different phases from what was initially detected, however the relative phases between the three detected vectors would remain the same. The set of three phase de-rotated vectors may be referred to as a "tuple".

Each detection tuple having been phase de-rotated may then be coherently added to subsequent correlation tuple outputs as each has a common phase reference derived from in the present embodiment the first detected correlation peak. In some embodiments, the peak correlation may be utilized to determine each of the transmissions of each ancillary antenna element structure, while in others a "first" correlation output may be utilized rather than the absolute peak. In such embodiments the first correlation value to surpass a threshold may be utilized. In other embodiments, the first peak to be above a particular threshold may be utilized. Furthermore, the detection of a particular received correlator output value may be identified based upon the known relative timing of the signal delay of each sequence transmitted from a particular array of ancillary element structures. For example, if the relative delay $T_d$ were used for the circular shifts of each of the sequences, then integrating copies of detected signals by this $T_d$ delay amount, given a known predicted receive timing, would allow for non-coherent integration of one or more of the individual sequences among each other. Furthermore, coherently integrating sets of transmitted sequences, after the correlation, may be possible based upon known delays and repetition periods of the sequences themselves. The detection process in some embodiments would be based upon a magnitude or magnitude squared of the signal output of the correlator rather than on the vectoral values themselves.

Some embodiments will have more or less ancillary elements and some embodiments will have multiple transmission elements per individual ancillary antenna structure such as E-15A-20, E-15A-30, and E-15A-40. For example, horizontal and vertical polarization elements may be used individually with the same or with different codes. Furthermore, multiple offset elements will be utilized within each element structure. In some embodiments, the directional radiation pattern of each of the ancillary elements may be tuned as to match the parabolic reflector pattern, additionally different angular transmission radiation patterns having different codes may be utilized from each ancillary element structure allowing for broader antenna beams or main lobes after reflecting from the parabolic reflector. Such arrangements may also allow in some embodiments for differing amplitude values of detected codes being dominant based upon differing angular misalignment relative to the bore site of the antenna propagation from the parabolic reflector dish to the intended receiver. Such described ancillary elements in some embodiments may alternatively be used for reception rather than transmission, while in other embodiments the elements may be used for both reception and transmission either in duplex in frequency or in duplex in time or other duplexing techniques such as "zero division duplexing" (ZDD). The foregoing description related to each of the three ancillary antenna element structures associated with FIG. 15A may also be individually applied to the ancillary antenna element structure associated with FIG. 10A (E-10A-10) wherein the Zadoff-Chu codes or other code sequences would be utilized.

Furthermore, the alignment signal need not be based upon a code sequence in time but may be an OFDM-based signal utilizing a sequence in frequency such as used in the 3GPP standard "LTE", as described in documents such as 3GPP TS 36.300.

FIG. 15B-1 is a depiction of an exemplary placement of multiple auxiliary antenna(s) relative to the on-axis focal point of a parabolic reflector antenna with alignment off-axis but equidistant with the focal point for use with one or more embodiments of the current invention Turning now to FIGS. E-15B-1 through E-15B-6, various arrangements of multiple ancillary elements are described. Each of the figures utilizes Reflector E-15B-10. For FIG. 15B-1, two elements are present E-15B-15 and E-15B-18. Such elements are at the same distance from the reflector and at the focal length of the parabolic reflector but offset in the X-axis within the diagram so as to offset their respective radiation patterns in the X-axis relative to the Y-axis. For example, Element E-15B-15 would result in a radiation pattern with its peak radiating to the left of the Y-axis where E-15B-18 would result in a radiation pattern with its peak offset to the right of the Y-axis.

While two elements are depicted in FIG. 15B-1, more than two is contemplated in various embodiments. For example, four may be present in one embodiment wherein the elements are placed perpendicularly to the XY-axes (in a Z-axis), but at the same distance as the focal point from the reflector, resulting in four equidistant elements centered on the focus point. Wherein other embodiments may comprise three elements located equidistant from a focal point separated by 120 degrees, each as previously described associated with embodiments of FIG. 15A.

FIG. 15B-2 is a depiction of an exemplary placement of multiple auxiliary antenna(s) relative to the on-axis focal point of a parabolic reflector antenna with alignment off-axis and further then the focal point for use with one or more embodiments of the current invention Referring now to FIG. 15B-2, two elements, E-15B-20 and E-15B-25, are located offset from the focal point but at a distance further than the focal point resulting in a broader radiation pattern. Such patterns having a radiation pattern with a wider main lobe and less overall gain. Such broader radiation patterns may allow for the detection of the transmitted codes or other alignment-aiding signals at angles not detectable had the ancillary elements been located at the focal point. It should be noted that in some embodiments the placement beyond a focal point will result in the main lobe initially being smaller angularly and coming to a focus point then broadening following a focusing point resulting in the broader main radiation pattern of the main lobe in the "far field", but with "reversed" code phases.

FIG. 15B-3 is a depiction of an exemplary placement of multiple auxiliary antenna(s) relative to the on-axis focal point of a parabolic reflector antenna with alignment on-axis but offset in distance from the focal point for use with one or more embodiments of the current invention Referring now to FIG. 15B-3, two elements are depicted, E-15B-30, which is further than the focus but on axis with the bore sight of the parabolic reflector, and E-15B-35, which is closer than the focus but on axis with the bore sight of the reflector. Such an arrangement in some embodiments will allow for determination of misalignment of the transmitting parabolic reflector based upon the relative phase shifts of signals transmitted from each of the elements. The main lobes of the signals radiated from each of the elements and some embodiments will be broader than that of the signal transmitted from the focus, but their phases will differ as the radial misalignment or magnitude of the polar misalignment of the parabolic reflector varies. Again, different codes or other alignment signals may be utilized in some embodiments such that a magnitude of the polar misalignment relative to bore sight may be determined relating to the correlation techniques previously discussed and will be discussed in further detail elsewhere within this specification.

FIG. 15B-4 is a depiction of an exemplary placement of multiple auxiliary antenna(s) relative to the on-axis focal point of a parabolic reflector antenna with alignment both at the focal point, and off-axis but for use with one or more embodiments of the current invention Referring now to FIG. 15B-4, three elements are depicted, E-15B-40, E-15B-44, and E-15B-48. In some embodiments the three elements are planar with the XY-plane depicted in the figure. With two elements located past the focus but offset on the Z-axis and the Y-axis and a single element located on the focal point itself. The foregoing discussions relating to the effect of the propagation of the signal and associated beam patterns apply to the present arrangement as well. In other embodiments additional elements may be added or offsets may be provided on the Z-axis perpendicular to the Y and the X-axis as well.

FIG. 15B-5 is a depiction of an exemplary placement of multiple auxiliary antenna(s) relative to the on-axis focal point of a parabolic reflector antenna with alignment off-axis but offset in both nearer and further distance from the focal point for use with one or more embodiments of the current invention. Referring to FIG. 15B-5, two ancillary element structures are depicted, E-15B-50, which is past the focal point on the Y-axis and offset on the X-axis, and E-15B-55, which is closer to the parabolic reflector along the Y-axis and offset on the X-axis resulting in effects to the relative radiation patterns.

FIG. 15B-6 is a depiction of an exemplary placement of multiple auxiliary antenna(s) relative to the on-axis focal point of a parabolic reflector antenna with alignment off-axis but offset in distance nearer than the focal point for use with one or more embodiments of the current invention. Referring now to FIG. 15B-6, two elements are depicted, both offset on opposite sides of the Y-axis at equidistant X-axis offsets but closer to the parabolic reflector than the focal point. The elements E-15B-60 and E-15B-65 in some embodiments comprise both horizontal and vertical polarizations while in others they may be circularly or otherwise linearly polarized elements or each may be comprised of the plurality of individual radiating elements each offset in X, Y or Z increments comprising an antenna array. Such elements may produce beam-forming techniques or phased-array techniques. In one embodiment a Butler Matrix may be utilized so as to allow for the transmission of differing codes or other alignment signals angularly from each antenna element structure or among the antenna elements themselves. In some embodiments the same signal may be utilized among a plurality of the elements whereas in others differing alignment-aiding signals may be transmitted from each elements whereas in the others phase-related beam forming or other directional techniques be they fixed or adaptive may be utilized. Such beam forming may be performed in analog (typically referred to as phased array) or may be digitally generated on a per-element basis (generally referred to as beam forming) or may be produced in combination. Furthermore, the foregoing embodiments may be used in combination amongst each of the examples depicted in FIG. 15B or individually or with variations as would be understandable, but not explicitly described.

FIG. 16 is a depiction of an exemplary embodiment of a fixed point to point radio with an integrated parabolic reflector antenna and including an embodiment of multiple auxiliary antenna(s) with placed radially on the parameter of the parabolic for use with one or more embodiments of the current invention. Referring now to FIG. 16, a parabolic reflector integrated within a point-to-point radio is depicted (in one embodiment an E-band radio while in other embodiments such an arrangement may comprise a point-to-point or a point-to-multipoint capability). In present embodiments of FIG. 16 rather than placing ancillary elements at or near the focal point of the parabolic reflector, elements are placed radially about the circumference of the parabolic reflector structure. The parabolic reflector circumference is depicted as E-16-10 and in one embodiment comprises five ancillary elements, E-16-20, E-16-22, E-16-24, E-16-26, and E-16-28, such elements being placed in a manner not equidistant or at equal incremental angles relative to the circumference of the perimeter of the parabolic antenna. In some embodiments four elements would be placed each at 90 degrees relative to the bore sight of the parabolic reflector and one element would be placed at −45 degrees and equidistance along the circumference between elements E-16-20 and E-16-26. Such additional element may be beneficial in determining phase ambiguities associated with interferometry techniques which will be discussed in more detail elsewhere. In another embodiment, five elements are placed equidistant along the circumference of the parabolic reflector, such elements being respectively E-16-30, E-16-32, E-16-34, E-16-36 and E-16-38. In yet another embodiment, a side view of the parabolic reflector integrated with one embodiment a point-to-point E-band radio is depicted where the ancillary elements comprise a linear array along a vertical axis labeled E-16-40, E-16-42, E-16-44, E-16-46, and E-16-48. In some embodiments such a linear array may also exist along the Z-axis perpendicular to the XY-axis of the drawing itself. In some embodiments such elements are on the perimeter of the circumference of the parabolic antenna but spaced vertically so as to be linear relative to each other. In other embodiments, such an arrangement would not be linear but dependent upon an equidistant angular placement such as described associated with Elements E-16-30 through E-16-38.

In yet other embodiments the number of elements may be varied. In some embodiments the choice of the number of elements would depend upon the physical size of the diameter of the parabolic reflector (or other antenna such as an array) and the determination of "unambiguous" angular arrival, which may be made for a range of misalignments relative to the bore sight of the main radiating antenna reflector.

In other embodiments the radiating reflector may be replaced with a planar radiating antenna array. In yet other embodiments different frequencies between the ancillary elements and the main payload-bearing signal utilizing the reflector may be utilized. For example, one embodiment may use 5 GHz band for ancillary elements and E-band or V-band for the main point-to-point or point-to-multipoint links. In other embodiments, the ancillary elements may be utilized for alignment and maintenance alignment. In yet further embodiments such elements may be utilized for hybrid-band radio operations as described in U.S. Pat. No. 9,572,163.

FIG. 17 depicts a diagram of an exemplary placement of auxiliary antennas radially on the parameter of a parabolic antenna according to some embodiments of the invention. Referring now to FIG. 17, a diagram of the placement of ancillary elements is depicted. Ancillary Elements E-17-26, E-17-24, E-17-22, E-17-20, E-17-10, and E-17-28 are depicted, each separated at 72 degrees in the present embodiment in angle Phi ($\phi$). The unambiguous angle over which misalignment may be detected utilizing interferometry techniques, periodogram-based techniques, or parametric techniques (such as so-called super resolution techniques: MUSIC algorithms), is defined by the minimum spacing of the closest elements based upon the angular offset of the antenna array associated with the parabolic reflectors in one embodiment.

For example, an offset associated with the Y-axis or vertical axis would be detected and unambiguous up to a particular distance or angular offset which would be defined by $d_v$, which is the distance in wavelengths of operation of the alignment signal between Elements E-17-30 and E-17-35 in this embodiment. The angle over which an unambiguous offset determination may be made on the horizontal axis would be defined by $d_H$ which is the distance between E-17-22 and E-17-24, in the current embodiment. As combinations of offsets vary in both the X and the Y-axis, then the minimum spacing between elements would be defined between different sets of elements in various embodiments. For example, if the offset were at 45 degrees relative to vertical, then the minimum spacing between elements would be between Element E-17-20 and one or both of E-17-22 and E-17-28. The spacing between two elements that are located at a common offset for a particular angular axis of the antenna must have some physical separation in order to be helpful in defining the maximum unambiguous misalignment determination. For example, misalignment in the X-axis as discussed would have a maximum unambiguous angular misalignment determination range defined by $d_H$. However, a closer arrangement of two elements does exist within the present example. E-17-20 and E-17-28 are both equidistant and are not separated at all on the X-axis. Therefore, two measurements would be made at the same X-axis offset and while improving the signal to noise ratio of that particular measurement would not provide additional resolution or range for the maximum unambiguous angle offset determination in the X-axis. The choice of the number of elements and the spacing will be based upon the diameter of the main reflector, the desired resolution of the angle misalignment determination, and the range of maximum unambiguous offset angle determination, which is required, for a particular embodiment. For example, if the course alignment using GPS determined by, in one embodiment an alignment-assisting device, is capable of ensuring alignment to plus or minus 5 degrees of bore sight in elevation and azimuth, then the range over which unambiguous misalignment determination which must be designed for must exceed plus or minus 5 degrees. Otherwise, an angle determination may be made based upon relative phase relationships which may be produced at multiple alignments and indicating to a technician how to perform an alignment would not be possible without ambiguity.

In some embodiments multiple possible solutions may be indicated to a technician resulting in four, three or two possible solutions based on potential measurements, if the maximum misalignment for no ambiguity requirement is not met. In some embodiments such maximum may not be met and multiple solutions may be provided to a technician, while in other embodiments such a requirement will be met and a single output for improved alignment will be provided. In yet other embodiments a continual feedback may be provided as the manual adjustment of the array antenna is made. For example, if the maximum unambiguous misalignment angle is not met or initial alignment is beyond that expected utilizing coordinated inputs in the course alignment steps, the adjustment of the array or parabolic reflector's alignment may be counterintuitive to the technician. For example, the phase relationship among the elements becomes ambiguous when a phenomenon called "spatial aliasing" occurs. Such spatial aliasing is analogous to time aliasing in sampling theory as commonly known associated with Nyquist Sampling Theorem. The Nyquist Sampling Theorem states that samples must be taken at or above twice the frequency of the highest frequency of operation of a particular signal (not to be confused with the Nyquist bandpass sampling theorem). In angle of arrival determination or beam-forming and phased array techniques in general, such theorems may be extrapolated to space rather than time. For example, a Fourier transform of a signal sampled at equally linearly spaced antenna elements, at the same time instant results in a "frequency spectrum" of a spatially sampled signal. Such measurements are often referred to as "Angular Spectrum". As element spacing exceeds half the wavelength of the signal's operating wavelength, a spatial aliasing will occur (as opposed to a time aliasing). When elements of an array are spaced closer than $\lambda/2$ the angular spectrum from 0 to 180 degrees is unambiguous. As the spacing proceeds beyond $\lambda/2$ the unambiguous angular spectrum begins to be reduced. Further detail relating to calculating spatial aliasing is provided.

FIG. 18A is an exemplary illustration of the relationship between a waveform center frequency (wavelength $\lambda$) and the relative signal propagation difference detected between two antenna elements of an exemplary two-element antenna array. Prior to a more detailed discussion of FIG. 18A, some background relating to mathematically modeling a propagating wave in a lossless medium will be provided.

A propagating wave in a lossless medium must satisfy the following relationship.

$$s(\vec{x}, t) = s(t - \vec{\alpha} \cdot \vec{x})$$

Where, $$\vec{x} = \begin{bmatrix} x \\ y \\ z \end{bmatrix}$$

is the spatial position vector $$\vec{\alpha} = \begin{bmatrix} \alpha_x \\ \alpha_y \\ \alpha_z \end{bmatrix}$$

is the slowness vector and, $$\vec{\alpha} \cdot \vec{x} = \vec{\alpha}^T \vec{x} = \alpha_x x + \alpha_y y + \alpha_z z,$$

Where $\vec{\alpha}$ points in the direction of propagation, and $$|\vec{\alpha}| = \sqrt{\vec{\alpha} \cdot \vec{\alpha}} = \frac{1}{c},$$

where c is the speed of the wave (e.g. the speed of light for electromagnetic signals).

Letting, $$s(\vec{x}, t) = Ae^{-j(\omega t - k_x x - k_y y - k_z z)}$$
$$= Ae^{-j(\omega t - \vec{k} \cdot \vec{x})}$$
$$= Ae^{-j\omega(t - \vec{\alpha} \cdot \vec{x})}, \text{ if } \vec{\alpha} = \frac{\vec{k}}{\omega}$$

If $s(t - \vec{\alpha} \cdot \vec{x})$ is periodic, it has a Fourier series, $$s(u) = \sum_{-\infty}^{\infty} S_n e^{jn\omega_o u}, \text{ for}$$

$$S_n = \frac{1}{T} \int_0^T s(u) e^{-jn\omega_o u} du$$

where $u = t - \vec{\alpha} \cdot \vec{x}$

For aperiodic signals, one can apply the "spatial Fourier transform" (as a function of "u") rather then the above Fourier series.

$$s(u) = \frac{1}{2\pi} \int_{-\infty}^{\infty} S(\omega) e^{j\omega u} du, \text{ for}$$

$$S(\omega) = \int_{-\infty}^{\infty} s(u) e^{-j\omega u} du$$

It can be shown that virtually any s(u) satisfies the lossless wave equation with properties of:

A propagating plane wave: $s(t - \vec{\alpha} \cdot \vec{x})$

With a "slowness vector"

$$\vec{\alpha} = \frac{\vec{k}}{\omega}$$

pointing in the direction of propagation

With wavenumber vector: $\vec{k} = \omega \vec{\alpha}$, where $$|\vec{k}| = \frac{2\pi}{\lambda}$$

And with a frequency $\omega$ and wavelength $\lambda$, such that $$c = \frac{\lambda \omega}{2\pi}$$

Referring now to FIG. 18A, a depiction of two antenna elements, E-18A-30 and E-18A-40, is shown. A waveform with a wavelength λ (E-18A-70) is depicted by two planar wave fronts, E-18A-20 and E-18A-10. The bore sight of the antenna array is depicted by E-18A-60, whereas the direction of propagation, often referred to as the "slowness vector", is depicted as E-18A-50. The angle of arrival of the propagating signal is depicted relative to the bore site of the array and is defined as theta (θ). As theta goes to θ, the arrival of the signal converges on perpendicular with the antenna array "bore sight". The phase difference received between the signal detected at Antenna Element E-18 A-30 and E-18 A-40 may be determined based upon the relative wavelength difference or physical difference, "a", where "a" is defined as equaling "d" times the sine of theta. To determine the phase difference between the two elements, "a" would be divided by the wavelength and multiplied by 2π resulting in a phase difference of 2πd sin(θ)/λ. As the spacing d, of the elements exceeds λ/2, the determined phase difference as a function of theta will begin to repeat within the 180 degrees of possible slowness vector arrival angles. As a result, such repetition of the sine of theta will define the "ambiguity" regions of the angular spectrum and result in so-called spatial aliasing.

Figure 18C:
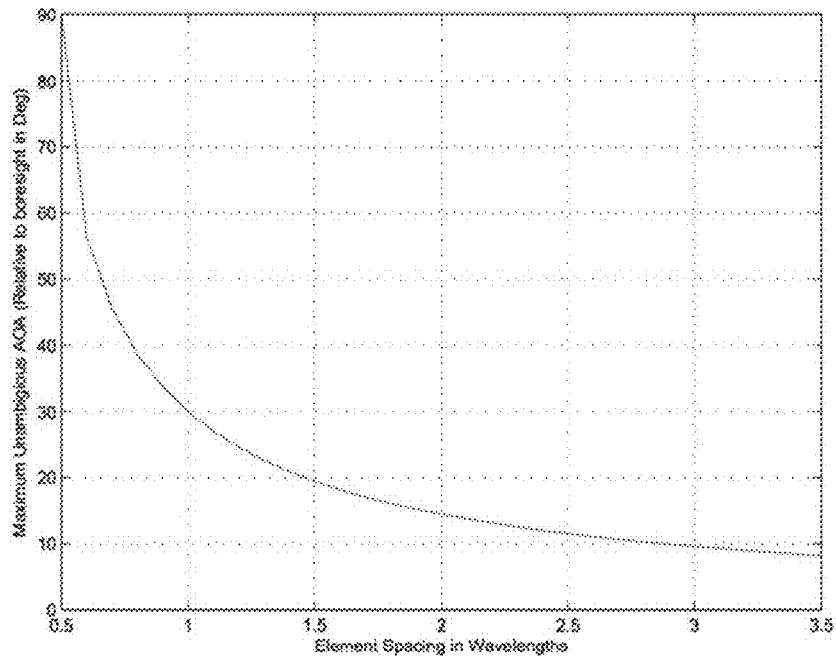

FIG. 18B is a plot of the absolute value of the maximum unambiguous angle of arrival relative to array broadside versus element spacing in wavelengths for a two-element antenna array. FIG. 18C provides EQ. E-18C describing a formula defining the maximum unambiguous angle of arrival relative to array broadside versus element spacing in wavelengths for a two-element antenna array. The maximum unambiguous angle of arrival may be determined from equation E-18C as theta equals plus or minus the inverse sign of "λ/2d". A plot of this function relative to element spacing "d" is provided in FIG. 18B, where 0.5 represents element spacing of λ/2 defining the maximum unambiguous angle of arrival relative to bore sight and "90 degrees" specifying that + and −90 degrees is uniquely resolvable for the angle of arrival of the signal with a slowness pointing vector in the theta direction. Whereas with an element spacing of 1λ, the maximum unambiguous angle of arrival would be + or −30 degrees and for 3λ, spacing the maximum of + or −10 degrees would be unambiguously resolvable. One benefit of a wider spacing of elements E-18A-30 and E-18A-40 is that the resolution of an angle theta from the samples of signal at each of the elements is enhanced and may be determined to a higher degree of accuracy as the elements are spaced further apart.

For example, the power of the error in an estimated angle of arrival is reduced as the square of the separation of the elements, for an interferometry angle of arrival measurement. As one example, doubling the element separation will result in a 6 dB improvement in the angle of arrival estimation. Such a relationship may be seen in the following equation (See E. Jeff Holder, "Angle-of-Arrival Estimation Using Radar Interferometry: Methods and Applications", ISBN 978-1-61353-184-6, pg 108)

$$\sigma_E^\theta = \frac{\lambda}{2\pi d\sqrt{SNR}}$$

FIG. 19A depicts a plot of the normalized gain in dB relative to the angle of arrival for a signal received by a linear equally spaced (2.9λ) 4 element antenna array having a 60 cm total array baseline (11.6λ) for a ISM band signal (i.e. at 5.8 GHz or any 5.x GHz) center frequency showing "spatial aliasing". Referring now to FIG. 19A, depicting four elements equally spaced within a 60-centimeter total baseline array and operating at 5.8 Gigahertz, one can see the main load at bore site for a signal being received at bore site, also referred to as array factor, depicted at a peak receive power at E-19A-10 where spatially-aliased signal representations are depicted by E-19A-20 and E-19A-30.

FIG. 19B depicts a plot of the normalized gain in dB relative to the angle of arrival for a signal received by a linear equally spaced (3.9λ) 3 element antenna array having a 60 cm total array baseline (11.6λ) for a ISM band signal (5.8 GHz) center frequency showing "spatial aliasing". Referring now to FIG. 19B, the depiction of three elements equally spaced over a 60-centimeter array is depicted where the array factor is normalized gain in dB is shown and grating lobes or ambiguous spatial aliasing peaks are shown. It should be noted that the spacing between three elements over 60 centimeters is larger than four elements over 60 centimeters and therefore the spatial aliasing apparent between FIG. 19A, and FIG. 19B is more drastic. That is to say, the peaks of the aliased main lobes, E-19B-30 and E-19B-20, are closer in angle to the main un-aliased lobe of E-19B-10 than was the case in FIG. 19A.

FIG. 20A depicts an exemplary E-Band antenna array having a grid of antenna element sets and auxiliary ISM (5.8 GHz) antenna elements for use in embodiments of the present invention. For example, an individual antenna element set E-20A-20 is depicted in one embodiment and labeled A. A similar element is also depicted as E-20A-10 in one embodiment both comprising an E-band antenna element set. For example, an E-band antenna array having a total aperture of 160 $\lambda_E$ is depicted; however, only 16 E-band antenna element sets by 16 E-band antenna element sets are depicted. Such elements may be comprised of a single radiating structure having a particular beamwidth resolving any spatial aliasing issues resulting from the ten $\lambda_E$ spacing from E-band element to E-band element. As such, the structure may be comprised of a single radiating structure or it may be comprised of an array structure itself resulting in satisfaction of the spatial aliasing or spatial sampling theorem requirements so as to reduce any grading lobes from transmission and reception antenna factors. Such implementation may be according to any of the disclosed embodiments that are incorporated in their entirety by reference herein, or those known in the industry in general. While there is a gap shown in spacing between individual elements of the array, such a gap is for clarity purposes and may not exist in specific embodiments, while in other embodiments such spacing may be present. Specific embodiments of an E-band array may not distinguish spacing between individual radiating elements but may be continuous across the entire 160 $\lambda_E$ aperture in both the X and Y directions of the array. In the present embodiment the aperture is defined as 160 $\lambda_E$ when operating in the E-band and 11.6 $\lambda_{ISM}$ when operating at 5.8 gigahertz in the ISM band as designated as E-20A-60 and inter-element spacing or inter-element set spacing E-20A-70 as mentioned 10 $\lambda_E$ or 0.725 $\lambda_{ISM}$. In some embodiments specific element sets may be designated as for operation with ISM (or 5 GHz) band as ancillary elements and others for operation in E-band for the main array. For example, in one embodiment, E-20A-20 is designated as operating in ISM (or 5 GHz) band as are the other labeled elements, B, C and D, within the same embodiment. When operating in the ISM (or 5 GHz) band the inter-element spacing between A, B, C and D would be 2.8 $\lambda_{ISM}$ designated E-20A-80. Additionally, on the vertical axis a linear ISM array may be produced by substituting E-band elements with ISM elements designated D, E, F and G where G is designated as E-20A-40. Other embodiments will utilize the elements designated A through G as E-band antennas or antenna sets. Some embodiments may not use 5 GHz at all and only E-band or V-band depending upon implementations or another frequency wherein the main array may be comprised of sub-arrays and operated as single frequency which will be discussed in further detail. In one embodiment an ancillary 5 GHz array is placed along the perimeter of an E-band only array and designated by Element E-20A-30 labeled A1 and making up an array for the ISM band on the horizontal axis labeled A1, B1, C1 and D1, each element spaced in the present embodiment at 2.8 $\lambda_{ISM}$. On the vertical axis, in one embodiment, an 5 GHz linear array may be provided as designated by D2, E2, F2 and G2, G2 being labeled E-20A-50 wherein in embodiments where the vertical array is integrated into the E-band array E2, F2, D2 and G2 would be substituted for E-band elements.

In specific implementations all elements may be cavity-backed slots or other radiating structures as known in the industry. In yet other embodiments the 5 GHz band elements may be dual band or co-existent in the same location with an E-band or other payload bearing operational frequency antenna elements as well as 5 GHz band elements. Furthermore, the location of integrated 5 GHz band elements need not be at the perimeter but could be spaced elsewhere within the array. It is contemplated embodiments not having linear arrays but having so-called "sparse arrays" may be used, wherein management of ambiguity epics for maximum unambiguous angle of arrival detection and side grading lobes may be beneficial. Furthermore in some embodiments placement of the E-band elements at the corners may be incrementally beneficial in creating a larger aperture where placement of the 5 GHz elements within the array along the edges but not at the corners and with the array's interior may show no degradation in 5 GHz band performance. Furthermore, it should be understood that the 5 GHz, E-band, V-band and other frequencies are utilized for exemplary purposes only and are not limiting. A single frequency or combinations of other known operating frequencies are applicable to the current embodiments. It should be noted that the 160 $\lambda_E$ aperture corresponds to a 60-centimeter diameter radiating aperture similar to previously discussed reflectors in terms of antenna beam width of the main radiating lobe, although variation will occur.

A radiation pattern from an antenna comprising an embodiment representing in FIG. 20 at the 5 GHz (or ISM) band would correspond and be similar to the array factor plotted for the normalized gain in dB utilizing four elements with an aperture of 60 centimeter at 5.8 gigahertz of FIG. 19A. The radiation pattern of an E-band array would be similar to that of FIG. 12 and array factor E-12-50, and the 5 GHz radiation pattern would correspond to E-12-40 of FIG. 12 in having a 3 dB beam width of 7.2 degrees and a 15 dB beam width of 14 degrees as determined by the X or the Y aperture as defined in FIG. 20A.

In some embodiments the phases of the 5 GHz (or ISM) band transmissions from Elements A, B, C and D and E, F and G or others may be electronically controlled utilizing beam forming techniques where each may be an individual transmitter may be the result of a phased array output or otherwise may be produced utilizing a butler matrix structure with a switched input for steering such an array pattern or otherwise may utilize a transmission into each element of a butler matrix utilizing a separate Zadoff-Chu code or other aligning sequence which would allow for different patterns for different codes, and sub-patterns being overlapping. In such an embodiment, the detection of the relative amplitude and phases of the individual codes would provide for the ability of a detecting receiver to determine angle of misalignment of the transmitting array form a single receiver. In alternative embodiments where only E-band is utilized, subsets or individual groups of E-band elements, for example a set of elements comprising E-20A-20, may be utilized as an output by itself and resulting in a wider beam width or in combination with other elements to broaden antenna beamwidth. For example, if Element A and B were used at E-band but not C and D, the aperture being less than half of the overall array aperture, the beamwidth would be correspondingly more than twice as wide. As a result, subsets of E-band elements may be utilized so as to provide a wider beamwidth for initial alignment or ongoing maintenance alignment. Such operation may be achieved utilizing the feed structure of the array and utilizing switches or other radio frequency structures to open or shunt specific portions of the feed structure to affect the overall elements and their ability to transmit utilizing the whole array.

Such an arrangement may result in individual array patterns being used one at a time or in combinations, or sequentially. Alternatively, the array may be subdivided into sub-arrays, each driven with individual transmitters utilizing smaller feed networks and utilized transmitting a common signal for full antenna array operation and separate signals for sub-array individual combinations so as to broaden beamwidths when desired. Such transmissions may be embedded within the main E-band or V-band, for example signal as discussed in U.S. patent application Ser. No. 14/624,365, describing the self-organizing back hall radio (SOBR), the teachings of which are incorporated in its entirety herein by reference. Such teachings further disclose receiver structures for the reception of codes or other embedded signals in the presence of payload bearing main carrier signals. Furthermore, the hybrid band operation of an ISM (or 5 GHz) array integrated with an E-band array is further described in various embodiments in from U.S. Pat. No. 9,572,163. The existence of the 5 GHz band array and the combination of the E-band or other operating frequency array may be utilized for more than initial alignment and maintenance alignment operation but may be used associated with the teachings of the hybrid band radio U.S. Pat. No. 9,572,163 as a redundant link or a feedback link for various traffic or in the manner taught in the various embodiments of said application. Furthermore, the use of alignment assisting devices as previously discussed is explained in more detail in U.S. patent application Ser. No. 15/084,867 incorporated herein by reference in their entirety, all of the embodiments of which are contemplated in conjunction with the disclosures of this application.

FIG. 20B depicts an exemplary E-Band antenna array having a grid of antenna element sets including auxiliary E-band sub-arrays and antenna element sets for use in an embodiment of the present invention. Turning now to FIG. 20B an antenna array for a single frequency of operation is disclosed. In one embodiment it is an E-band array at 80 GHz and having a 60-centimeter aperture in the X and Y directions. In such an embodiment groups of elements may be spaced together. For example, Block E-20B-10 and utilized for the transmission of a common alignment aiding signal in one embodiment wherein a wider transmission beam pattern would be transmitted due to an aperture of 10$\lambda$ as opposed to the full aperture of 160$\lambda$ of the current embodiment. As a result, the overall main lobe beam pattern would be 16 times larger than that of the full array. For example, rather than having a main lobe of a half a degree in 3 dB beam width, it would have an 8-degree main lobe beamwidth. The alignment may be performed based upon the steepest gradient "descent" algorithms resulting from sequential measurements of signal received or transmitted by a subset of elements or individual codes may be transmitted by each of the elements so as to result in the ability to do direct angle of arrival determination and a more direct adjustment to the main lobe of the more narrow array pattern. The gain on the antenna array defined by E-20B-10 would be significantly lower than that of the full array by an amount of 10*Log(16) or roughly 9 dB. In other embodiments, different sets of elements may be utilized, for example E-20B-1, E-20B-2, E-20B-4 and E-20B-3 may be utilized in such an embodiment, the elements may be driven collectively and the radiation pattern broadened as just discussed or alternatively individual codes may be transmitted for each of the element structures. For example, the common code may drive all four and/or different codes for each of the four, resulting in the ability to direct angle of arrival measurements at a desired receiver, while alternatively the elements may be used for reception and direction of arrival determination of a transmitter (based upon individually received signals at each of the antenna structures).

Referring now to Elements E20B-20, E20B-22, E20B-24, a linear array of three elements may be utilized also at the same frequency band for a vertical angle of arrival determination again based upon common code requiring plurality of measurements and steepest ascent type algorithms or based upon different code transmissions resulting in the ability to determine a more direct elevation adjustment which is required to align the array vertically with an intended receiver and said receiver using algorithms as discussed associated with interferometry, music, periodigram/angular frequency analysis and the like. Furthermore, Elements E-20B-26, E-20B-28 and E-20B-24 may be used for the determination of azimuthal alignment using similar techniques. Furthermore, all the elements, E-20B-20 through E-20B-28 may be used jointly using super resolution techniques or interferometry techniques. Furthermore, such techniques may be implemented with less complexity based upon a single transmitter and alternative feed network configurations where the feed networks are sequentially switched and subsequent measurements made to determine relative phase information through the use of a commutating transmitter arrangement wherein each configured feed network would be received, stored and a subsequent measurement would be made and a relative phase analysis or other angle of arrival determination analysis performed on the values determined at the receiver associated with each of the commutated feed network configurations. Such techniques are applicable to both FIG. 20B as well as FIG. 20A or any other of the arrangements discussed herein.

FIG. 20C depicts a plot of the normalized gain in dB relative to the angle of arrival for a signal received by two E-Band (80 GHz e.g., 3.75 mmλ) antenna "sub-arrays" having a composite 60 cm aperture baseline (160λ), where the phase center separation of the two sub-arrays is 32λ demonstrating phase ambiguity epochs from spatial aliasing.

FIG. 20D depicts a plot of the normalized gain in dB relative to the angle of arrival for a signal received by two E-Band (80 GHz e.g., 3.75 mmλ) antenna "sub-arrays" having a composite 60 cm aperture baseline (160λ), where the phase center separation of the two sub-arrays is 10λ demonstrating phase ambiguity epochs from spatial aliasing.

Referring now to FIG. 20C, an array factor of the angle of arrival ambiguities is depicted for a spatially aliased array configuration, for example, the main beam pattern E-20C-10 is disclosed whereas an aliased angle of arrival E-20C-20 as well as the other peaks are shown. Upon detection of such an arrangement, other information would be required to determine which of the peaks is the correctly determined arrival direction. Consequently, the use of coarse and fine resolution prior to such superfine resolution determination is beneficial. FIG. 20C provides for 64 ambiguity zones within 180-degree look angle relative to the array. FIG. 20D provides for 20 ambiguity zones within a 120-degree look angle for different spacing of the E-band array. For example, Peak E-20D-10 relative to Peak E-20D-20 is separated by 18 degrees, which is significantly more than the separation of the ambiguity peaks of FIG. 20D that are significantly further than those of FIG. 20C indicating that the element spacing of the array associated with E-20D is closer in terms of the number of wavelengths between elements than those of E-20C. The number of ambiguities is defined by N equals two times d over λ, wherein d is defined as the smallest inter-element spacing as derived for a two-element antenna array. Therefore, it can be seen that when "d" is equal to λ/2 the resulting N is equal to one. Hence, the number of ambiguities or ambiguity zones is one and therefore overall a 180-degree look angle; there is no ambiguity in such an embodiment.

In some embodiments associated with FIG. 20B where the main radio is utilized for both operation of the entire array but also operation of individual elements, the main radio may be capable of transmitting multiple input, multiple output signals at least in terms of horizontal and vertical polarizations related to the individual link. Other embodiments may provide for multiple feeds allowing for more than two distinct code transmissions. In such cases, separate feed networks having different codes may drive individual sub-arrays.

In some embodiments one or more of the driven signals may utilize the same main modem hardware that is utilized for the main link but reconfigured so as to transmit encoded signals for each sub-array, or within the main array of "pattern tracking" purposes. In such embodiments it is possible that each symbol transmitted may comprise one bit of a larger code. For instance a Zadoff-Chu code, a Walsh code, a maximal length PN shift register code or pseudo random code, a gray code, a "m code", a CAZAC code or other codes as disclosed in the SOBR application (U.S. patent application Ser. No. 14/624,365) previously incorporated herein by reference. Furthermore, such codes may be utilized in embodiments associated with the advanced backhaul services (ABS) of U.S. patent application Ser. No. 14/502,471, incorporated herein by reference, the teachings of which are contemplated for use in the various embodiments of the present disclosures. In one embodiment, the use of forward error correction in an integrated radio transceiver from a chip supplier such as Broadcom may be turned off and the transmitted symbols defined to be bits of a larger sequence to define the alignment codes. In other embodiments the systematic bits of a systematic forward arrow correction code may be defined as the individual values of an alignment sequence. At the receiver, in one embodiment, the redundant bits discarded and only the systematic bits retained and utilized for processing in a subsequent correlation process or in other embodiments forward arrow correction may be processed so as to improve the detectability of the codes overall and then the resulting systemic bits at the output of the forward error correction algorithms utilized to perform subsequent correlations. In such embodiments it is contemplated that a single code would be transmitted at of time rather than jointly. While in other embodiments soft bits of the systemic elements are retained and unmodified by either bypassing the FEC processing or receiving the systemic bits as soft symbols. Such soft symbols being usable for subsequent correlation processing and the separation of the individually jointly transmitted Zadoff-Chu codes or other alignment code sequences.

In one embodiment it is contemplated with a single transmitter that one or two such codes may be transmitted utilizing the main transmitter structure used for the E-band or V-band millimeter wave transmission links but used for the transmission of the alignment codes at a different time. In such embodiments, additional transmissions may be made by time sharing the transmitter between different arrangements of antenna elements including those associated with the parabolic reflector ancillary elements as discussed previously or those associated with the array configurations discussed herein or those of the hybrid band or other embodiments incorporated herein.

Such structures may be deemed commutating transmitter configurations. Such commutating configurations may be communicated to the intended receiver as well as the specific codes for configuration and post processing to determine the detection of each. For ongoing operation using embedded codes configuration information may be provided where specific symbols of the payload data are substituted for bits or symbols to be transmitted utilizing alternative array or ancillary antenna configurations. In various embodiments, such an arrangement may be performed utilizing the BCM85100 system on a chip from Broadcom, which is a baseband system on a chip for broadband wireless transmission systems.

In other embodiments the alignment signal may be produced by the same modem but at a lower frequency than the E-band despite the operation at E-band for normal payload bearing signal but reconfigured for 2.4 GHz or 5.8 GHz prior to up conversion to the E-band or V-band in one embodiment. In other embodiments, a separate receiver transmitter may be utilized to drive the 5.8 GHz or 2.4 GHz alignment signals. For example, an off-the-shelf Wi-Fi chipset may be utilized, in particular chipsets supporting IEEE802.11n or IEEE802.11ac are capable of providing multiple input, multiple output signals, including the generation of channel sounding signals for 2, 4, 8 and more elements. Such channel sounding capabilities may be utilized with the ancillary antenna element structures resulting in the ability for a relatively inexpensive chipset to be used for angle of arrival determination as well as hybrid band radio links for operation per the hybrid band radio specifications of U.S. Pat. No. 9,572,163, previously incorporated herein by reference in its entirety. In some embodiments the channel sounding information may be retrieved from the chipset and post process so as to determine the angle of arrival information estimates for subsequent aligning processes.

In other embodiments the transmitter receiver of the intelligent back haul radio disclosed in U.S. Pat. No. 9,572,163 may be utilized for channel sounding, for beam forming or the like. In embodiments where off-the-shelf Wi-Fi chipsets are used any and all the capabilities including beam forming, phased array capabilities and the like contemplated in 82.11ac are considered for use in the current embodiments. Furthermore, IEEE 802.11ad for operation at millimeter wave bands is contemplated as well. In other embodiments embedding signals into the main link for operation is contemplated through the use of center frequency dithering so as to be able to detect signaling associated with variations in a center frequency or among preambles or embedded symbols in line with the main data stream. Such variations may be integrated over time to allow for much higher dynamic range detection of the signal wherein the individual high rate information symbols may not be detectable when misaligned beyond the main beam of an antenna. However, integrating other signal elements such as only integrating the preambles of frames transmitted from the Broadcom 85100 chipset will allow for, in some embodiments, processing gain of significant amounts in excess of 30 to 50 dB and resulting in the ability to detect the received signal level at much lower levels and allow for a steepest descent algorithm for alignment to be performed from a standard receiver. Furthermore, the use of the standard transmitter receiver chipsets for the main link but substituting the information symbols for bits of a sequence such as Zadoff-Chu code or other CAZAC code or PN sequence will allow for such processing gain and integration over time so that higher dynamic range or simply lower detection levels are possible through post processing and integration of the bits detected from the receiver over time.

In some embodiments a dedicated preamble detector in the receiver may be utilized to detect the preambles of the transmitted frames of the E-band or V-band link and to perform post processing so as to allow for such integration when a preamble detector associated with the main receiver in specific embodiments may not be able to detect signal levels at such a low level. Such dedicated preamble detectors or sequence detectors may allow for steepest descent algorithms to be used with E-band or V-band only signaling or with other embodiments contemplated herein.

FIG. 21 depicts an exemplary block diagram of an alignment transmitter with separate transmitters and a depicting of the relative timing of transmitted alignment waveforms according to embodiments of the present invention. Referring now to FIG. 21, an example of a transmitter arrangement transmitting exemplary Zadoff-Chu code sequences in a repeated fashion. In one embodiment, a clock trigger into a delay provides input to an alignment transmitter from Delay E-21-51A and subsequently delayed clocks are provided to subsequent Alignment Transmitter E-21-60A and signals to Antenna Element E-21-10. Next delay E-21-50B provides input to the next alignment transmitter through a power amplifier to Antenna Element E-21-20. Clock input to Delay Block E-21-50 provides input to alignment transmitter E-21-60C through power amplifier and signal to Antenna Element E-21-30 and the process proceeds to any number of transmitters. For example delay E-21-50$_n$ provides input to Alignment Transmitter E-21-60$n$, and signal to the power amplifier and then to Antenna Element E-21-$n$.

The first transmitted signal would be transmitted at a referenced time of T equals zero, then a signal transmitted from E-21-20 would be transmitted at a delay of D designated by E-21-70b relative to the first transmitted signal of E-21-70A and the third transmitted signal of would be E-21-70C at two delay time periods in time (2D) from transmitting Element E-21-30 to the nth signal to be transmitted labeled E-21-70N from Antenna Element E-21-N. In alternative embodiments, no delays need be present and different code sequences may be used. For example such as Welsh codes from each individual antenna element or different phases of a maximal length shift register PN code or pseudo random code or m code, Barker code or like as contemplated in related patents and patent applications incorporated herein (for example in U.S. application Ser. No. 14/624,365, incorporated herein in its entirety). For a Zadoff-Chu code a delay of a root sequence code comprises a separate orthogonal code and therefore each delay D, if sufficient, will result in a uniquely distinguishable receive delay "epoch". Under such a situation, the amount D must contemplate the largest possible channel impulse response for the RF propagation between an intended receiver and the transmitter, including the multi-path impulse response due to reflections within the propagation channel either due to obstructions or due to impingement upon the Fresnel zone for a point-to-point link. Such delays may be in some cases microseconds or more and therefore if the delay D is in excess of any contemplated impulse response of the channel then any detection of signal at or beyond D relative to a previous detected signal would not be contemplated as being part of the wireless channel but would be contemplated as being a uniquely transmitted code from a separate receiver. Such relative delays may be communicated to the detecting receiver as to aid in the identification of the delay epochs.

FIG. 22 depicts an exemplary block diagram of an alignment transmitter with a common waveform generator and separate radio frequency delays and a depicting of the relative timing of transmitted alignment waveforms according to embodiments of the present invention. Turning to FIG. 22, an alternative configuration where a single transmitter is utilized is contemplated so as to generate signal at radio frequency utilizing Alignment Transmitter E-22-60 from the first antenna element of FIG. 22 labeled E-21-10. Then a delay in RF rather than digitally is utilized. E-22-50a providing for the same radio frequency signal to be amplified and transmitted from the next antenna element and so on and so forth through delay E-22-50n transmitted from Antenna Element E-21-a resulting in the same wave forms being generated for E-21-70a through n. For configurations of FIG. 21, alternative embodiments as known for generating distinct signals are contemplated. Furthermore, the input from Alignment Transmitters E-21-60a through E-21-60n may go into individual antenna elements as depicted or may go into sub-arrays as previously discussed. They may perform beam-forming operations based upon the provided data (not shown in this figure) or associated control interfaces (also not shown in this figure). However, such beam forming techniques are disclosed associated with related applications as discussed in other patents and patent applications previously incorporated herein by reference herein or as known in the art.

Referring again to FIG. 22 such input signals generated after each delay may be fed into an analog beam former referred to as a butler matrix prior to being delivered to individual elements or sub-arrays associated with ancillary elements previously disclosed either associated with a parabolic reflector or as sub-arrays of the antenna array implementations either at E-band or at a lower band or another band, common with the frequency of payload operation or as part of a hybrid configuration or for use only during initial alignment processes.

FIG. 23A depicts an exemplary illustration of a parabolic dish antenna having a plurality of radial ancillary alignment antenna element and a receiving backhaul radio utilizing one or more receiver for detecting the alignment waveform according to some embodiments of the present invention. Referring now to FIG. 23A, an example of transmission from ancillary elements, in one embodiment, from a parabolic array E-23A-10, is depicted wherein an ancillary element transmits a signals from E-23A-40a . . . n, said transmissions being associated with embodiments of a through n providing for plurality of transmitted signals without limitation wherein each signal may be a differing alignment code such as Zadoff-Chu code as discussed. Such transmissions may be received by receive antenna E-23A-20. In one embodiment the parabolic antenna reflector is used, while in others an array antenna is utilized, and the signals are passed to Receiver E-23A-30. Said plurality of transmitted codes may be sent from elements along the peripheral of the circumference of the parabolic array or along the peripheral of an array antenna or as integrated elements within an array antenna at the frequency of operation or at other frequencies of operation.

FIG. 23B provides an exemplary plot of receiver correlated alignment waveform power verses time for a plurality of receiver time epochs for use in receiving waveforms for use in detecting transmitter miss-alignment according to some embodiments of the present invention. The output of Receiver E-23A-30 in one embodiment may be the output depicted in FIG. 23B wherein a correlation peak, E-23B-20a at a time delayed $T_D$ is designated E-23B-30, and where the correlated power is determined based upon the I squared plus Q squared values of the output of a correlating receiver as discussed in incorporated references, such as U.S. patent application Ser. No. 14/624,365, and labeled as Epoch 1. "D" is the delay, E-23B10 associated with the delays described in FIGS. E-21 and E-22. The "Epoch" is the correlation output region for which all correlations are a result of the same transmitted waveform from the same antenna element or antenna element structure. The second Epoch is a delayed version of the first waveform transmitted from a subsequent element or element structure and designated E-23B-20b. The process continues until Epoch "n" is detected with correlated output E-23B-20n. The detection process may utilize all these signals combined in power so as to allow for higher sensitivity detection. Furthermore, the determination of the individual Epochs may utilize a coherent correlation of the values of each Epoch relative to the values of subsequent Epochs so as to determine Epoch boundaries based upon a common channel impulse response in some embodiments.

In determining the angle of arrival, if the same code (delayed) is transmitted for each Epoch, coherent integration across the Epochs is possible to increase the overall performance. Whereas in embodiments wherein separate codes are transmitted for each Epoch (simultaneously), the phase of the detected signal at the peak of the correlations labeled by E-23B-20a through E-23B-20n are determined and the phase of each subsequent detected in-phase and quadrature (real or imaginary values) will be phase shifted or de-rotated by the phase of the first detected peak, A-23B-20a resulting in a vector associated with Epoch 1 which is aligned on the real axis at zero phase but retaining the appropriate amplitude of the signal without distortion. Said value used for the de-rotation of the phase is applied to the signal of Epoch 2 through Epoch n. The combination of values, Epoch 1 through Epoch may be defined as a "tuple" and stored for subsequent processing as discussed. The detection period (or integration period) prior to the output of the correlator for each Epoch must be common for each Epoch. They may be performed by a commutating transmitter one code at a time and one receiver at a time or they may be performed in parallel and simultaneously. Alternatively, the duration of any integration of the correlators associated with detecting each code either in parallel or sequentially will be configurable in some embodiments or fixed in other embodiments. Such configurations may be communicated in some embodiments between the transmitter and the receiver, peer-to-peer radios such that configuration is understood for use during reception periods, and any commutating periods as appropriate.

The specific integration time may be dependent upon oscillator phase noise and stability of the transmitter and the receiver or maybe dependent upon the channel of propagation between the transmitter and receiver and any Doppler effects or phase-distorting effects between the radios.

Estimations of the channel stability may be made by the receiving radios and the correlation integration times performed adaptively based upon determination by one or more of the transmitting or receiving radios, a network server or an application on one or more of the alignment assisting devices. Such coherence time adaptation allows for coherent integration prior to correlation output and determination of the signal tuples. Subsequent sets of multiple signal tuples being phase normalized may then be coherently combined to improve the signal noise ratio of the signals and passed to an angle of arrival determination algorithm such as an interferometry approach or a correlation with an "expected angle of arrival" phase tuple representation, sometimes referred to as "steering vectors" where the received tuples are correlated against a set of multiple steering vectors indicating a particular angle of arrival. Further interpolation may be utilized associated with the correlations between the received tuple(s) and the steering vectors and a peak received power for a particular array factor may be determined, wherein an array factor defines the peak power received for a far field wave front at a particular angle of arrival. For each steering vector, the array factor is shifted such that the correlation of a particular tuple or integrated tuple with each of the array factor vector steering vectors will result in a maximum correlation with a known angle of arrival. Multiple correlations between two or three "peak" steering vectors with a particular tuple or integrated tuple may be interpolated through least squared or spline interpolation or other interpolation methods to refine the angle of arrival performance. The output of the interpolation would be one or more of an elevation and azimuth estimate of the alignment of the transmitting array relative to the receiving antenna element.

FIG. 23C provides an exemplary plot of receiver correlated alignment waveform power verses time for a combined receiver time epoch output according to some embodiments of the present invention. Referring now to FIG. 23C, the combination of multiple Epochs in power (that is non-coherent combination of each Epoch together) results in the averaging of the power detected of each subsequent Epoch over some period of time to perform initial impulse response detection.

FIG. 23C provides an example of such a detection process where a threshold E-23C-20 is, in some embodiments, a fixed threshold defining a signal noise ratio, where in other embodiments it is a dynamically set threshold based upon either a level below a peak detected signal, a level above a noise floor or a combination of greater than a level above the noise floor and a certain level below the peak detected power levels, whichever is greater. Other known threshold determination means from detection theory are contemplated as well. The threshold may be set based upon a desire for a certain false alarm rate or a desired minimum signal to noise ratio associated with the detected signal, such signal noise ratio being improvable through the averaging of multiple Epochs, including repeated Epochs of the same transmitted antenna element.

FIG. 23D provides an exemplary plot of receiver correlated alignment waveform power verses time for a combined receiver time epoch output according to some embodiments of the present invention, wherein multiple propagations paths of at least one alignment signal is detected. Referring now to FIG. 23D, a specific scenario in which multiple correlation peaks are detected within the same Epoch is demonstrated. Such a situation may arise when a direct line of sight path is present at $T_D$, however, a second path is present due to impingement upon the Fresnel zone creating a second multi-path signal delayed and resolvable by the correlation process. Such an analysis may be done on each Epoch individually or on the combined Epochs power result. Such a power delay profile may be used to qualify the installation as discussed previously associated with the installation flow diagrams wherein conditional qualification may include sufficient angular alignment but also sufficient received power level above a noise floor in terms of signal noise ration or signal to interference level but also qualifying whether the Fresnel zone is free of multi-path propagation causing signal quality degradation. Such multi-path may not be repairable based upon the specific waveforms being utilized in a particular implementation. Such qualified approval may be fed back to the network operations center or to a technician performing installation and may either be denied commissioning and called a "qualified commissioning" or may be exempted utilizing an approval code from management or a bypass code. In other embodiments, approval through a user interface that such an installation situation is deemed acceptable my be required, and ensuring that a technician is aware of the channel conditions in certain embodiments. In other embodiments no bypassing of the rejected "qualified link" may be possible and the technician instructed to relocate the antenna so as to avoid either interference due to an increased noise floor or insufficient peak correlated signal to noise floor or the like. In terms of an obstruction or diffracting structure or reflecting structure within the Fresnel zone, such an indication may be deemed a warning and a level of degradation of the link may be indicated or such degradation exists but that little or no impact to the channel link performance is currently determined. In other embodiments, it's determined that no impact is currently expected, however, such information may be usable to determine what the risk of further changes to the environment may be, for instance an operating crane moving on a continuous basis which may further impact the performance of the link at some future time. Other qualifications may be made based upon received power over time. For instance, if the power variation over time is occurring on a statistical level beyond a desired standard deviation or variance or an absolute threshold or other statistic then a warning or denial of commissioning may be generated to the network operations center or in a report or otherwise to the technician to make adjustments.

Other qualified commissioning criteria may include measured channel stability in terms of phase, channel impulse response, power delay profile, poor signal-to-noise ratio beyond a certain level, variation of any of the parameters statistically, or other factors important to the reliability of a link including but not limited to absolute angle and elevation alignment.

Referring again to FIG. 23A a particular tuple would result in a measurement of phase differences between each of the transmitted waveforms E-23A-40a through E-23A-40n, for example, but the specific power delay profiles would result in the qualification of the conditional commissioning step and a potential warning, or denial of commissioning.

Additionally, the stability or consistency of the tuples based upon subsequent measurements may be utilized to determine channel stability and consequently the stability of the mechanical structure. Such stability was discussed in association with twist and sway related to FIGS. E-4A and E-4B. Furthermore, the overall variation of the peak power or the power of a particular selected received signal from an individual Epoch may be utilized to determine structure stability. In other embodiments, the non-coherently combined Epochs may be used to determine a level of acceptable mechanical variation. For example, if the received power level of one or more of the Epochs of a selected signal varies too much, commissioning may be denied to the technician in one embodiment. In some deployments, significant power variation may indicate poor alignment, amplifying the effects of any mechanical variation due to operation of the antenna at steep portion of its radiation pattern. Such a condition may indicate the need for alignment.

If the mechanical vibration or twist or sway of the structures of mounting one of the receiver or the transmitter is too large for the intended beam width, significant detected signal parameter variation may also be present. For example, in a perfect alignment where twist and sway is occurring, the power received should vary symmetrically and be an indication based upon the distribution of the power levels. Whereas if the power levels are varying very dramatically with much less symmetry in the detected values statistically, this may be an indication of misalignment.

In further embodiments, the accelerometers associated with the alignment assisting devices either integrated or applied to the receiving and/or transmitting paired radio may be utilized to determine mechanical variation or vibration as well as twist and sway.

Values of the sensors of the alignment assisting devices may be utilized individually or together from each radio as part of a "conditional commissioning process" and indicate to a user that their spot of mounting is not mechanically stable enough. Any and all of the foregoing techniques may be utilized individually or together.

FIG. 24 depicts an exemplary embodiment of receiver processing steps for use during some embodiments of transmission antenna alignment to one or more intended receivers. Referring now to FIG. 24, an example of one embodiment of an angle of arrival determination process utilizing the detected alignment signals in coordination with configuration from a transmitting device is disclosed in further detail. In Step E-24-10 the receiving device determines the configuration in terms of the number of correlation zones or Epochs, the numbers of signals to be transmitted, the specific codes used for transmission and their relative configuration (1 through n) or other parameters as discussed. Further communicated configuration information may include channel of operation, bandwidth of operation, data rate or configuration of a dedicated hardware modem in terms of utilizing transmitted symbols or sets of symbols as bits within a larger alignment code or the like.

In Step E-24-20, an agreement to start detection in one embodiment is made between the transmitter and the receiver or otherwise detection is begun by manual entry or some other method. In Step E-24-30, signal detection is performed and processing then proceeds to E-24-40 where the determination of specific Epochs of the detected signal is performed as discussed, and processing proceeds to E-24-50. In step E-24-50, the earliest signal is determined from the power delay profile or from an individual Epoch (which may not necessarily be the largest or most powerful signal.) In some scenarios the detected signal may be a smaller signal, but occurring earlier. Based upon detection criteria discussed herein or elsewhere within the incorporated references, processing then proceeds to E-24-60, wherein the specific detected earliest signal is qualified. The qualification may the conditional commissioning discussed, or may be a qualification of some subset, such as minimum signal noise ratio or a signal not meeting other criteria. If the earliest signal is not qualified, processing returns to the detection step E-24-30 and feedback may be provided to the individual technician to potentially correct deficiencies of the configurations or parameters in the setup. If the signal is qualified, the processing proceeds to Step E-24-70 where the individual Epochs and detected, and sets of detected signals are phase rotated (or phase normalized), based upon the phase of the first signal through a linear transformation such as known in linear algebra, to rotate the vectors to a know reference alignment. For example, phase rotation of the first resolved value of the tuple to 0 degrees, and the subsequent elements of the tuple being shifted the same amount.

In one embodiment, the tuples may be coherently combined for some period of time to improve signal/noise ratio. Since they have been phase de-rotated, the coherence of the channel is no longer an issue.

Next in a particular embodiment, the angle of transmission relative to the detected signal is determined. The terminology of angle of arrival versus "angle of transmission" being used interchangeably throughout this application.

The determination means may be through, as explained, techniques such as utilizing an array of steering vectors and a least means squared fit to those vectors further interpolation techniques to refine a predicted angle of transmission and a calculation of adjustments to be performed for improved alignment.

In one embodiment, an absolute angle in elevation and azimuth is provided to the technician at the transmitting antenna, so as to make one adjustment for bore sight alignment.

In other embodiments, multiple estimates may be performed and subsequent adjustments for each estimate provided to the technician.

In one embodiment, in which a single code is transmitted, multiple measurements may be utilized so as to determine the gradient of the transmitting antenna pattern, and a steepest "ascent" algorithm utilized to maximize received power and determine alignment, through multiple interactions with the technician.

In the some embodiments, the phase de-rotated vectors or "tuples" may be coherently integrated prior to interferometric techniques or prior to the least means squared or maximal likelihood techniques associated with steering vectors. In alternative embodiments, each tuple may be stored and techniques utilized to predict the angle of arrival (transmission), such as super resolution techniques, MUSIC, ARMA, or other parameterized angle of arrival determination techniques, sometimes referred to as subspace techniques.

Such techniques and some embodiments do not require the phase de-rotation of the vectors prior to determining the tuples. Each set of tuples may be stored without de-rotation and provided to an angle of arrival estimation algorithm such as music or root music.

Such techniques are referred to as parameterized techniques and the number of known signals must be determined prior to their use, for example the selection of the number of Eigenvalues associated with angle of arrival determination must be determined. The power delay profile may be utilized to identify the number of signals present in the multipath to delay profile of the wireless channel, which may be done on a per Epoch basis or collectively in the overall non-coherently integrated power delay profile.

When multiple peaks exist above a certain threshold, individual signals are determined to be equal to the number of peaks or otherwise resolvable signals. The number of peaks may be used to determine the number of signals to be detected for the parameterized models. Such parameters in terms of the number of expected signals are provided as inputs, for example to the parameterized angle of arrival determination method such as music or root music. Such techniques provide for significantly enhanced resolution and in many cases are shown to be superior to periodogram or other angular spectrum analysis techniques, and have been shown to be equivalent to high performance, interferometric techniques.

Embodiments of the invention may also be used with fixed wireless access (FWA) radios.

Although a number of possible implementations have been mentioned, these are presented merely for the sake of explanation and teaching, and are not limitative. Moreover, an implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments. Accordingly, other implementations are within the scope of the claims that follow.

What is claimed is:

1. A backhaul radio comprising:
   one or more antenna structures collectively having a plurality of selectable radiation patterns for detecting alignment signals;
   one or more receivers configured to receive the alignment signals from the one or more antenna structures and provide received signals;
   one or more processors for processing the received signals to determine signal properties, wherein at least one of the one or more processors are coupled to at least one of the one or more receivers to receive said received signals;
   an interface to couple at least one of the one or more processors to an alignment assisting device;
   wherein the alignment signals are transmitted from a second backhaul radio during an alignment process;
   wherein the alignment assisting device coordinates between the backhaul radio and the second backhaul radio during the alignment process;
   wherein the alignment assisting device comprises a detector for measuring orientation adjustments of the backhaul radio in azimuth and elevation;
   wherein at least one of the one or more processors controls the selection of the plurality of selectable radiation patterns and stores the determined signal properties for each of the plurality of selectable radiation patterns;
   wherein the alignment assisting device coordinates with at least one of the one or more processors to provide an indication of an alignment adjustment to a user of the alignment assisting device, and
   wherein the interface to couple at least one of the one or more processors to an alignment assisting device comprises one or more of:
   an internal buss interface;
   a Bluetooth interface;
   a Wi-Fi interface;
   a serial interface; and
   a USB interface.

2. The backhaul radio of claim 1, wherein the detector is one of an accelerometer, a gyroscope, and an electronic compass.

3. The backhaul radio of claim 1, wherein the alignment assisting device is a smart phone comprising a GPS receiver, an accelerometer, a magnetic compass, a cellular radio, a Wi-Fi radio, a Bluetooth radio, and a display.

4. The backhaul radio of claim 1, wherein the alignment assisting device comprises a GPS receiver for use in course alignment with the second backhaul radio.

5. The backhaul radio of claim 1, wherein the alignment assisting device comprises a GPS receiver for use in course alignment with the second backhaul radio.

6. The backhaul radio of claim 1, wherein the alignment assisting device comprises a cellular radio.

7. A backhaul radio comprising:
   one or more antenna structures collectively having a plurality of selectable radiation patterns for detecting alignment signals;
   one or more receivers configured to receive the alignment signals from the one or more antenna structures and provide received signals;
   one or more processors for processing the received signals to determine signal properties, wherein at least one of the one or more processors are coupled to at least one of the one or more receivers to receive said received signals;
   an interface to couple at least one of the one or more processors to an alignment assisting device;
   wherein the alignment signals are transmitted from a second backhaul ratio during an alignment process;
   wherein the alignment assisting device coordinates between the backhaul radio and the second backhaul radio during the alignment process;
   wherein the alignment assisting device comprises a detector for measuring orientation adjustments of the backhaul radio in azimuth and elevation;
   wherein at least one of the one or more processors controls the selection of the plurality of selectable radiation patterns and stores the determined signal properties for each of the plurality of selectable radiation patterns;
   wherein the alignment assisting device coordinates with at least one of the one or more processors to provide an indication of an alignment adjustment to a user of the alignment assisting device; and wherein the plurality of selectable radiation patterns comprise at least a narrow pattern and a wide pattern.

8. The backhaul radio of claim 1, wherein the alignment processes comprises the determination of the signal properties for one of the plurality of selectable radiation patterns over multiple orientation adjustments for use in determining of the alignment adjustment.

9. The backhaul radio of claim 8, wherein the determining of the alignment adjustment comprises a gradient algorithm.

10. The backhaul radio of claim 8, wherein the determining of the alignment adjustment comprises a least squares fit to a known antenna radiation pattern.

11. The backhaul radio of claim 9, wherein gradient algorithm comprises a steepest decent algorithm.

12. The backhaul radio of claim 9, wherein gradient algorithm comprises a steepest assent algorithm.

13. A backhaul radio comprising:
one or more antenna structures collectively having a plurality of selectable radiation patterns for detecting alignment signals;
one or more receivers configured to receive the alignment signals from the one or more antenna structures and provide received signals;
one or more processors for processing the received signals to determine signal properties, wherein at least one of the one or more processors are coupled to at least one of the one or more receivers to receive said received signals;
an interface to couple at least one of the one or more processors to an alignment assisting device;
wherein the alignment signals are transmitted from a second backhaul radio during an alignment process;
wherein the alignment assisting device coordinates between the backhaul radio and the second backhaul radio during the alignment process;
wherein the alignment assisting device comprises a detector for measuring orientation adjustments of the backhaul radio in azimuth and elevation;
wherein at least one of the one or more processors controls the selection of the plurality of selectable radiation patterns and stores the determined signal properties for each of the plurality of selectable radiation patterns;
wherein the alignment assisting device coordinates with at least one of the one or more processors to provide an indication of an alignment adjustment to a user of the alignment assisting device; and
wherein the alignment process comprises multiple phases including at least a course alignment phase.

14. The backhaul radio of claim 13, wherein the alignment process comprises at least a fine alignment phase.

15. The backhaul radio of claim 14, wherein the alignment process comprises at least a super-fine alignment phase.

16. The backhaul radio of claim 13, wherein the course alignment phase comprises orientation of the backhaul radio so as enable the detection of at least a portion of the alignment signals within a main radiation lobe of a selected one of the plurality of selectable radiation patterns.

17. The backhaul radio of claim 16, wherein the fine alignment phase comprises optimizing the orientation of the backhaul radio so as optimize the detection of the portion of the alignment signals within the main radiation lobe of the selected one of the plurality of selectable radiation patterns.

18. The backhaul radio of claim 16, wherein the fine alignment phase comprises orientation of the backhaul radio based upon the detection of the portion of the alignment signals so as enable the detection of at least a portion of the alignment signals within a main radiation lobe of a selected second of the plurality of selectable radiation patterns.

19. The backhaul radio of claim 17, wherein the super-fine alignment phase comprises optimizing the orientation of the backhaul radio so as optimize the detection of a portion of the alignment signals within the main radiation lobe of a second selected one of the plurality of selectable radiation patterns.

20. The backhaul radio of claim 1, wherein at least two of the plurality of selectable radiation patterns are selected, at least in part, utilizing two different carrier frequencies for the detected alignment signals.

21. The backhaul radio of claim 1, wherein at least two of the plurality of selectable radiation patterns are selected, at least in part, utilizing a single carrier frequency for the detected alignment signals, but utilizing differing antenna structures.

22. The backhaul radio of claim 1, wherein at least one of the one or more processors processes the received signals derived utilizing at least two of the plurality of selectable radiation patterns to determine angle of arrival information of the alignment signals determined using the signal properties.

23. The backhaul radio of claim 22, wherein the at least one of the one or more processors provide the angle of arrival information to the alignment assisting device to provide the indication of the alignment adjustment to a user of the alignment assisting device.

24. The backhaul radio of claim 22, wherein the determination of angle of arrival information utilizes one or more of:
interferometry between at least two separate receive antenna elements;
a super-resolution algorithm;
Eigen analysis;
MUSIC analysis;
a parametric angle of arrival estimation;
a periodogram based algorithm;
a Fourier based analysis.

25. The backhaul radio of claim 1, wherein the alignment signals transmitted from the second backhaul radio during the alignment processes differ in frequency during different phases of the alignment processes.

26. The backhaul radio of claim 1, wherein the alignment signals transmitted from the second backhaul radio during the alignment processes differ in modulation properties during different phases of the alignment processes.

27. The backhaul radio of claim 1, wherein the measurements of orientation adjustments of the backhaul radio in azimuth and elevation, are utilized by at least one of the one or more processors to determine a gradient usable to estimate the alignment indication.

28. The backhaul radio of claim 1, wherein the measurements of orientation adjustments of the backhaul radio in azimuth and elevation, are associated with requests to the user of the alignment assisting device for orientation adjustments for the purpose of deriving the gradient.

29. The backhaul radio of claim 1, wherein the indication of the alignment adjustment to a user of the alignment assisting device further comprises instructing the user to make a manual adjustment to the orientation of the backhaul radio, following by an indication to the user when the adjustment to the orientation has been completed.

30. The backhaul radio of claim 1, wherein the alignment assisting device comprises:

an internal alignment assisting device;
an external alignment assisting device; and
a hybrid alignment assisting device.

31. The backhaul radio of claim 13, wherein the interface to couple at least one of the one or more processors to an alignment assisting device comprises one or more of:
an internal buss interface;
a Bluetooth interface;
a Wi-Fi interface;
a serial interface; and
a USB interface.

* * * * *